United States Patent
Andoh et al.

(10) Patent No.: US 8,194,255 B2
(45) Date of Patent: Jun. 5, 2012

(54) IMAGE FORMING APPARATUS

(75) Inventors: Takayuki Andoh, Kawasaki (JP);
Takuji Takahashi, Yokohama (JP);
Takamasa Shiraki, Yokohama (JP);
Yoshihide Ohta, Sagamihara (JP); Kohji Hatayama, Ebina (JP); Kazushige Kawamura, Sagamihara (JP); Tetsuya Fujioka, Yokohama (JP); Masato Ogawa, Sagamihara (JP); Taku Kudoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 929 days.

(21) Appl. No.: 12/232,100

(22) Filed: Sep. 10, 2008

(65) Prior Publication Data

US 2009/0122330 A1    May 14, 2009

(30) Foreign Application Priority Data

Sep. 14, 2007  (JP) ................. 2007-239720
Nov. 20, 2007  (JP) ................. 2007-300383
May 21, 2008  (JP) ................. 2008-133081

(51) Int. Cl.
*G06F 3/12*  (2006.01)
*G03G 15/00*  (2006.01)
(52) U.S. Cl. ............ 358/1.1; 399/380; 399/379
(58) Field of Classification Search .......... 358/474, 358/1.1; 399/361, 362, 380, 379; 271/264, 271/273, 242; 439/372
See application file for complete search history.

(56) References Cited

U.S. PATENT DOCUMENTS

| | | | |
|---|---|---|---|
| 4,131,348 A | 12/1978 | Hofmann et al. | |
| 5,297,376 A | 3/1994 | Taguchi et al. | |
| 5,392,100 A | 2/1995 | Yoshida | |
| 5,431,389 A * | 7/1995 | Wensink et al. | 271/273 |
| 5,579,909 A | 12/1996 | Deal | |
| 5,715,071 A | 2/1998 | Takashimizu et al. | |
| 5,816,569 A | 10/1998 | Hoshi et al. | |
| 6,118,962 A | 9/2000 | Casper et al. | |
| 6,351,624 B1 | 2/2002 | Hiruta | |
| 6,690,901 B2 | 2/2004 | Katsuyama et al. | |
| 6,902,421 B1 * | 6/2005 | Huang | 439/372 |
| 7,050,204 B1 | 5/2006 | Sato et al. | |
| 7,149,011 B2 | 12/2006 | Kawamura et al. | |
| 7,192,209 B2 | 3/2007 | Otsuka et al. | |
| 7,347,318 B2 | 3/2008 | Kato | |
| 7,377,705 B2 | 5/2008 | Karaki et al. | |
| 7,483,653 B2 | 1/2009 | Maruno | |

(Continued)

FOREIGN PATENT DOCUMENTS

JP       04-53988       5/1992

(Continued)

OTHER PUBLICATIONS

Office Action for co-pending U.S. Appl. No. 12/010,262 dated Mar. 8, 2011.

(Continued)

*Primary Examiner* — Jerome Grant, II
(74) *Attorney, Agent, or Firm* — Harness, Dickey & Pierce, P.L.C.

(57) ABSTRACT

An image forming apparatus includes an apparatus body, a cover section, an image reading device including a document hold member and a document hold member cover, and a lock mechanism. When the document hold member cover is not in close contact with the document hold member, the lock mechanism prevents opening of the cover section or sliding of the image reading device.

17 Claims, 53 Drawing Sheets

U.S. PATENT DOCUMENTS

| | | |
|---|---|---|
| 7,536,148 B2 | 5/2009 | Fukumura |
| 7,553,012 B2 | 6/2009 | Kozaki et al. |
| 7,609,420 B2 | 10/2009 | Horaguchi |
| 7,722,033 B2 | 5/2010 | Matsumoto et al. |
| 2001/0019418 A1 | 9/2001 | Kataoka et al. |
| 2002/0044305 A1 | 4/2002 | Kawai et al. |
| 2002/0054382 A1 | 5/2002 | Nanno |
| 2002/0061206 A1 | 5/2002 | Enomoto et al. |
| 2002/0150403 A1 | 10/2002 | Katsuyama et al. |
| 2006/0070729 A1 | 4/2006 | Auchter et al. |
| 2006/0088336 A1 | 4/2006 | Hirose et al. |
| 2006/0103068 A1* | 5/2006 | Sekiya ............... 271/264 |
| 2006/0146375 A1 | 7/2006 | Baek |
| 2007/0001382 A1 | 1/2007 | Matsumoto et al. |
| 2007/0002396 A1 | 1/2007 | Naruse |
| 2007/0009310 A1 | 1/2007 | Kato |
| 2007/0022402 A1 | 1/2007 | Ye et al. |
| 2007/0127962 A1 | 6/2007 | Fukumura |
| 2007/0154241 A1 | 7/2007 | Maruno |
| 2007/0165084 A1 | 7/2007 | Yano |
| 2007/0229623 A1 | 10/2007 | Kawamura |
| 2007/0279888 A1 | 12/2007 | Nanno et al. |
| 2008/0174067 A1 | 7/2008 | Gilbertson |
| 2008/0180762 A1 | 7/2008 | Andoh et al. |
| 2009/0021797 A1* | 1/2009 | Luciano ............... 358/474 |
| 2009/0041481 A1 | 2/2009 | Iida et al. |
| 2009/0297210 A1 | 12/2009 | Matsumoto |
| 2011/0072989 A1 | 3/2011 | Ochiai et al. |

FOREIGN PATENT DOCUMENTS

| | | |
|---|---|---|
| JP | 04-143771 | 5/1992 |
| JP | 05-045948 | 2/1993 |
| JP | 05-197225 | 8/1993 |
| JP | 05-219308 | 8/1993 |
| JP | 05-330713 | 12/1993 |
| JP | 08-099749 | 4/1996 |
| JP | 10-063053 | 3/1998 |
| JP | 10-290311 | 10/1998 |
| JP | 10-301349 | 11/1998 |
| JP | 11-038714 | 2/1999 |
| JP | 11-038716 | 2/1999 |
| JP | 2001-022143 | 1/2001 |
| JP | 3176411 | 4/2001 |
| JP | 2001-230895 | 8/2001 |
| JP | 2001-343880 | 12/2001 |
| JP | 2002-354173 | 6/2002 |
| JP | 2002-361975 | 12/2002 |
| JP | 2002-365742 | 12/2002 |
| JP | 2002-365864 | 12/2002 |
| JP | 2003-058019 | 2/2003 |
| JP | 2004-045906 | 2/2004 |
| JP | 2004-109755 | 4/2004 |
| JP | 2004-264500 | 9/2004 |
| JP | 2004-279691 | 10/2004 |
| JP | 2004-354832 | 12/2004 |
| JP | 2005-020374 | 1/2005 |
| JP | 3644376 | 2/2005 |
| JP | 2005-167801 | 6/2005 |
| JP | 2005-182032 | 7/2005 |
| JP | 2005-242267 | 9/2005 |
| JP | 2005-301154 | 10/2005 |
| JP | 2006-065188 | 3/2006 |
| JP | 2006-089165 | 4/2006 |
| JP | 2006-119236 | 5/2006 |
| JP | 2006-119474 | 5/2006 |
| JP | 2006-184530 | 7/2006 |
| JP | 2006-208910 | 8/2006 |
| JP | 2006-227064 | 8/2006 |
| JP | 2006-240848 | 9/2006 |
| JP | 2006-276620 | 10/2006 |
| JP | 2006-279877 | 10/2006 |
| JP | 2006-330356 | 12/2006 |

OTHER PUBLICATIONS

Notice of Allowance for copending U.S. Appl. No. 12/010,262 dated Jul. 13, 2011.
Notice of Allowance for copending U.S. Appl. No. 12/010,896 dated Aug. 4, 2011.
Abstract of JP 2001-242563 published Sep. 7, 2001.
Abstract of JP 05-219308 published Aug. 27, 1993.
Notice of Allowance for copending U.S. Appl. No. 12/010,262 dated Aug. 30, 2011.
Notice of Allowance for copending U.S. Appl. No. 12/010,896 dated Sep. 8, 2011.
Office Action for co-pending U.S. Appl. No. 12/010,896 dated Mar. 9, 2011.

* cited by examiner

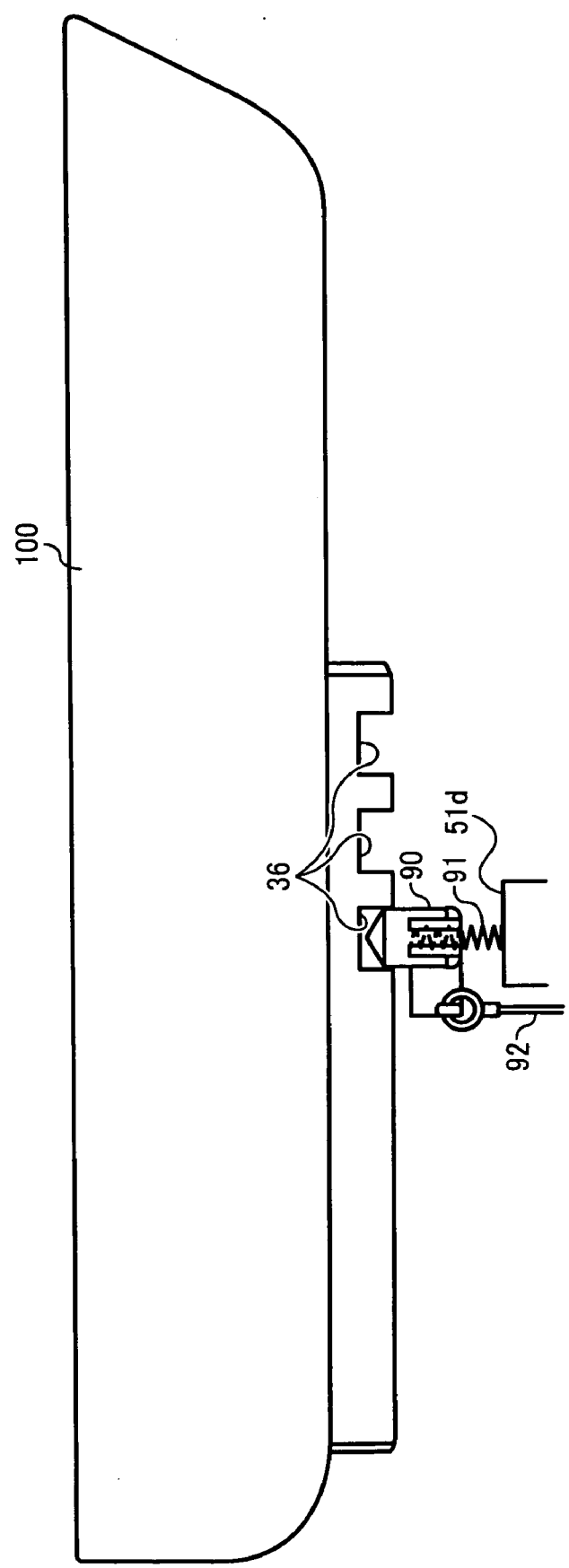

IMAGE FORMING APPARATUS

CROSS-REFERENCE TO RELATED APPLICATIONS

This patent application is based on and claims priority under 35 U.S.C. §119 to Japanese Patent Application Nos. 2007-239720 filed on Sep. 14, 2007, 2007-300383 filed on Nov. 20, 2007, and 2008-133081 filed on May 21, 2008, in the Japanese Patent Office, the disclosure of which is hereby incorporated herein by reference.

FIELD OF THE INVENTION

The present invention relates generally to an image forming apparatus such as a copier, facsimile, printer, or multi-functional apparatus, and more specifically to an image forming apparatus of in-body discharge type.

BACKGROUND

An image forming apparatus having an image reading device, which is provided above a top surface of an apparatus body, is known as an image forming apparatus of in-body discharge type. In such image forming apparatus, a cover section is provided so as to function as the top surface of the apparatus body to cover the inside of the apparatus body. Further, a support section is provided between the cover section and the image reading device so as to support and keep the image reading device at the location above the cover section.

In order to allow an operator to easily access the inside of the apparatus body, the cover section is rotatably provided on the apparatus body. When needed, the cover section rotates around a rotational shaft attached to a rear section of the apparatus body to be away from a front side of the apparatus body facing the operator, and the inside section of the apparatus body is exposed to the operator. Further, an exposure glass cover of the image reading device rotates about a rotational shaft having the same rotational axis with the rotational shaft attached to the rear section of the apparatus body. For this reason, if the operator opens the cover section while the exposure glass cover is open, the exposure glass cover may be widely opened due to gravity such that the exposure glass cover may hit an object located near the apparatus.

Japanese Patent No. 3644376 describes an image forming apparatus having a lock mechanism, which prevents the exposure glass cover and the cover section to be open at the same time.

In addition to making the cover section rotatable to expose the inside of the apparatus body, the image reading device may be caused to slide with respect to the cover section, for example, as described in Japanese Patent No. 3176411. This further improves operability for the operator especially when a printed sheet is discharged onto an output sheet tray provided on the cover section, which is located below the image reading device. However, the image forming apparatus described in Japanese Patent No. 3176411 is not provided with a lock mechanism, which prevents the cover section from opening when the exposure glass cover is open. Even with assumption that the image forming apparatus having the lock mechanism as described in Japanese Patent No. 3644376 is implemented to have the image reading device slidable, the position of the image reading device relative to the apparatus body changes as the image reading device slides. Accordingly, the lock mechanism of Japanese Patent No. 3644376 may not be able to prevent opening of the cover section throughout the entire slidable range of the image reading device.

Further, the image forming apparatus may be provided with a book document, which is thick. In such case, the exposure glass cover may not be in close contact with the exposure glass even when it is closed. When the cover section is open, the exposure glass cover may widely open as described above. In view of this problem, a lock mechanism should be able to prevent opening of the cover section when the exposure glass cover is not in close contact with the exposure glass.

Further, when the image reading device is made slidable as described in Japanese Patent No. 3176411, the image reading device may slide due to gravity with opening of the cover section or the exposure glass cover. This may further cause the image reading device to hit an object located near the apparatus or hit the operator. The image forming apparatus of Japanese Patent No. 3176411, however, is not provided with a lock mechanism that prevents sliding of the image reading device.

SUMMARY

Example embodiments of the present invention include an image forming apparatus including an apparatus body, a cover section provided on the apparatus body, an image reading device provided above the cover section while forming an open space with the cover section, and a lock mechanism. The apparatus body includes an image forming device to form an image on a recording medium. The cover section may close with respect to the apparatus body to function as a top surface of the apparatus body and open with respect to the apparatus body to expose the inside of the apparatus body. The image reading device may slide substantially in parallel with a surface of the cover section, and include a document hold member to place a document thereon and a document hold member cover to be in close contact with the document hold member so as to keep the document onto the document hold member. The lock mechanism includes at least one of a cover lock mechanism and a slide lock mechanism. The cover lock mechanism may prevent opening of the cover section through the slidable range of the image reading device when the document hold member cover is not in close contact with the document hold member. The slide lock mechanism may prevent sliding of the image reading device throughout the slidable range of the image reading device when the document hold member cover is not in close contact with the document hold member.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 15 is, a cross-sectional view illustrating a portion of a slide lock mechanism of the image forming apparatus of FIG. 1, according to an example embodiment of the present invention;

Figure 1:
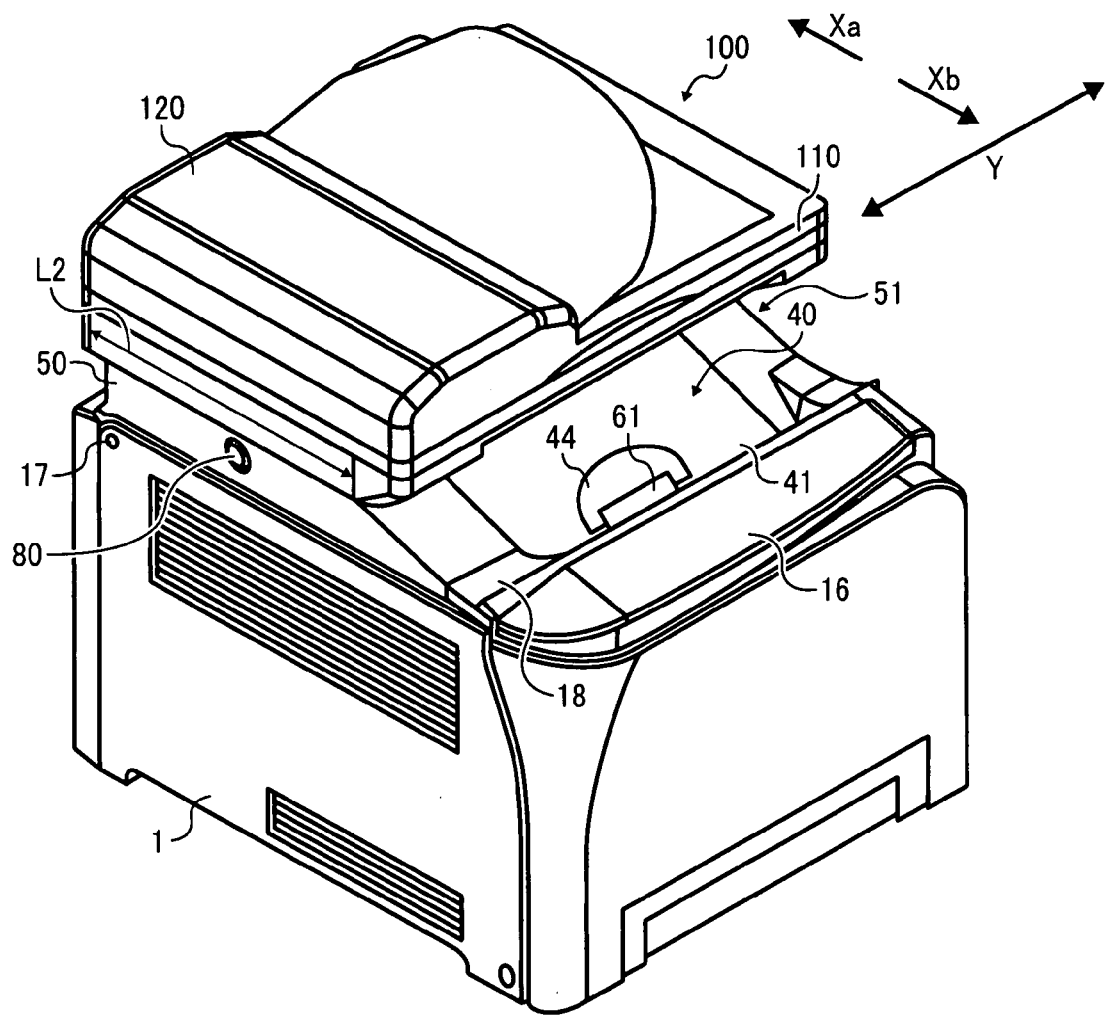
FIG. 1 is a perspective view illustrating an outer appearance of an image forming apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity.

However, the present disclosure is not intended to be limited to the specific terminology so selected and it is to be understood that each specific element includes all technical equivalents that operate in a similar manner.

Referring now to FIG. 1, an example structure of an image forming apparatus is explained according to an example embodiment of the present invention. The image forming apparatus of FIG. 1 mainly includes an apparatus body 1, a cover section 18 functioning as a top surface of the apparatus body 1, a first support section 50 attached to one side of the cover section 18, a second support section 51 attached to one side of the cover section 18, an image reading device 100 provided above the top surface of the apparatus body 1 via the first and second support sections 50 and 51, and an operation panel 16. Further, the cover section 18 is provided with an output sheet tray 40 on which a printed sheet is output.

Further, referring to FIG. 1, Xa corresponds to the direction in which the recording sheet S is output from the apparatus body 1 onto the output sheet tray 40 or the direction in which the image reading device 100 slides from the front side toward the rear side of the apparatus body 1. Xb corresponds to the direction in which the image reading device 100 slides from the rear side toward the front side of the apparatus body 1. For the descriptive purpose, directions Xa and Xb may be collectively referred to as the direction X. Y corresponds to the direction perpendicular to the direction X.

Figure 2:
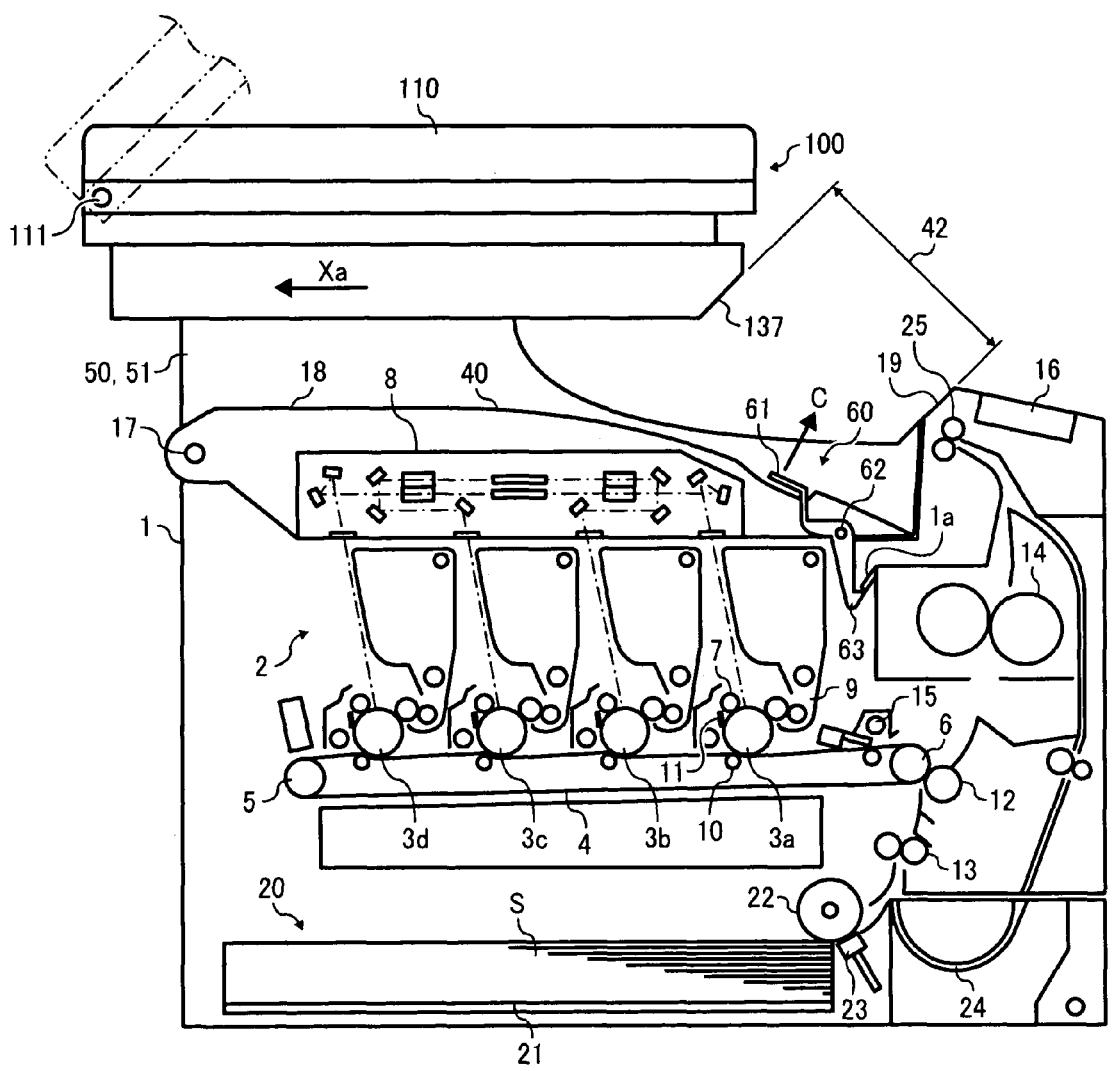
FIG. 2 is a cross-sectional view illustrating a structure of the image forming apparatus shown in FIG. 1, according to an example embodiment of the present invention.

FIG. 2 is a cross-sectional diagram illustrating the structure of the image forming apparatus of FIG. 1. Referring to FIG. 2, the image forming apparatus of FIG. 1 further includes an image forming device 2 provided on a center portion of the apparatus body 1, and a sheed feeding device 20 provided below the image forming device 2.

The image forming device 2 is capable of forming an image on a recording sheet S, which is fed by the sheet feeding device 20. The image forming device 2 includes a plurality of photoconductors 3a, 3b, 3c, and 3d, each of which may function as an image carrier on which a toner image of a specific color is formed. In this example, a toner image of yellow is formed on the surface of the photoconductor 3a. A toner image of cyan is formed on the surface of the photoconductor 3b. A toner image of magenta is formed on the surface of the photoconductor 3c. A toner image of black is formed on the surface of the photoconductor 3d. The photoconductors 3a to 3d are provided in parallel with one another, with a predetermined distance with one another. An intermediate transfer belt 4, which functions as an intermediate transfer body, is provided at a lower portion of the photoconductors 3a to 3d. The intermediate transfer belt 4 is an endless belt, which is supported by support rollers 5 and 6. One of the support rollers 5 and 6 may be implemented by a drive roller, which causes the intermediate transfer belt 4 to rotate in the counterclockwise direction of FIG. 2. Alternatively, an intermediate transfer drum may be used in replace of the intermediate transfer belt 4.

For each one of the photoconductors 3a to 3d, which may be collectively referred to as the photoconductor 3, a plurality of image forming devices may be provided to together perform image forming operation. The plurality of image forming devices mainly includes a charging device 7, a developing device 9, a transfer device 10, and a cleaning device 11. In addition to these devices, a light scanning unit (LSU) 8 is provided on a bottom surface of the cover section 18. The charging device 7 charges the surface of the photoconductor 3. The LSU 8 irradiates a laser light to the surface of the photoconductor 3 according to an image signal received from the image reading device 100. The developing device 9 develops an electrostatic latent image formed on the surface of the photoconductor 3 into a toner image. The transfer device 10, which is provided so as to face the photoconductor 3 via the intermediate transfer belt 4, causes the toner image to transfer from the surface of the photoconductor 3 to the intermediate transfer belt 4. The cleaning device 11 removes and collects residual toner left on the surface of the photoconductor 3 after the toner image is transferred.

In image forming operation, the photoconductor 3 is rotated in the clockwise direction. As it rotates, the surface of the photoconductor 3 is uniformly charged by the charging device 7 to be in a predetermined polarity. The LSU 8 irradiates a laser light, which is modulated according to the image signal received from the image reading device 100, to the surface of the photoconductor 3 to form an electrostatic latent image on the surface of the photoconductor 3. The latent image formed on the surface of the photoconductor 3 is developed into the toner image by the developing device 9. The toner image is transferred to the surface of the intermediate transfer belt 4 by the transfer device 10.

The above-described image forming operation is performed for each one of the photoconductors 3a to 3d such that the yellow toner image, the cyan toner image, the magenta toner image, and the black toner image are respectively formed and sequentially transferred onto the intermediate transfer belt 4 to form a composite image.

Still referring to FIG. 2, the sheet feeding device 20 mainly includes a sheet tray 21, a sheet feeding roller 22, a friction pad 23, and a sheet feeding path 24. The sheet tray 21 stores a stack of recording sheets S, which may be made of paper or resin film, for example. The sheet feeding roller 22 feeds the recoding sheet S from the sheet tray 21. The friction pad 23 may function as a separator, which separates the stack of recording sheets S one by one. The sheet feeding path 24 is provided, which allows the image to be formed on both sides of the recording sheet S.

The recording sheet S, which is fed from the sheet feeding device 20, is sent to a registration roller pair 13. When the leading edge of the recording sheet S contacts the registration roller pair 13, which is not rotated, the registration roller pair 13 is caused to rotate to transfer the recording sheet S to a secondary transfer roller 12 at a predetermined timing. The secondary transfer roller 12 is provided so as to oppose the support roller 6 via the intermediate transfer belt 4. The recording sheet S is managed to be at a nip formed between the secondary transfer roller 12 and the support roller 6 so as to receive the composite image carried by the intermediate transfer belt 4.

The recording sheet S, on which the composite image is formed, is sent to a fixing device 14. The fixing device 14 fixes the image onto the recording sheet S, for example, by heat and pressure. The recording sheet S having the fixed image thereon is output onto the output sheet tray 40 via a sheet discharging device 25. In this example, the sheet discharging device 25 is provided near a front side of the image forming apparatus of FIG. 1, while the output sheet tray 40 is provided on the top surface of the apparatus body 1 at a position slightly away from the front side of the image forming apparatus of FIG. 1. With this structure, the recording sheet S is output onto a top surface 41 of the output sheet tray 40 in the direction from a front section toward a rear section of the image forming apparatus of FIG. 1. After the image is transferred from the intermediate transfer belt 4 to the recording sheet S, a belt cleaning device 15, which is provided near a portion of the intermediate transfer belt 4, removes residual toner from the surface of the intermediate transfer belt 4.

Figure 26:
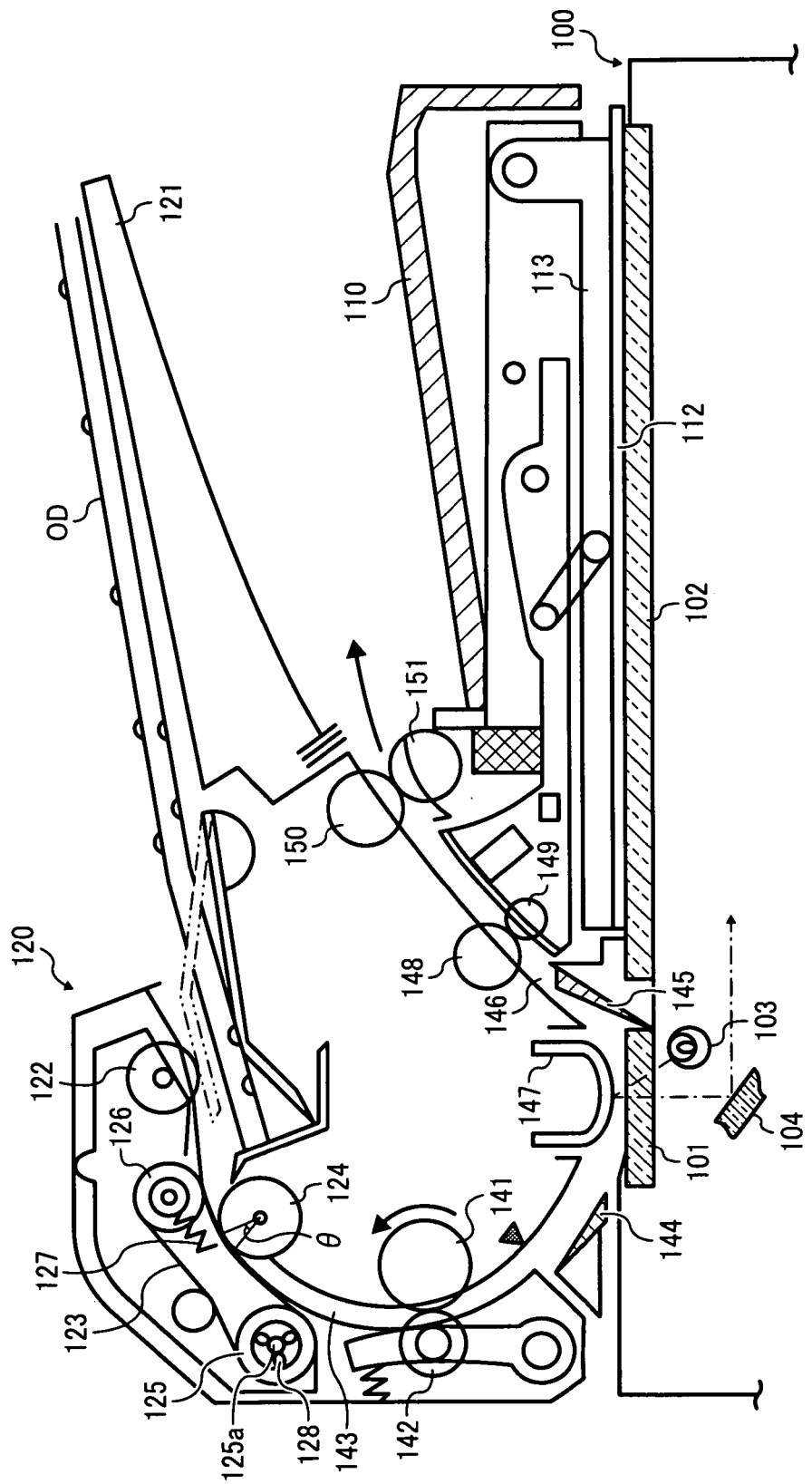
FIG. 26 is a cross sectional view illustrating a structure of the image reading device of the image forming apparatus shown in FIG. 1, according to an example embodiment of the present invention.

Referring to FIGS. 1 and 2, the image reading device 100 mainly includes an exposure glass cover 110, an automatic document feeder (ADF) 120, and other devices as described below referring to FIG. 26. As illustrated in FIG. 26, the exposure glass cover 110 is rotatably provided on the image reading device 100 so as to be open or closed with respect to a surface of the image reading device 100 where an exposure glass 102 (FIG. 27) is provided. When it is closed, the exposure glass cover 110 keeps an original document onto the exposure glass 102 by closely contacting the exposure glass cover 102. Based on this function, the exposure glass 102 may be referred to as a document hold member, while the exposure glass cover 110 may be referred to as a document hold member cover. The ADF 120, which is integrally provided with the exposure glass cover 110, may be opened or closed together with opening or closing of the exposure glass cover 110. Alternatively, the ADF 120 may not be provided on the image reading device 100. For this reason, the ADF 120 may be omitted from some of the drawings described below.

Referring to FIG. 26, an example structure of the image reading device 100 is explained according to an example embodiment of the present invention. The image reading device 100 includes a slit glass 101 and the exposure glass 102. Below the slit glass 101 and the exposure glass 102, an optical scanning module 130 (FIG. 31) including an exposure lamp 103 and a first mirror 104 is provided. In order to read an original document placed on the exposure glass 102, the optical scanning module 130 including the exposure lamp 103 and the first mirror 104 moves in the horizontal direction indicated by the arrow of FIG. 26. For example, in order to read the original document at the position where the slit glass 101 is provided, the exposure glass 103 and the first mirror 104 are moved to the position below the slit glass 101. After the exposure lamp 103 irradiates a light toward the surface of the original document, the light reflected from the surface is reflected through a reflector, such as the first mirror 104, toward an imaging device such as a charged coupled device (CCD).

Figure 27:
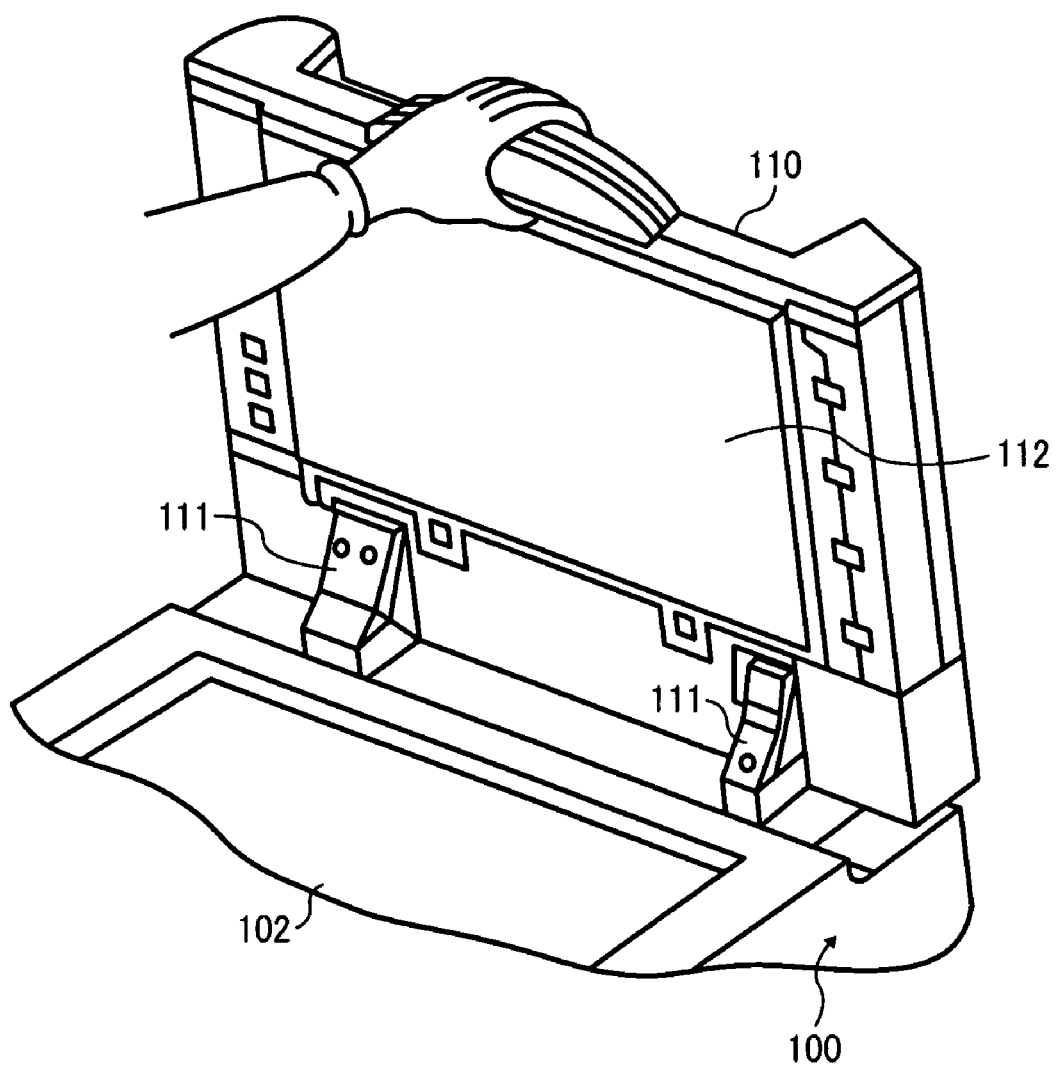
FIG. 27 is a perspective view illustrating a portion of the image reading device of the image forming apparatus shown in FIG. 1, when an exposure glass cover of the image reading device is open, according to an example embodiment of the present invention.

Below the exposure glass cover 110, a reflector 112 is provided so as to hold the original document provided on the exposure glass 102. The reflector 112 may function as a white board, which is used to correct the color of the image data of the original document. Further, the reflector 112 is integrally provided with the exposure glass cover 110 so as to function as the bottom surface of the exposure glass cover 110. As illustrated in FIG. 27, the exposure glass cover 110 is rotatably provided on the image reading device 100 through a hinge 111, such that the exposure glass cover 110 is rotatable around the hinge 111.

Referring to FIG. 26, the ADF 120 mounted on the exposure glass cover 110 is provided with a document tray 121, on which a stack of one or more original document sheets ("document stack OD") may be placed. When a feed roller 122 detects the document stack OD being placed on the document tray 121, the feed roller 122 feeds the document stack OD toward a separator such as a separation belt 123 and a separation roller 124.

The separation belt 123 pressure contacts the separation roller 124 at a desired angle θ. The separation belt 123 is wound around a drive roller 125 and a driven roller 126. The driven roller 126 is exerted with a bias force applied by a spring 127 so as to cause the separation belt 123 to be stretched. Between the drive roller 125 and a shaft 125a, one way clutch 128 is provided so as to cause the drive roller 125 to rotate in the clockwise direction of FIG. 26. The separation roller 124 is rotated in the clockwise direction so as to separate one original document sheet of the document stack OD from the rest of the original document sheets of the document stack OD, which is placed between the separation belt 123 and the separation roller 124. The recording sheet separated by the separator is transferred by a first transfer roller 141 and a driven roller 142 along a reverse path 143 toward the slit glass 101. A reverse path guide 144 may be provided so as to guide the original document sheet toward the slit glass 101. After being transferred to the slit glass 101, the original document sheet is guided by a discharge path guide 145 to be transferred toward a discharge path 146. Above the slit glass 101, a reflector guide plate 147 is provided, which may function as a white board that is used to correct the color of the image data of the original document.

The original document sheet being transferred through the discharge path 146 is transferred by a second transfer roller 148 and a driven roller 149, and output by a discharge roller 150 and a driven roller 151 onto the exposure glass cover 110. The image reading device 100 may further include a pressure plate 113 above the reflector 112. With the pressure plate 113, the original document sheet being placed on the exposure glass 102 is pressed against the exposure glass 102. The pressure plate 113 may be integrally formed with the exposure glass cover 110.

In one example operation, when a start button provided on the operation panel 16 is pressed after placing the document stack OD on the document tray 121, the document stack OD is pushed against the feed roller 122 to be fed by the feed roller 122 toward the separation belt 123. After the document stack OD is separated, one by one, by the separator such as the separation belt 123 and the separation roller 124, the original document sheet is transferred by the first transfer roller 141 and the driven roller 142 along the reverse path 143 toward the slit glass 101. At the slit glass 101, the original document sheet is read by the image reading device 100, such as by the exposure lamp 103, the first mirror 104, and the CCD, etc. After being read, the original document sheet is transferred by the second transfer roller 148 and the driven roller 149 along the discharge path 146, and output by the discharge roller 150 and the driven roller 151 onto the exposure glass cover 110.

In another example operation, when the start button of the operation panel 16 is pressed after placing the document stack OD on the exposure glass 102, the optical scanning module 130 (FIG. 31) is activated to cause the exposure lamp 103 and the first mirror 104 to scan the surface of the original document sheet.

Figure 25:
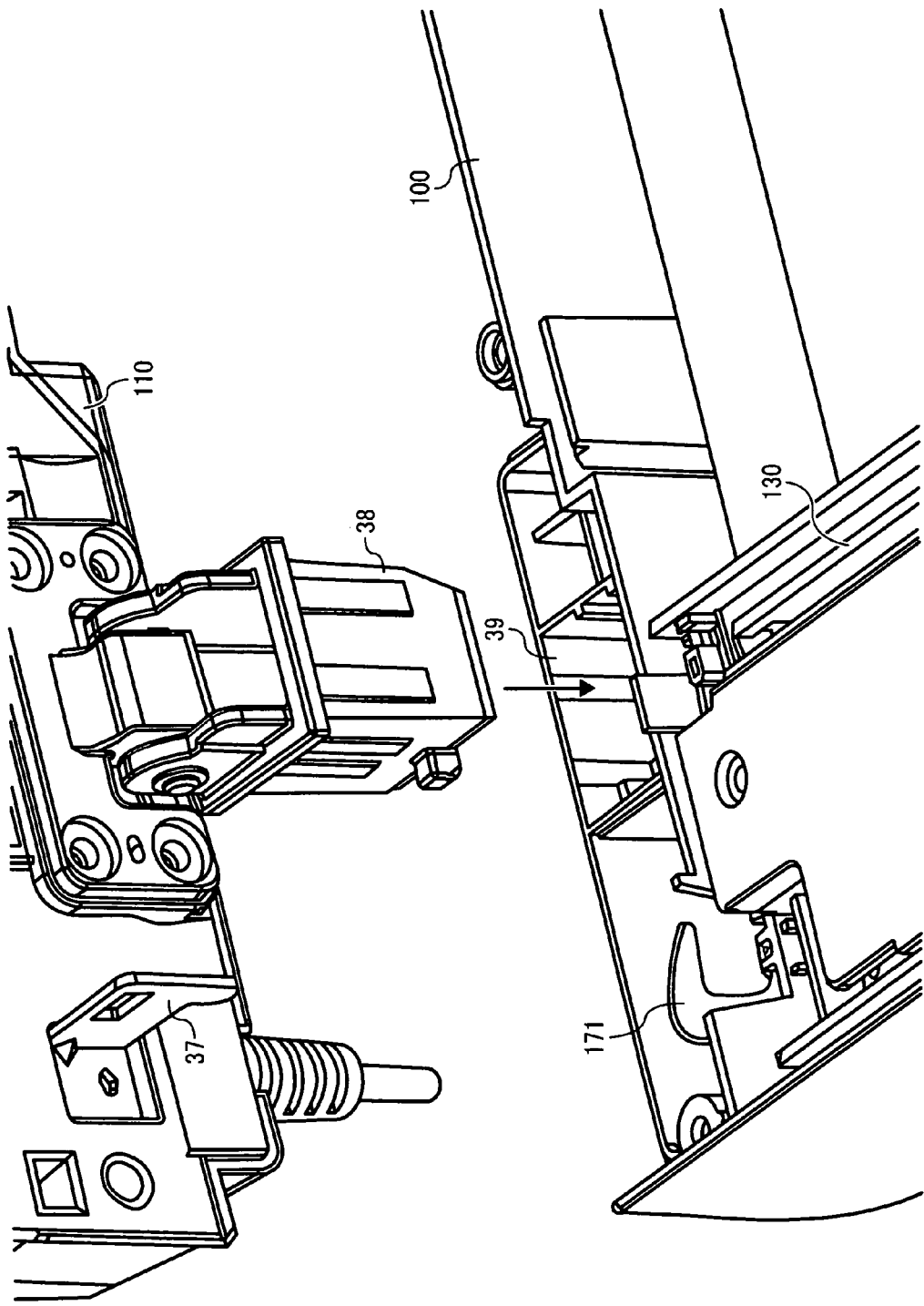
FIG. 25 is a perspective view illustrating a portion of the exposure glass cover of the image forming apparatus shown in FIG. 1, according to an example embodiment of the present invention.

In this example, the document stack OD preferably includes one original document sheet. Alternatively, the document stack OD may be a book document BO such as a book or a magazine, as described below referring to FIG. 18 or 57. When the book document BO is provided on the exposure glass 120, the exposure glass cover 110 may not be able to sufficiently press the book BO against the exposure glass 120. To solve this problem, as illustrated in FIG. 25, the exposure glass cover 110 may be formed so as to be able to move in the direction substantially parallel to the surface of the exposure glass 120 by providing a hinge section 38. The hinge section 38 of the exposure glass cover 110 is inserted through a hole 39 of the image reading device 100. When the book document BO is provided, the hinge section 38 may move upward or downward in the direction substantially parallel to the surface of the exposure glass 120 within the hole 39.

Referring to FIGS. 1 and 2, the image forming apparatus of FIG. 1 further includes the operation panel 16, which allows the operator to operate the image forming apparatus of FIG. 1. The operation panel 16 is provided near the front side of the apparatus body 1. Further, an operation lever 61, which is described below, is provided on the cover section 18 near the operation panel 16.

Referring to FIGS. 1 and 2, the image forming apparatus of FIG. 1 includes the cover section 18, which is provided on the top surface of the apparatus body 1. The cover section 18 may be implemented by a cover or a frame, which covers the inner section of the apparatus body 1 in which a plurality of devices such as the image forming device 2 is incorporated. In this example, an upper portion of the cover section 18 functions as the output sheet tray 40. Further, referring to FIG. 1, the first support section 50 and the second support section 51 are respectively provided on the left side and the right side of the apparatus body 1 with respect to the front side of the apparatus body 1. With the first and second support sections 50 and 51, the image reading device 100 is supported and kept at a position above the top surface of the cover section 18 having the output sheet tray 40.

With this structure, which is one of the characteristics of an image forming apparatus of in-body discharge type, the operator may not easily see the surface 41 of the output sheet tray 40 or access a recording sheet placed on the surface 41. In order to improve visibility, in this example, the apparatus body 1 is not provided with any support section at the rear side away from the front side of the apparatus body 1. This may allow the light to enter into the output sheet tray 40 through an open space provided between the image reading device 100 and the cover section 18, thus causing the output sheet tray 40 to receive more light. Further, with this structure, even when the recording sheet S output onto the output sheet tray 40 has a size larger in the sheet discharge direction Xa than the size of the apparatus body 1, the recording sheet S output onto the output sheet tray 40 is not bent as there is no side wall at the rear section to block the leading edge of the recording sheet S.

In order to improve accessibility to the output sheet tray 40, referring to FIG. 2, the cover section 18 is provided with a front opening section 42, which corresponds to a space formed between the output sheet tray 40 and the image reading device 100. With this front opening section 42, the operator may be able to reach the recording sheet S more easily.

In order to increase the space provided by the opening section 42, as illustrated in FIG. 2, the image reading device 100 may be provided with a first tapered section 137 and the apparatus body 1 may be provided with a second tapered section 19 above the operation panel 16. Either one of the first tapered section 137 and the second tapered section 19 may have a shape other than the tapered shape. For example, either one of the first tapered section 137 and the second tapered section 19 may be formed with a curved surface that causes the opening section 42 to increase its size as it extends towards the operator. With this structure, the operator may easily reach the recording sheet S placed on the output sheet tray 40.

Further, the image forming device 2 and the image reading device 100 are arranged such that the sheet discharge direction, which is the direction Xa, and the sub-scanning direction of the image reading device 100 are made perpendicular with each other. As illustrated in FIG. 2, the front side of the apparatus body 1 has a section that protrudes with respect to the support sections 50 and 51, on which the operation panel 16 is provided. With this structure, the space of the front opening section 42 increases, thus further improving operability of the operation panel 16 or accessibility to the output sheet tray 40.

While the increased size of the front opening section 42 is desirable, the size of the front opening section 42 may decrease as the image forming apparatus of FIG. 1 decreases in size, such as in height and depth. For example, if the back side of the image reading device 100 is arranged so as to align with the back side of the apparatus body 1 to make the size of the image forming apparatus smaller, the front opening section 42 may decrease in size. In such case, the operator may hardly reach the recording sheet S on the output sheet tray 40. Further, accessibility to the output sheet tray 40 may vary among operators, for example, depending on the size of the hand of the operator. In order to improve operability, the space provided by the front opening section 42 may be adjusted by sliding the image reading device 100 in the direction X of FIG. 1, for example. When the image reading device 100 slides toward the rear side of the apparatus body 1 in the direction Xa, the output sheet tray 40 is exposed to the operator with more space.

Figure 28:
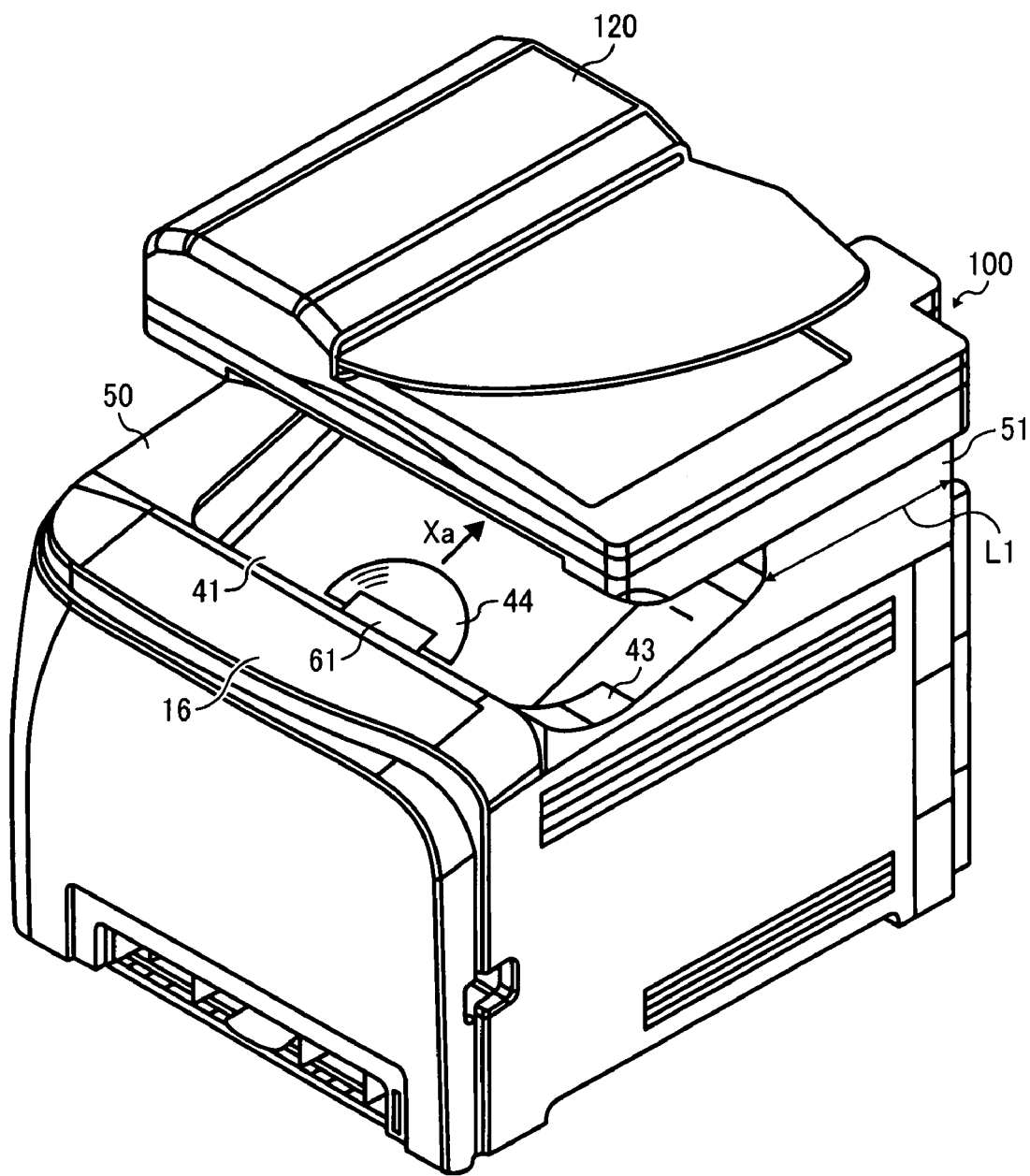
FIG. 28 is a perspective view illustrating an outer appearance of the image forming apparatus of FIG. 1, viewed from the upper right, according to an example embodiment of the present invention.
Figure 29:
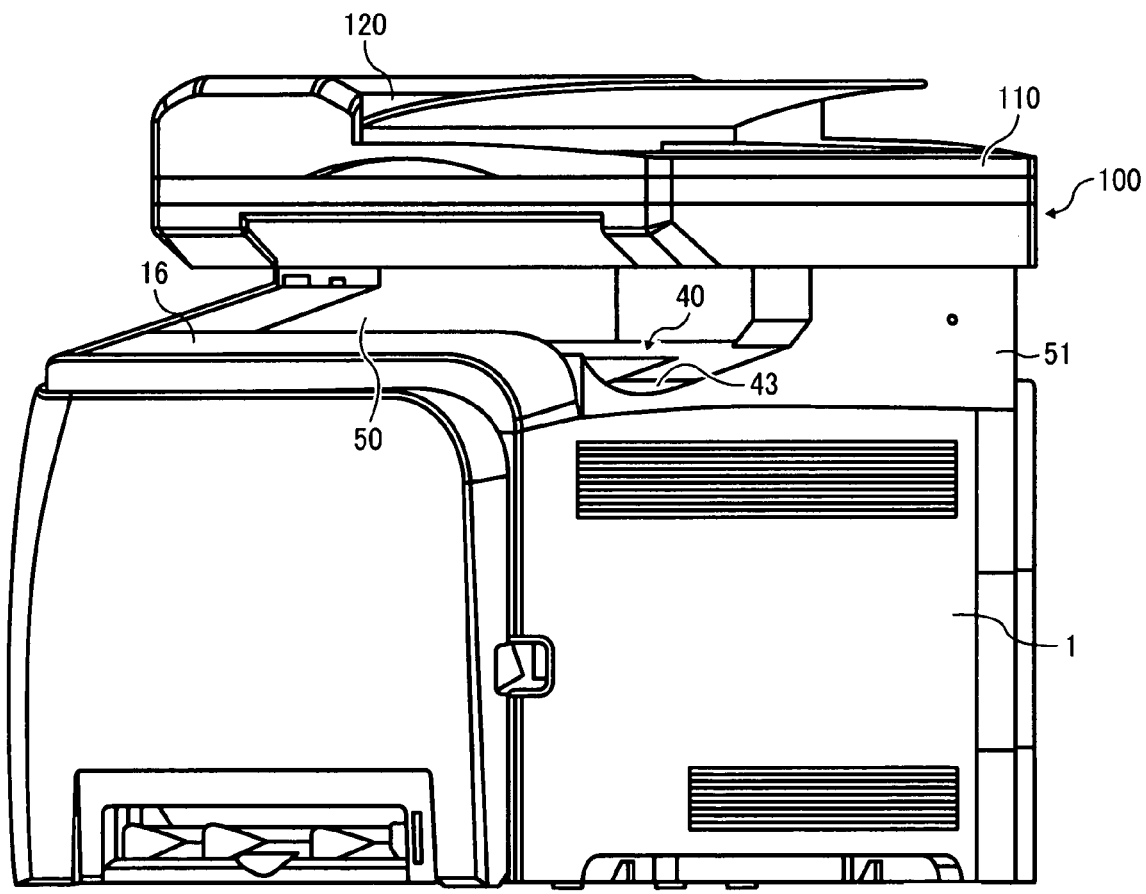
FIG. 29 is a perspective view illustrating an outer appearance of the image forming apparatus of FIG. 1, viewed from the right, according to an example embodiment of the present invention.

In order to improve accessibility to the output sheet tray 40, in another example as illustrated in FIGS. 28 and 29, the support section 51 may additionally include a cut section 43 near a right portion of the output sheet tray 40. Further, in this example, when viewed from the front side of the apparatus body 1, the length L1 of the support section 51 in the direction X is made less than the length L2 (FIG. 1) of the support section 50 in the direction X, due to the presence of the cut section 43. With this structure, a surface of the support section 51 that corresponds to the cut section 43 becomes lower than the surface of the output sheet tray 40 such that the operator may easily reach the recording sheet S placed on the output sheet tray 40 through the cut section 43. Further, more light may enter into the output sheet tray 40 through the cut section 43.

Figure 30:
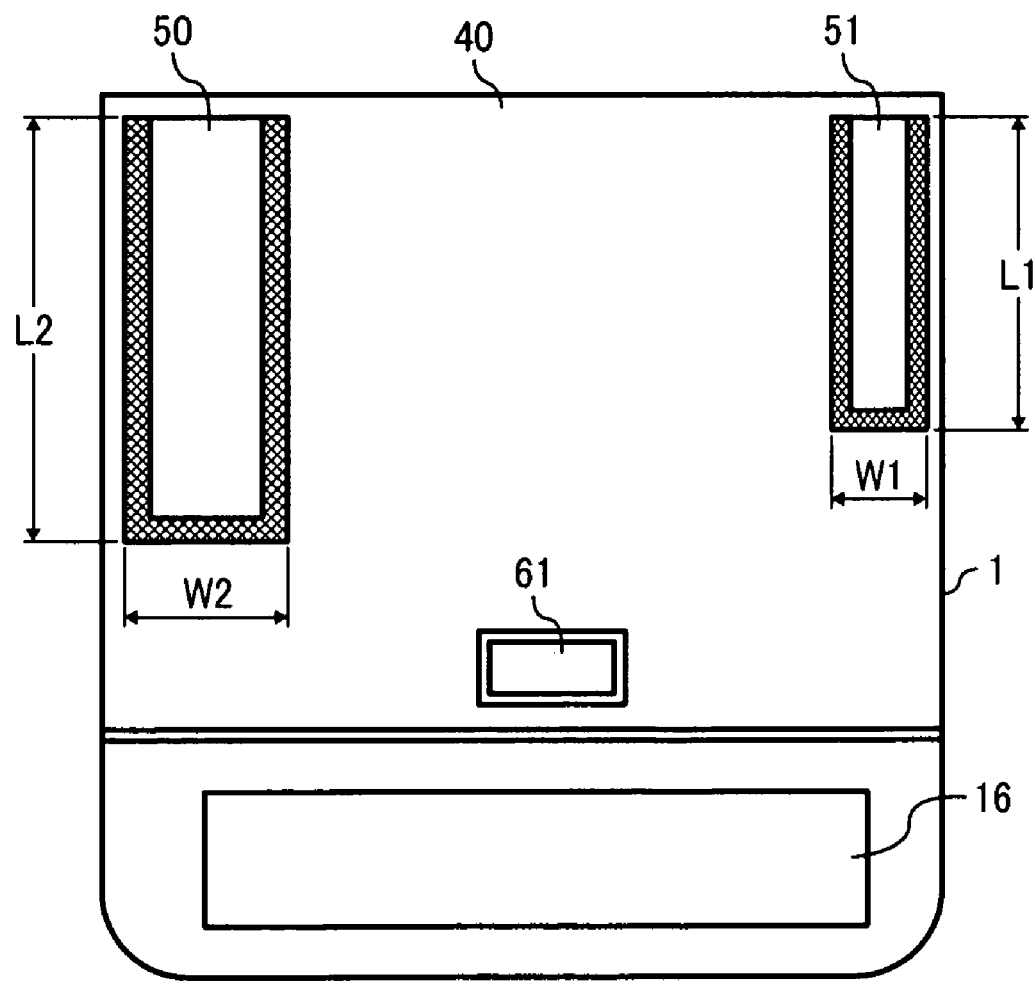
FIG. 30 is a plan view illustrating support sections provided on the image forming apparatus of FIG. 1, according to an example embodiment of the present invention.

Further, as illustrated in FIG. 30, the width W1 of the support section 51 in the direction Y may be made less than the width W2 of the support section 50 to allow the operator to easily access the output sheet tray 40.

Alternatively, the cut section 43 may be provided on the support section 50. However, in such case, the length L1 and the width W1 of the support section 51 should be considered so as to compensate the decrease in the length L2 and the width W2 of the support section 50 due to the cut section provided on the support section 50. More specifically, the length L1 and the width W1 may need to be adjusted so as to provide enough strength to support the image reading device 100, which tends to have more weight at the left side due to the ADF 120, if the ADF 120 is provided.

Further, in this example, the cover section 18 is rotatably provided on the apparatus body 1 so as to expose the inside of the apparatus body 1. Referring to FIGS. 1 and 2, the cover section 18 is provided with a support shaft 17, which connects the cover section 18 at the rear side of the apparatus body 1. The cover section 18 rotates about an axis of the support shaft 17 in the direction A indicated by the arrow in FIG. 3. When the cover section 18 is open as illustrated in FIG. 3, the image reading device 100 and the LSU 8 are rotated together with the rotation of the cover section 18 to allow the operator to easily access the inner side of the apparatus body 1.

Figure 54:
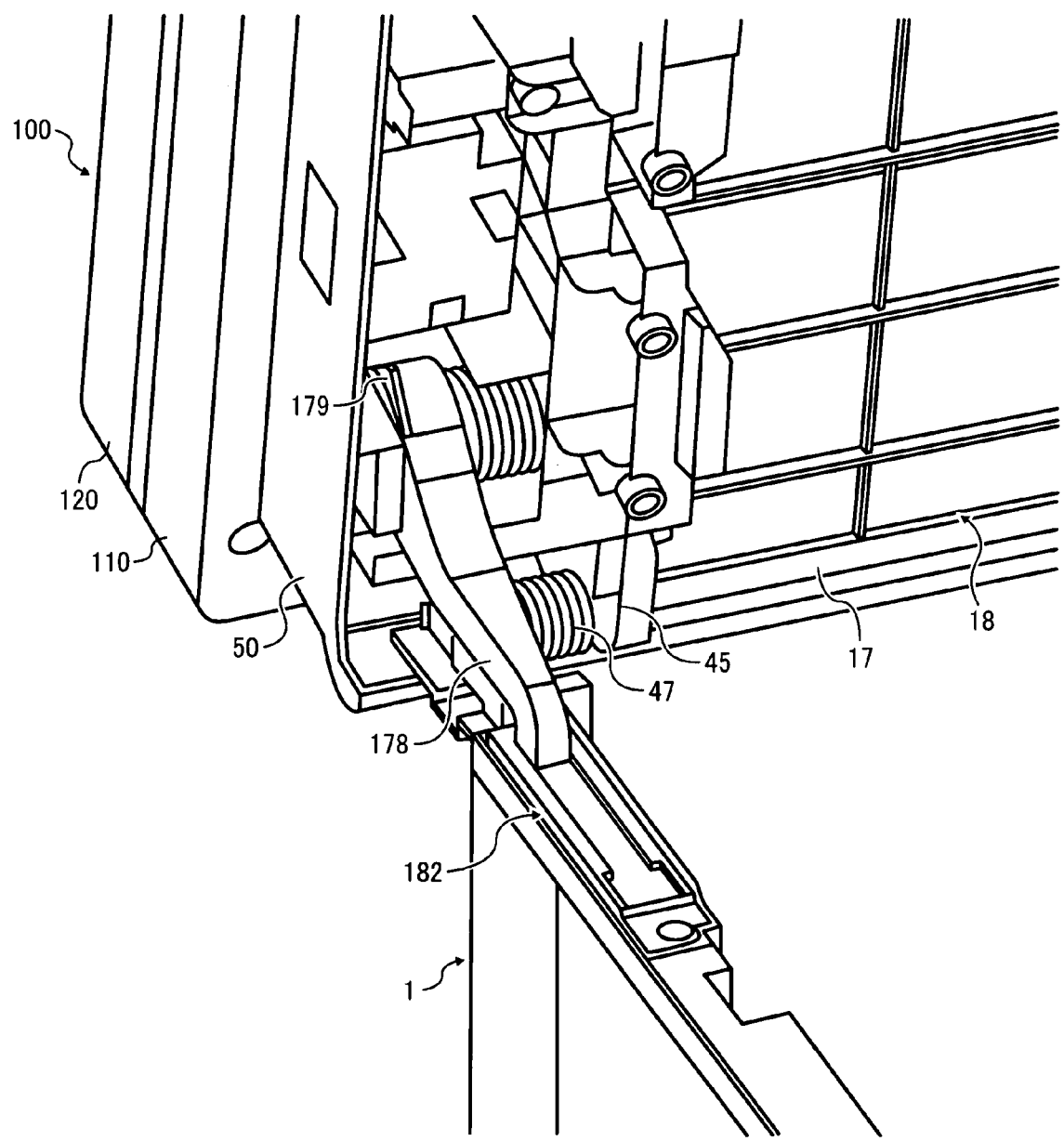
FIG. 54 is a perspective view illustrating an enlarged section of a left side portion of the image forming apparatus of FIG. 1, according to an example embodiment of the present invention.
Figure 55:
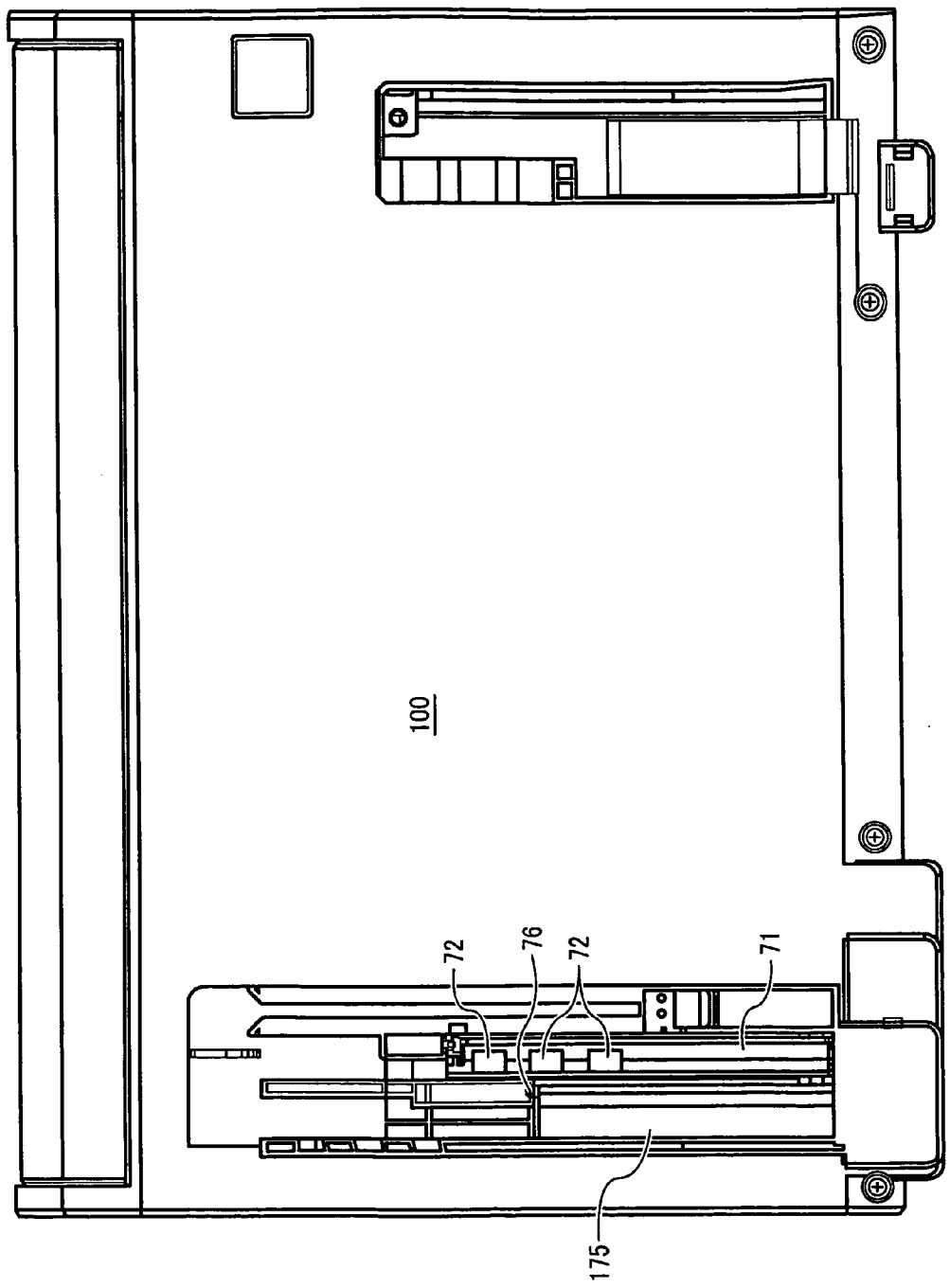
FIG. 55 is a plan view illustrating the back side of the image reading device of the image forming apparatus of FIG. 1, according to an example embodiment of the present invention.

FIG. 54 illustrates a left side portion of the apparatus body 1 viewed from the front side of the apparatus body 1 when the cover section 18 is open. The cover section 18 further includes a pair of right and left upper frames 45 at the sides of the OSU 8. For the left upper frame 45 illustrated in FIG. 54, the support shaft 17 is inserted through the right and left upper frames 45 so as to be attached to the back side of the apparatus body 1. With this structure, an upper structure 26, which includes the cover section 18 and the image reading device 100, is rotatable around the support shaft 17 to open or close with respect to the apparatus body 1. When the upper structure 26 is rotated with an angle exceeding a reverse angle, the upper structure 26 receives momentum in the reverse direction due to gravity so as to open to expose the inside of the apparatus body 1 as illustrated in FIG. 3. Further, the support shaft 17 includes one end that is attached to the apparatus body 1, and the other end that is attached to the upper structure 26. For each end, a rotary shaft spring 47, which may be implemented by a torsion spring, is provided so as to apply a bias force to cause the support shaft 17 to move in the direction upward.

Figure 3:
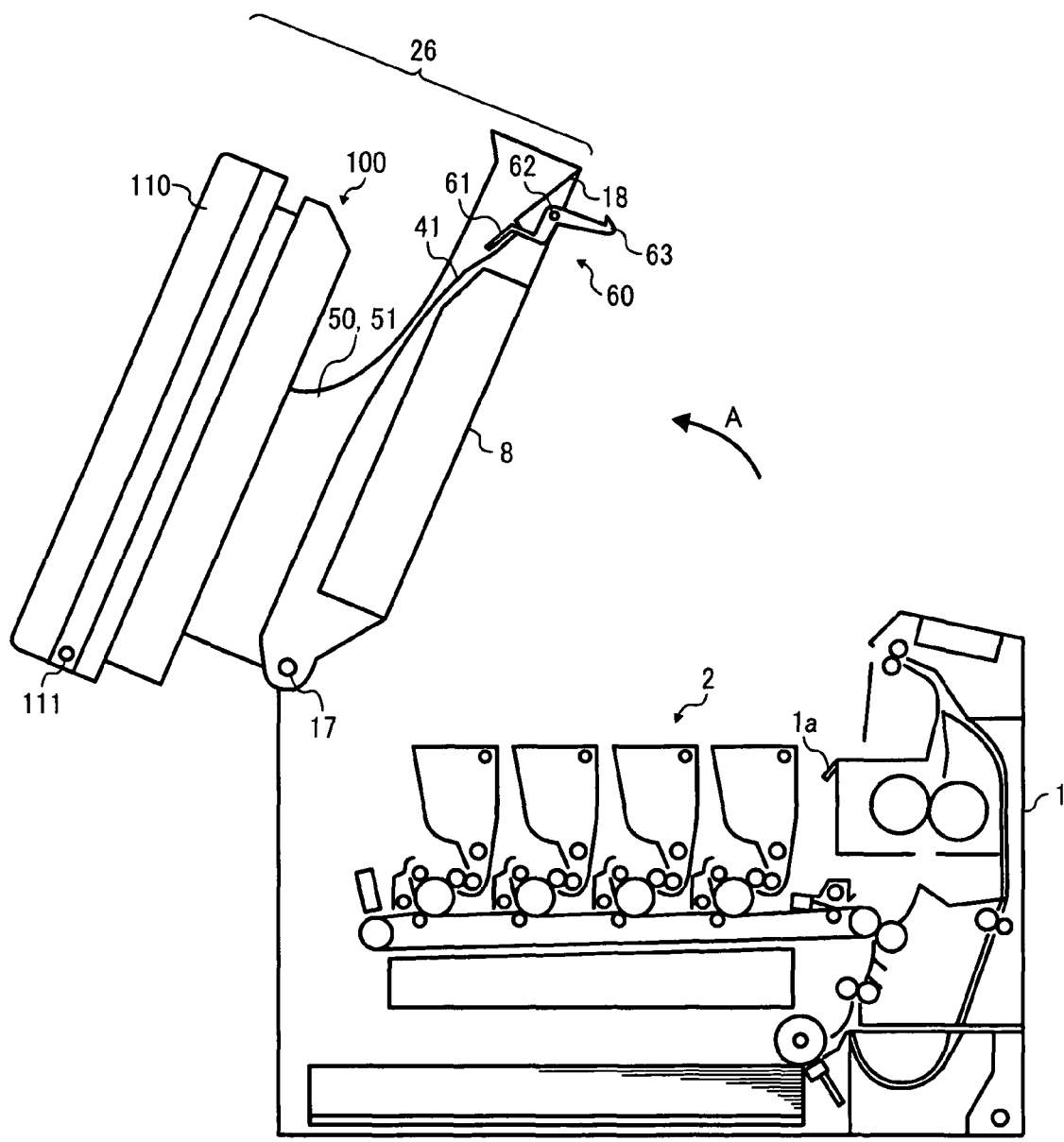
FIG. 3 is a cross-sectional view illustrating a structure of the image forming apparatus shown in FIG. 1 when a cover section is open, according to an example embodiment of the present invention.
Figure 4:
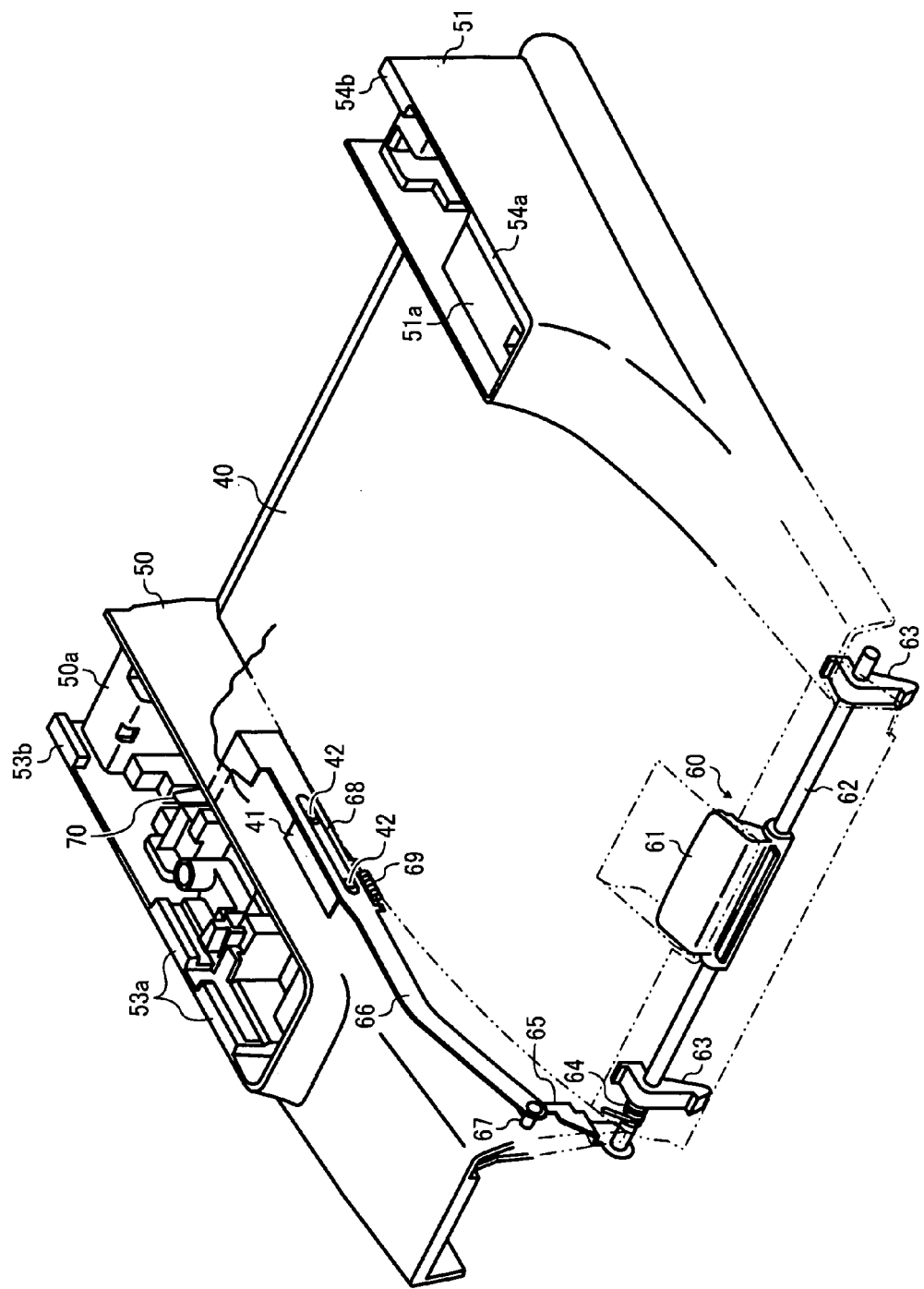
FIG. 4 is a perspective view illustrating a structure of a portion of a cover lock mechanism of the image forming apparatus shown in FIG. 1, according to an example embodiment of the present invention.

Still referring to FIGS. 2 and 3, the cover section 18 is further provided with a cover lock mechanism 60 including the operation lever 61. In one example, the cover lock mechanism 60 includes a first cover regulating member, which provides a function of preventing the cover section 18 from opening with respect to the apparatus body 1 when the cover section 18 is closed. Referring to FIG. 4, the first cover regulating member of the cover lock mechanism 60 mainly includes the operation lever 61, a support shaft 62, and lock claws 63, which are integrally provided. The operation lever 61 allows the operator to release the locked state of the cover section 18 with respect to the apparatus body 1, which is caused by the first cover regulating member of the cover lock mechanism 60. The operation lever 61 is formed of a plate member having a surface that is arranged in nearly parallel with the surface 41 of the output sheet tray 40. Referring to FIG. 1, in order to help the operator to easily access the operation lever 61, the output sheet tray 41 may be provided with a concave section 44. Referring back to FIG. 4, the support shaft 62, which is rotatably provided with the cover section 18, fixes the operation lever 61 and the lock claws 63 to the cover section 18. The lock claws 63 each have one end, which meets corresponding one of engage sections 1a (FIG. 2) that are provided on the apparatus body 1 when the cover section 18 is closed. Further, as illustrated in FIG. 4, the support shaft 62 extends along the length of the output sheet tray 40 in the direction Y from the right side to the left side of the apparatus body 1. The operation lever 61 is fixed at nearly a center of the support shaft 62. The lock claws 63 are fixed at end portions of the support shaft 62.

Still referring to FIG. 4, the cover lock mechanism 60 further includes a spring 64, which is wound around the support shaft 62 at a position near the position where one of the lock claws 63 is provided. The spring 64 exerts a bias force to the cover lock mechanism 60 to rotate about an axis of the support shaft 62 in the counterclockwise direction shown in FIG. 2. With the bias force of the spring 64, the lock claws 63 and the engage sections 1a are kept in the engaged state to make the cover section 18 to be in the locked state. In such locked state, the operation lever 61 is kept at the position such that the upper portion of the operation lever 61 is not exposed above the surface 41 of the output sheet tray 40. When the operation lever 61 is rotated in the direction C indicated by the arrow of FIG. 2 against the bias force exerted by the spring 64, the lock claws 63 are made apart from the engage sections 1a to make the cover section 18 to be in the released state. As the operator continues to lift the operation lever 61 and the cover section 18 in the direction A of FIG. 3, the cover section 18 opens to expose the inside of the apparatus body 1.

When the cover section 18 is rotated to be away from the apparatus body 1, as illustrated in FIG. 3, the image reading device 100 provided on the cover section 18 via the support sections 50 and 51 and the LSU 8 provided at the bottom surface of the cover section 18 are rotated together with the cover section 18. When the cover section 18 is open, the operator may easily access the inside of the apparatus body 1 from the front side of the apparatus body 1. This may facilitate maintenance process or replacement process. For example, referring to FIG. 3, when the cover section 18 is open, the image forming device 2 including the photoconductor 3, the charging device 7, the developing device 9, the cleaning device 11, etc., may be easily taken out for replacement. In this example, the photoconductor 3, the charging device 7, the developing device 9, and the cleaning device 11 may be integrally formed as a process cartridge.

Figure 18:
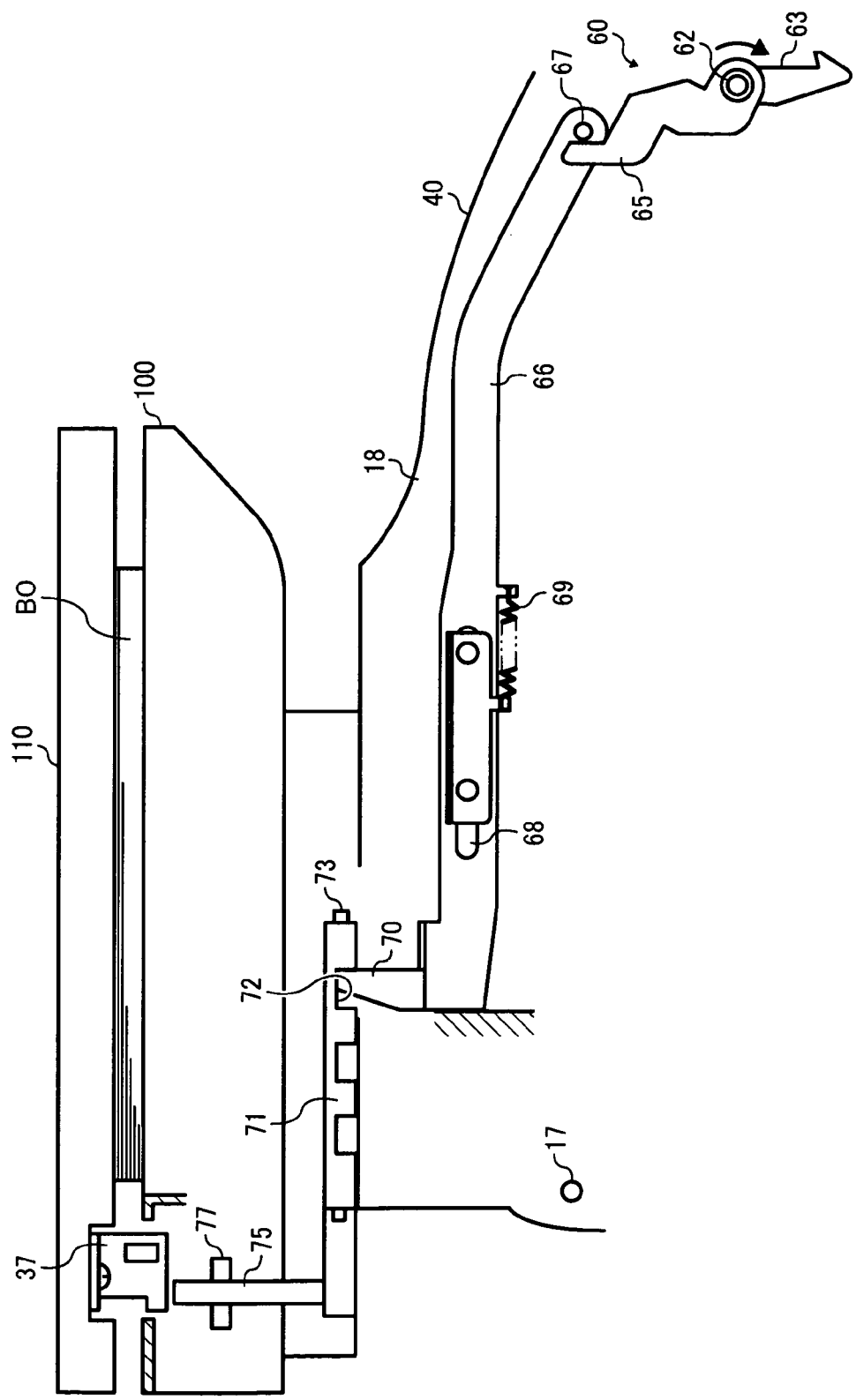
FIG. 18 is a side view illustrating a structure of a portion of the cover lock mechanism of FIG. 4 when the cover lock mechanism is in the locked state, according to an example embodiment of the present invention.
Figure 19:
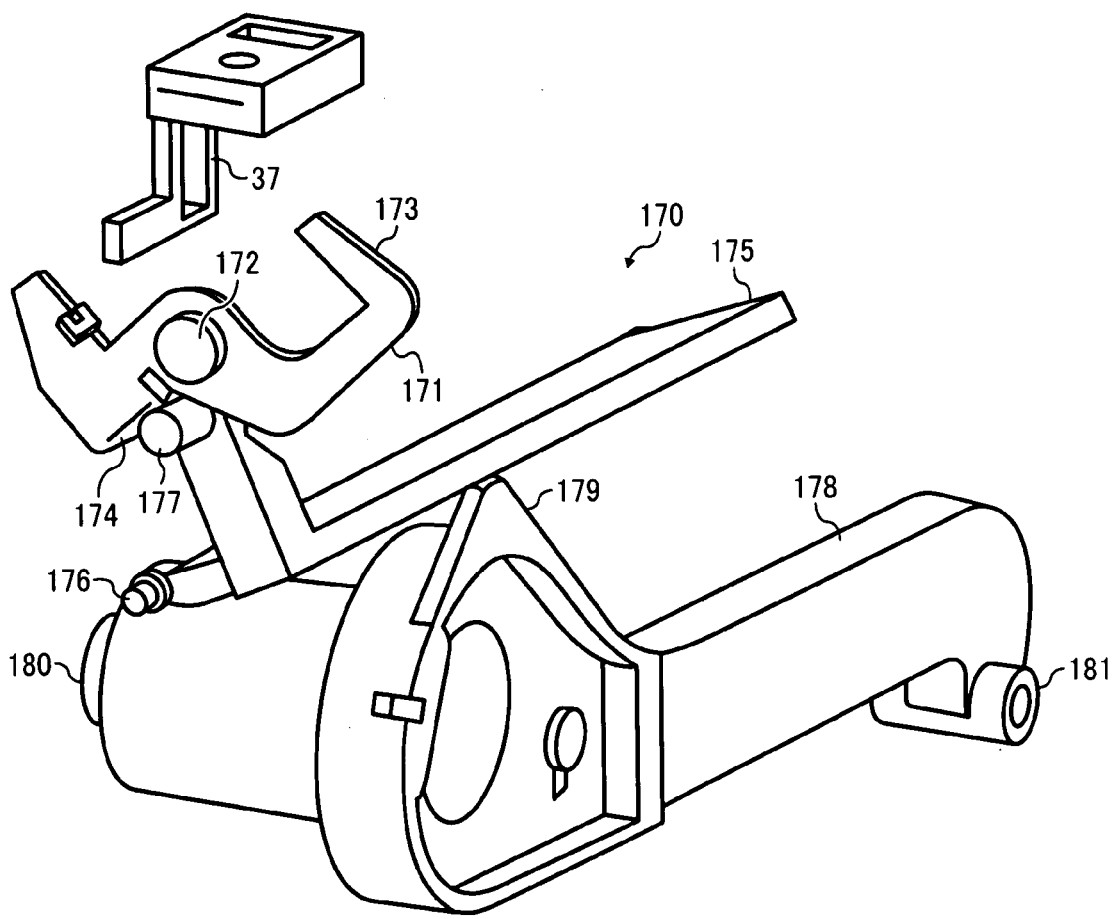
FIG. 19 is a perspective view illustrating a portion of a platen lock mechanism of the image forming apparatus shown in FIG. 1 when the platen lock mechanism is in the released state, according to an example embodiment of the present invention.

As described above referring to FIG. 3, the image reading device 100 is rotated together with rotation of the cover section 18. Referring to FIG. 2 or 3, the exposure glass cover 110 is rotatably provided so as to rotate around the hinge 111 having a rotational axis same as the rotational axis of the support shaft 17 of the cover section 18. When it is tightly closed so as to be in close contact with the exposure glass 102, the exposure glass cover 110 is hardly open as it is provided with a magnet or any other element that keeps the exposure glass cover 110 to be closed. When the exposure glass cover 110 is not in close contact with the exposure glass 102, the exposure glass cover 110 easily opens to be away from the surface of the exposure glass 102. More specifically, when the cover section 18 is rotated while the exposure glass cover 110 is not in close contact with the exposure glass 102, the exposure glass cover 110 may widely open due to gravity. Alternatively, when the book document BO is provided on the exposure glass 102 as illustrated in FIG. 18 or 57, the exposure glass cover 110 is not in close contact with the exposure glass 102. In such case, the exposure glass cover 110 may widely open due to gravity with opening of the cover section 18.

In view of this problem, the cover lock mechanism 60 further includes one or more elements, which together provide a function of preventing opening of the cover section 18 when the exposure glass cover 110 is not in close contact with the exposure glass 102, even after the locked state of the cover section 18 caused by the first cover regulating member is switched to the released state by the operation lever 61. For the illustrative purpose, such elements providing the function of preventing opening of the cover section 18 may be referred to as a second cover regulating member.

Figure 5:
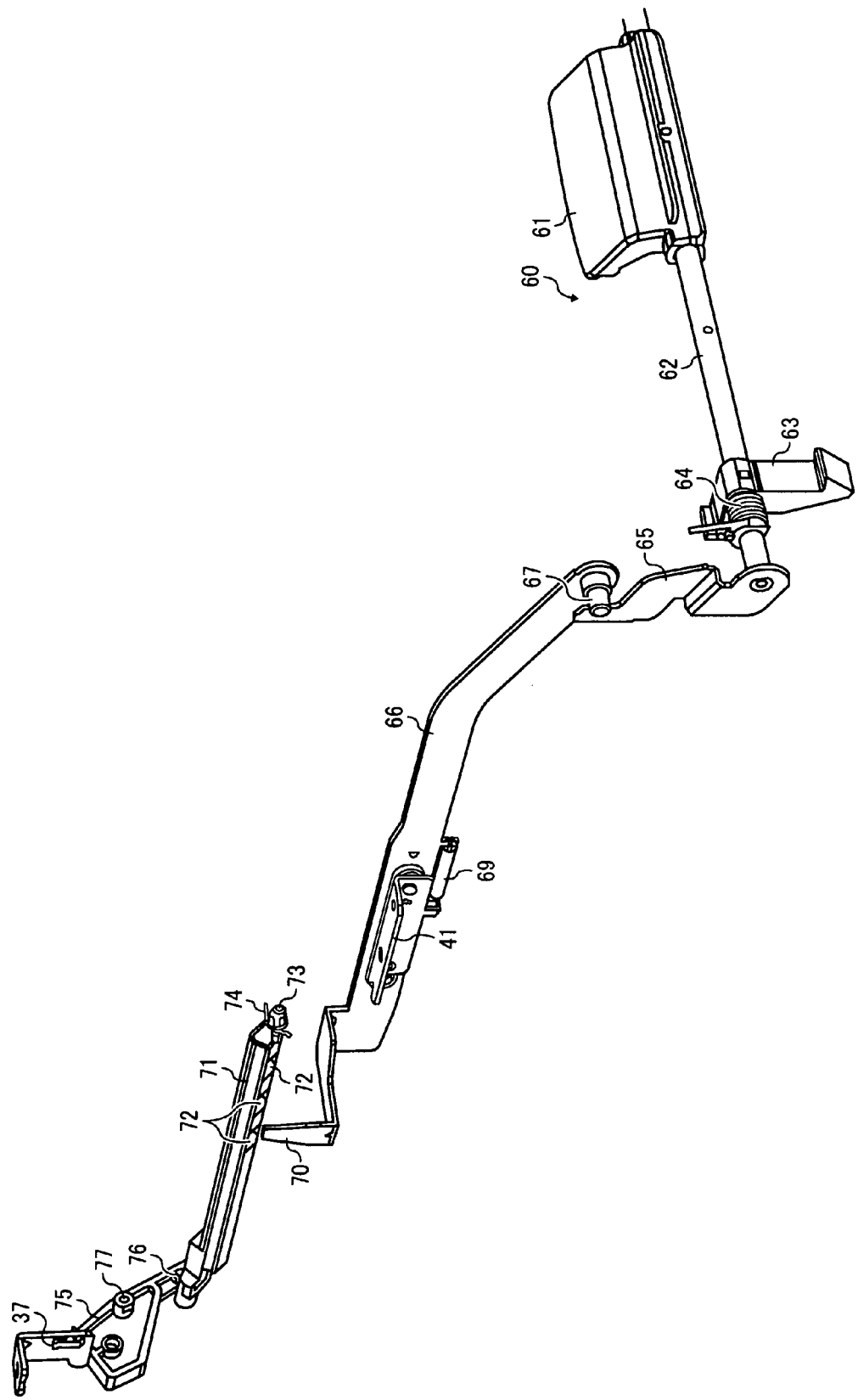
FIG. 5 is a perspective view illustrating a structure of a portion of the cover lock mechanism of FIG. 4 when the cover lock mechanism is in the released state, according to an example embodiment of the present invention.
Figure 6:
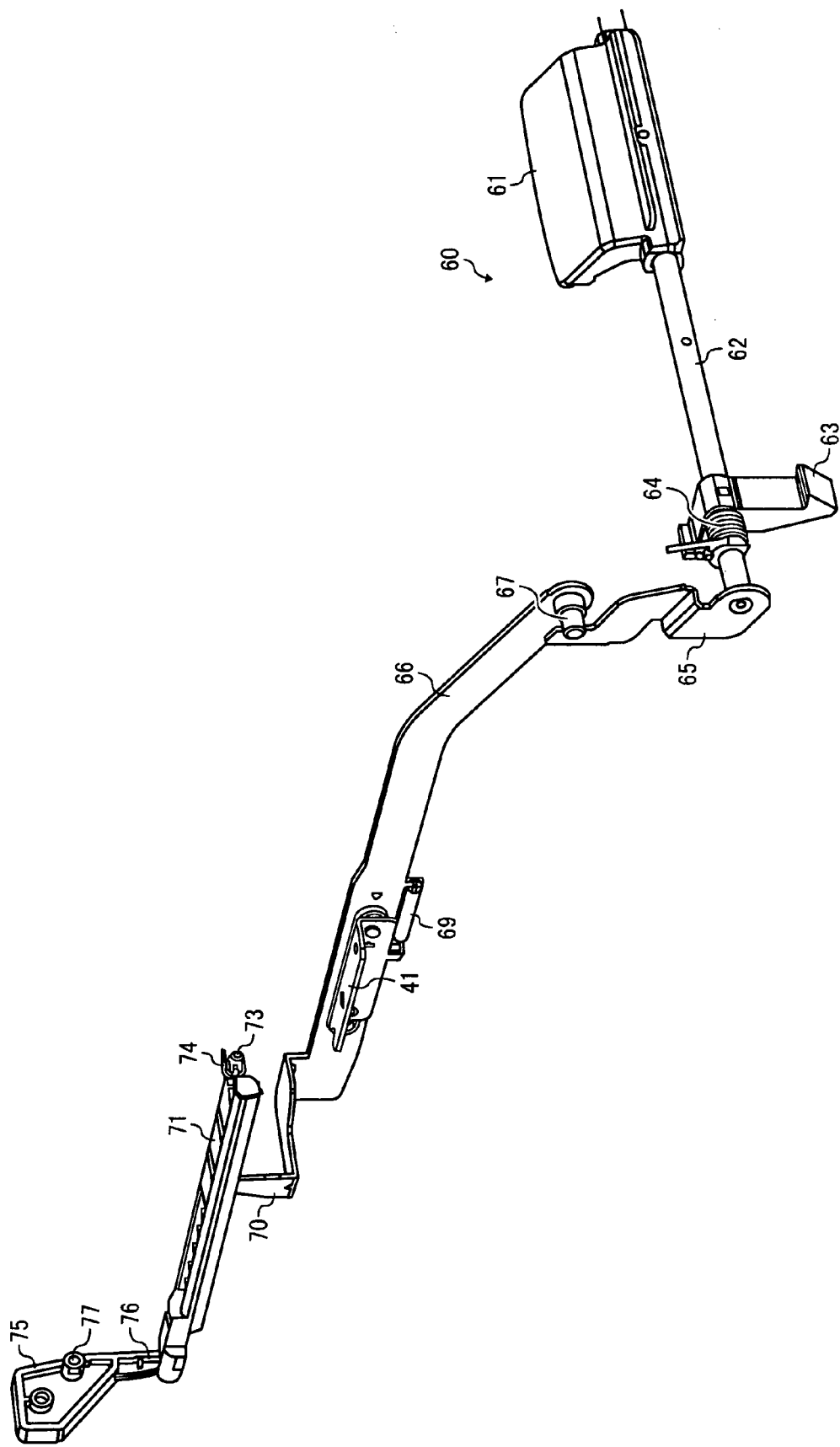
FIG. 6 is a perspective view illustrating a structure of a portion of the cover lock mechanism of FIG. 4 when the cover lock mechanism is in the locked state, according to an example embodiment of the present invention.
Figure 7:
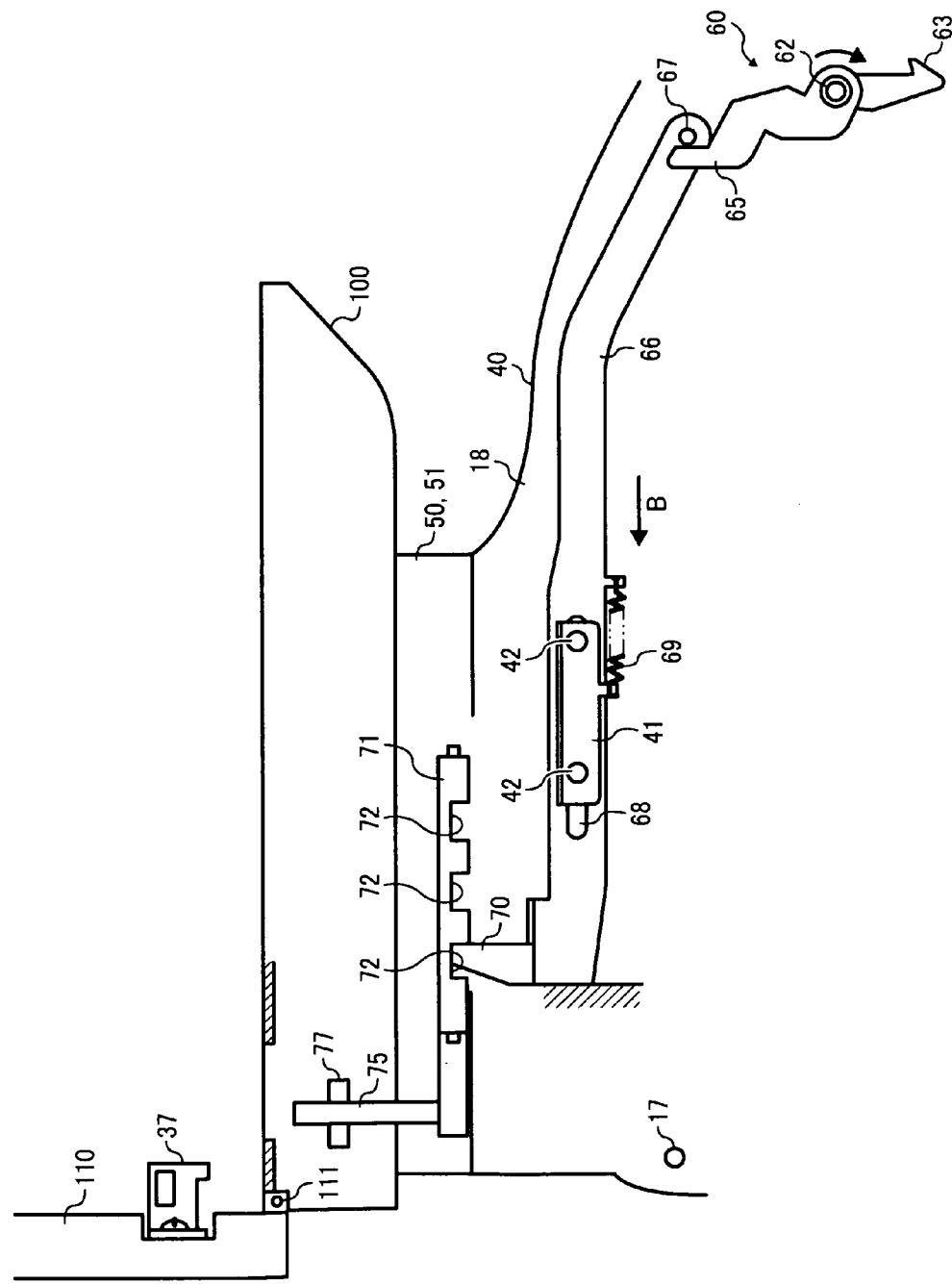
FIG. 7 is a side view illustrating a structure of a portion of the cover lock mechanism of FIG. 4 when the cover lock mechanism is in the locked state, according to an example embodiment of the present invention.

Referring to any one of FIGS. 4 to 7, the second cover regulating member mainly includes a relay lever 65, a slide member 66, and a spring 69. The relay lever 65 has one end portion fixed to the support shaft 62 of the cover lock mechanism 60. When the support shaft 62 is rotated as the operation lever 61 is pulled, the relay lever 65 rotates together with the rotation of the support shaft 62. The relay lever 65 has the other end portion, which contacts the slide member 66 through a pin 67. The slide member 66 extends in the sheet discharge direction X from the front section of the output sheet tray 40 toward the rear section of the output sheet tray 40. The slide member 66 slides in the sheet discharge direction X between the front side and the rear side of the apparatus body 1. The slide member 66 is formed with an open section 68, which is provided at a portion of the slide member 66 corresponding to the rear side of the apparatus body 1. The cover section 18 further includes a bracket 41 provided with a guide roller 42 having two rollers. The guide roller 42 passes through the open section 68 of the cover lock mechanism 60. With this structure, the guide roller 42 may restrict movement of the slide member 66 both in sliding direction and slidable range. The cover lock mechanism 60 further includes the spring 69 provided between the bracket 41 and the slide member 66, which exerts a bias force to the slide member 66 to cause the slide member 66 to tend to slide in the direction B of FIG. 7 toward the rear section of the apparatus body 1. With the spring 69, as illustrated in FIG. 7, the slide member 66 is kept at the position in which the end portion of the slide member 66 closely contacts the cover section 18.

In operation, when the operator pulls the operation lever 61 to release the locked state of the cover section 18 with respect to the apparatus body 1, the relay lever 65 and the pin 67 are engaged so as to cause the slide member 66 to be pulled toward the front side of the apparatus body 1. When the operator releases the operation lever 61 to cause the cover section 18 to be in the locked state with respect to the apparatus body 1, the bias force of the spring 69 causes the slide member 66 to return to its original position as illustrated in FIG. 7. Preferably, in this example, a sufficient space may be provided between the pin 67 and the relay lever 65 such that the rear section of the slide member 66 closely contacts the cover section 18 even with the presence of the relay lever 65.

The second cover regulating member of the cover lock mechanism 60 further includes a convex section 70, which exposes upward and provided at an end portion of the slide member 66 opposing the end portion where the pin 67 is provided. The convex section 70 engages with a lock release 71 as illustrated in FIG. 6. The lock release 71, which has a rectangular shape with a predetermined thickness, is rotatably provided on the image reading device 100. The lock release 71, which has an axial line in the longitudinal direction, rotates about a support shaft 73 provided at a side perpendicular to the longitudinal direction. As illustrated in FIG. 7, the lock release 71 includes a plurality of concave sections 72, each capable of engaging with the convex section 70. The concave sections 72 each have a cross section of rectangular shape.

Figure 8A:
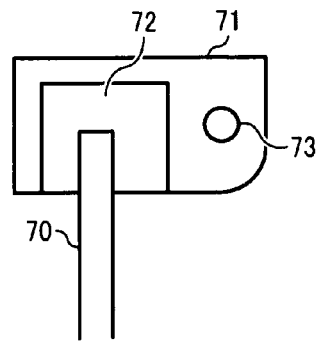
FIG. 8A is a side view illustrating a structure of a portion of a lock release of the cover lock mechanism of FIG. 4 when the cover lock mechanism is in the locked state, according to an example embodiment of the present invention.
Figure 8B:
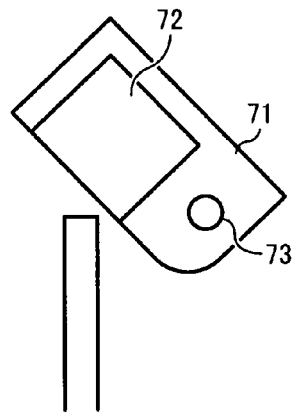
FIG. 8B is a side view illustrating a structure of a portion of a lock release of the cover lock mechanism of FIG. 4 when the cover lock mechanism is in the released state, according to an example embodiment of the present invention.

As illustrated in FIG. 8A, the lock release 71 is rotated around the support shaft 73 to cause the concave section 72 and the convex section 70 to be engaged, thus making the image reading device 100 to be in the locked state with respect to the cover section 18. As illustrated in FIG. 8B, the lock release 71 is rotated around the support shaft 73 to cause the concave section 72 and the convex section 70 to be separated from each other, thus making the image reading device 100 to be in the released state with respect to the cover section 18. In order to restrict the rotation of the lock release 71 such that the lock release 71 is movable only between the position in the locked state (FIG. 8A) and the position in the released state (FIG. 8B), a stopper may be provided. Referring to FIG. 5 or 6, the lock release 71 rotates from the position in the lock state to the position in the released state due to a bias force applied by a spring 74.

Figure 9A:
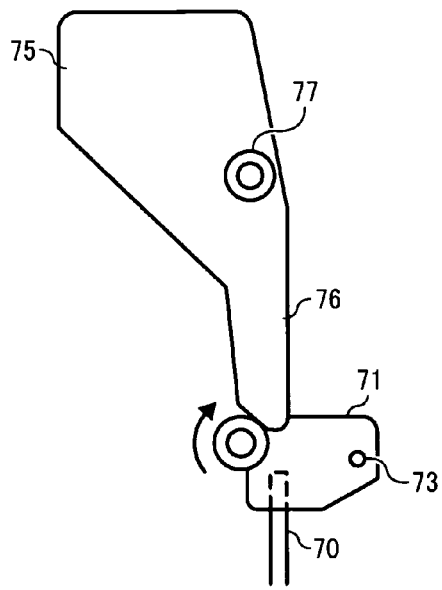
FIG. 9A is a side view illustrating a structure of a portion of the cover lock mechanism of FIG. 4 when the cover lock mechanism is in the locked state, according to an example embodiment of the present invention.
Figure 9B:
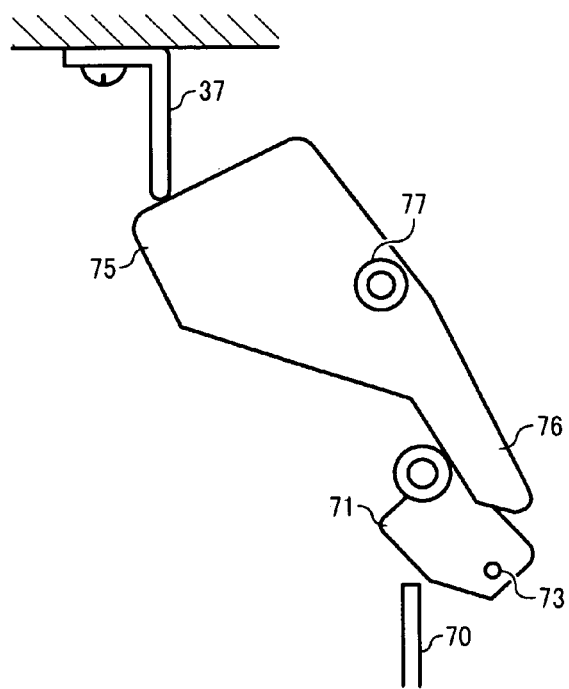
FIG. 9B is a side view illustrating a structure of a portion of the cover lock mechanism of FIG. 4 when the cover lock mechanism is in the released state, according to an example embodiment of the present invention.

Further, as illustrated in any one of FIGS. 5, 6, 9A, and 9B, the lock release 71 is provided at the position so as to be in contact with a tip section 76 of a movable member 75, which moves along with opening or closing of the exposure glass cover 110. As the movable member 75 moves, the lock release 71 rotates between the position in the locked state (FIG. 9A) and the position in the released state (FIG. 9B). The movable member 75 is rotatably provided on the image reading device 100 so as to rotate around a support shaft 77. As illustrated in FIG. 6, 7, or 9A, when the exposure glass cover 110 is open, the movable member 75 is positioned away from an engage section 37 of the exposure glass cover 110. In such state, with a bias force applied by a spring provided for the movable member 75, the tip section 76 of the movable member 75 is kept at the position in which the tip section 76 closely contacts the lock release 71 as illustrated in FIG. 9A. In this example, the bias force applied by the spring provided for the movable member 75 and the bias force applied by the spring 74 provided for the lock release 71 are opposite in direction. When the bias force applied by the spring of the movable member 75 is greater than the bias force applied by the spring 74, the lock release 71 is kept at the position in the locked state as illustrated in FIG. 8A or 9A. When the exposure glass cover 110 is closed, the movable member 75 rotates around the support shaft 77 in the counterclockwise direction from the position illustrated in FIG. 6 or 9A to the position illustrated in FIG. 5 or FIG. 9B. With this rotation, the tip section 76 of the movable member 75 moves away from the lock release 71. As illustrated in FIG. 5 or 9B, the lock release 71 rotates around the support shaft 73 in the clockwise direction due to the bias force applied by the spring 74, thus causing the concave section 72 and the convex section 70 to be separated from each other.

When the exposure glass cover 110 is not in close contact with the exposure glass 102, the convex section 70 and the concave section 72 are engaged with each other. With this engagement, even when the operator attempts to rotate the operation lever 61 around the support shaft 62 to open the cover section 18, the operation lever 61 is not rotated as the slide member 66 does not slide. Accordingly, the cover section 18 is kept closed when the exposure glass cover 110 is not in close contact with the exposure glass 102. When the exposure glass cover 110 is tightly closed or in close contact with the exposure glass 102, the convex section 70 and the concave section 72 are separated from each other due to the rotation of the lock release 71. Thus, the slide member 66 is made slidable to cause the operation lever 61 to rotate around the support shaft 62 to allow opening of the cover section 18.

Figure 10:
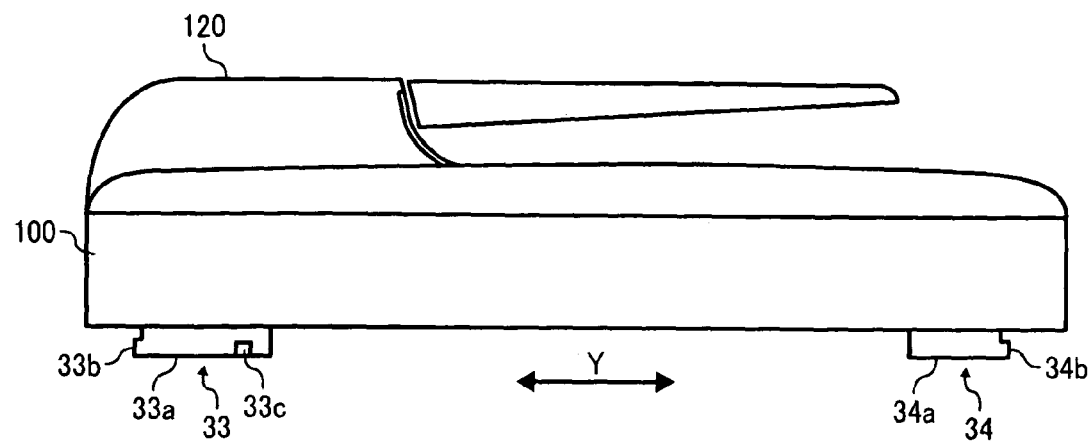
FIG. 10 is a front side view illustrating a structure of an image reading device of the image forming apparatus shown in FIG. 1, according to an example embodiment of the present invention.
Figure 11:
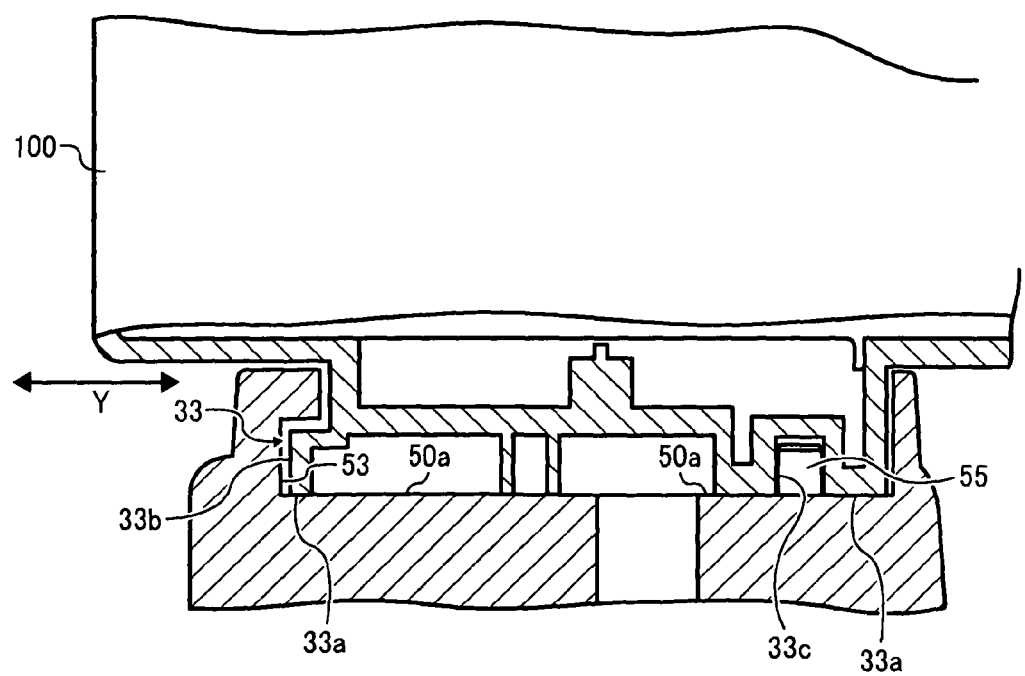
FIG. 11 is a cross-sectional view illustrating a structure of a portion of the image reading device and a support section of the image forming apparatus of FIG. 1, according to an example embodiment of the present invention.
Figure 36:
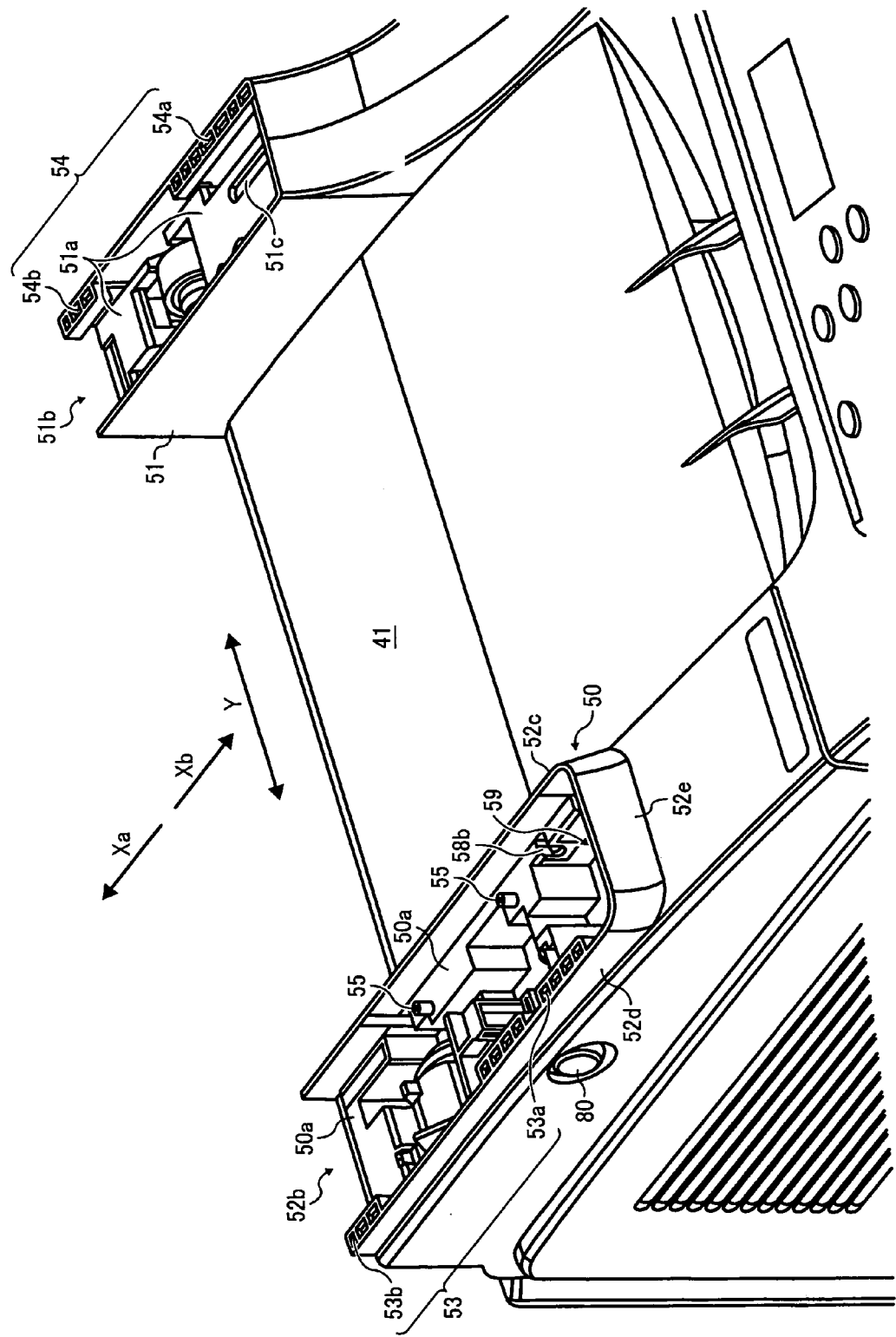
FIG. 36 is a perspective view illustrating a structure of the support sections of the image forming apparatus of FIG. 1, according to an example embodiment of the present invention.

As described above, in this example, the image reading device 100 may slide with respect to the cover section 18. Referring to FIG. 10 or 11, the image reading device 100 and the support sections 50 and 51 further include a slide mechanism, which causes the image reading device 100 to be slidable substantially in parallel with a surface of the cover section 18. The slide mechanism includes rail sections 33 and 34 in the direction Y indicated by the arrow of FIG. 10 or 11, which is the width direction of the image reading device 100 or the direction perpendicular to the direction X in which the recording sheet S is discharged. The rail sections 33 and 34 are each integrally provided with the image reading device 100. The rail section 33 includes a surface 33*a*, a convex section 33*b*, and a groove 33*c* that extends in the direction Y. The rail section 34 includes a surface 34*a* and a convex section 34*b*. As illustrated in FIG. 4 or 11, the surfaces 33*a* and 34*a* of the rail sections 33 and 34, which are each integrally formed with the image reading device 100, are in contact respectively with a surface 50*a* of the support section 50 and a surface 51*a* of the support section 51. In order to prevent the image reading device 100 to be shifted in the direction Y, a pin 55 is provided on the support section 50, which is inserted into the groove 33*c*, as illustrated in FIG. 11. In another example, two pins 55 may be provided as illustrated in FIG. 36. With this structure, the image reading device 100 is able to slide with respect to the cover section 18. Further, since the rails sections 33 and 34 are integrally formed with the image reading device 100, or since the contact surfaces 50*a* and 51*a* are integrally formed with the support sections 50 and 51, sliding function may be provided with reduced number of components or with reduced cost.

Referring to FIG. 4, the support section 50 further includes stopper sections 53*a* and 53*b* at the positions near the outer side surface, which may be collectively referred to as the stopper section 53. The support section 51 includes stopper sections 54*a* and 54*b* at the positions near the outer side surface, which may be collectively referred to as the stopper section 54. As illustrated in FIG. 11, the stopper section 53 and the stopper section 54 respectively contact the convex section 33*b* of the rail section 33 and the convex section 34*b* of the rail section 34. Alternatively, the stopper sections 53 and 54 may be provided at the positions near the inner side surfaces of the support sections 50 and 51. In such case, the convex sections 33b and 34b are each provided at the inner sides of the rail sections 33 and 34.

With this structure described above, the image reading device 100 is prevented from being separated from the support sections 50 or 51. For example, even when the image reading device 100 is pulled against the cover section 18 while the image forming apparatus of FIG. 1 is being carried, the convex sections 33b and 34b of the rail sections 33 and 34 are prevented from moving away from the surfaces 50a and 51a of the support sections 50 and 51 by the stopper sections 53 and 54. In another example, the image reading device 100 may be slightly lifted away from the cover section 18 due to various environmental factors, which may cause deformation of the surface of the image reading device 100. In such case, the convex sections 33b and 34b of the rail sections 33 and 34 are prevented from positioning away from the surfaces 50a and 51a of the support sections 50 and 51 by the stopper sections 53 and 54. In another example, one side of the image reading device 100 may be lifted away from the cover section 18 when force is exerted on the other side of the image reading device 100. In such case, since the stopper sections 53 and 54, or the convex sections 33b and 34b, are provided for both sides of the image reading device 100 or the apparatus body 1, lifting of the side of the image reading device 100 may be prevented. Further, since the stopper sections 53 and 54 are integrally formed with the support sections 50 and 51, or since the convex sections 33b and 34b are integrally formed with the image reading device 100, stopper function may be provided with reduced number of components or with reduced cost.

Alternatively, the stopper sections 53 and 54 may be provided on the image reading device 100, while the rail sections 33 and 34 may be provided on the support sections 50 and 51. However, this structure may not be able to provide mechanical strength sufficient to prevent the image reading device 100 from being separated from the support sections 50 and 51 when the force is applied to the image reading device 100 against the cover section 18.

Alternatively, the stopper sections 53 and 54 may be provided at the positions near the inner and outer side surfaces of the support sections 50 and 51. The convex sections 33b and 34b are each provided at the inner and outer sides of the rail sections 33 and 34. However, this structure may not be able to provide sufficient space for other components, for example, a component for absorbing shock due to opening or closing the cover section 18.

In order to efficiently use the limited space, as illustrated in FIG. 4 or 11, the stopper sections 53 and 54 are provided at selected portions of the support sections 50 and 51 along the direction X. For example, referring to FIG. 4, the stopper section 53a is provided at a front portion of the support section 50, while the stopper section 53b is provided at a rear portion of the support section 50. With this structure, the space may be effectively used. Further, even when the rear portion of the image reading device 100 is lifted due to the force applied to the front portion of the image reading device 100, lifting of the rear portion of the image reading device 100 is suppressed.

Alternatively, when more space is available, the stopper sections 53 and 54 may be provided at all side portions of the support sections 50 and 51 along the direction X. Whether to form the stopper sections 53 and 54 at all side portions or selected portions of the support sections 50 and 51 may be determined based on the type of a solid core mold being applied for injection molding.

Further, the stopper sections 53 and 54 may each have a boxed shape for improved strength. Further, the stopper sections 53 and 54 may each provided with a rib for improved strength. With this structure, the stopper sections 53 and 54 may each be prevented from damage or deformation even when the force is exerted through the image reading device 100.

Figure 37:
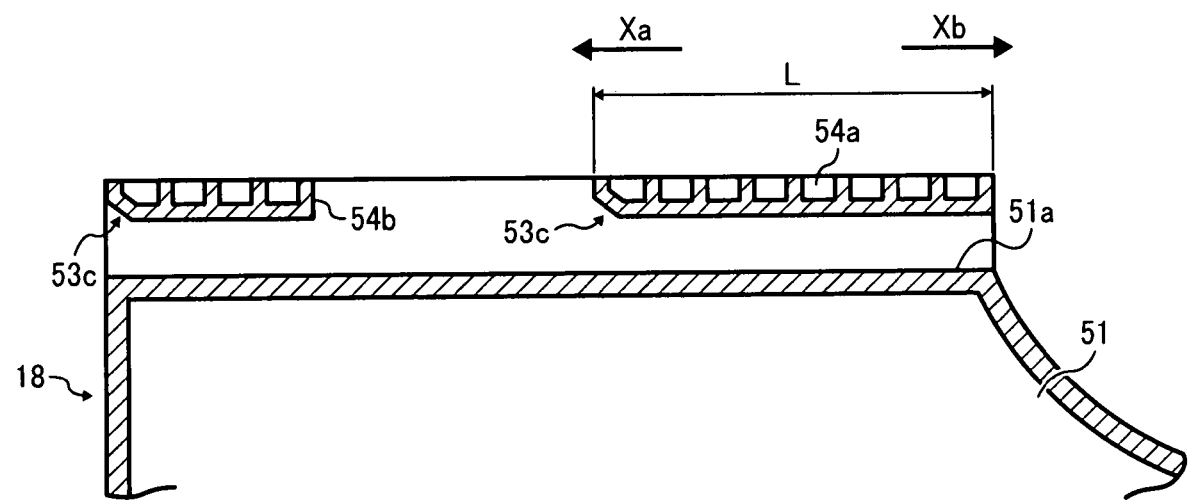
FIG. 37 is a cross-sectional view illustrating a structure of a stopper section of the support section of FIG. 36, according to an example embodiment of the present invention.

In another example, referring to FIGS. 36 and 37, the support section 51 may further include a slot 51c having a length, which is determined based on a slidable range of the image reading device 100. Further, as illustrated in FIG. 37, tapered portions 53c may be provided on edge portions of the stopper sections 54a and 54b of the support section 51 in the sliding direction shown by arrows Xa and Xb, respectively. Further, tapered portions 53c may be also provided on edge portions of the stopper sections 53a and 53b of the support section 50 in the sliding direction shown by arrows Xa and Xb. With this structure, when the image reading device 100 is caused to slide in the direction Xb, the stopper sections 53 and 54 are prevented from getting stuck at edge portions of the rail sections 33 and 34 of the image reading device 100. Further, a tapered section may be provided on edge portions of the rail sections 33 and 34 of the image reading device 100. This allows the image reading device 100 to slide more smoothly.

Still referring to FIG. 37, the stopper section 54a and the stopper section 53a may each have a length L, which is determined based on the slidable range of the image reading device 100. More specifically, even when the image reading device 100 slides toward the direction Xa, the rail section 33 and the rail section 34 are made in contact with the stopper sections 53 and 54 throughout the slidable range of the image reading device 100. This structure suppress the image reading device 100 to be lifted upward even when the image reading device 100 is away from the original position.

Figure 12A:
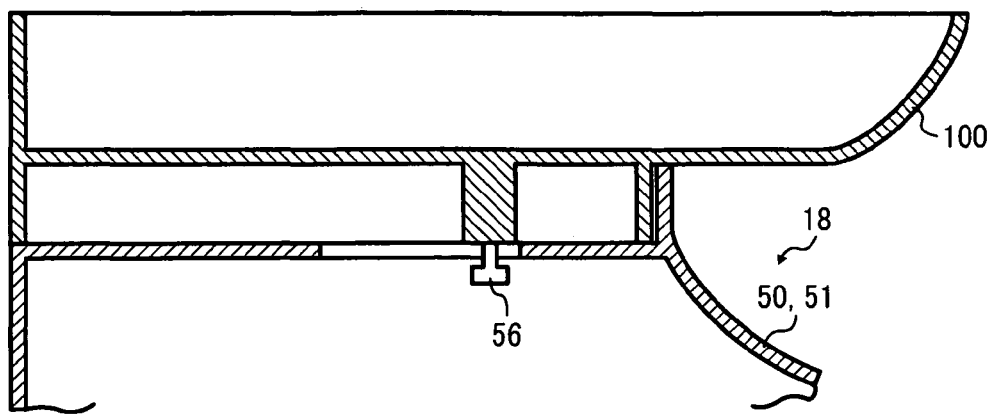
FIG. 12A is an illustration for explaining the original position of the image reading device with respect to a cover section of the image forming apparatus of FIG. 1, a according to an example embodiment of the present invention.
Figure 12B:
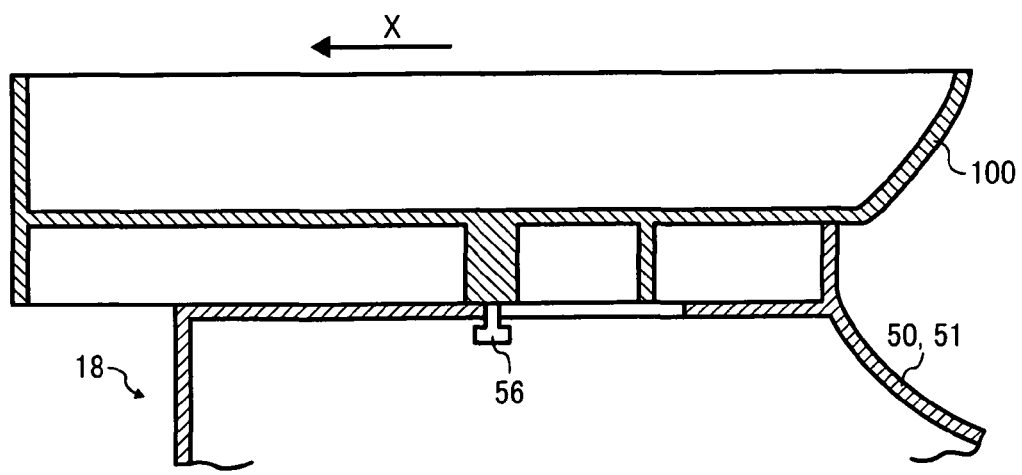
FIG. 12B is an illustration for explaining the position of the image reading device with respect to a cover section of the image forming apparatus of FIG. 1 when the image reading device slides in a maximum slidable range, according to an example embodiment of the present invention.
Figure 13:
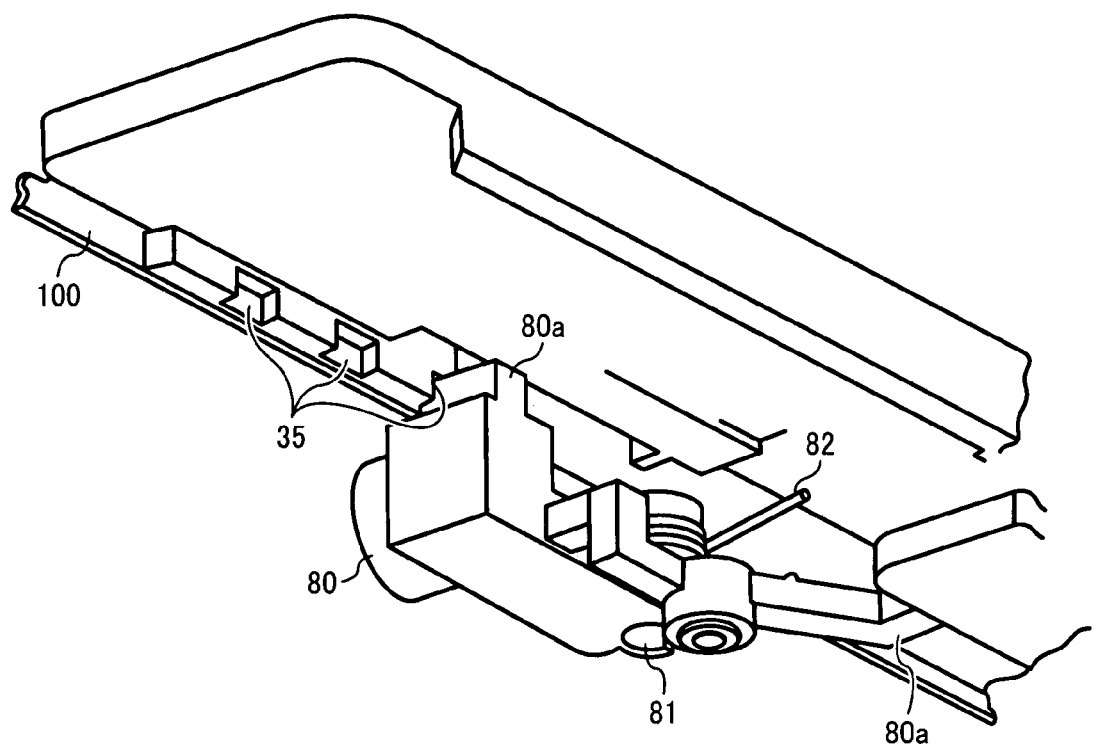
FIG. 13 is a perspective view illustrating a portion of a slide lock mechanism of the image forming apparatus shown in FIG. 1, according to an example embodiment of the present invention.

As described above, the image reading device 100 slides with respect to the cover section 18 in the direction X of FIG. 2. FIG. 12A illustrates a state in which the image reading device 100 is in the original position. FIG. 12B illustrates a state in which the image reading device 100 slides in the direction Xa to be the position where the image reading device 100 is not slidable further in the direction X. In order to keep the image reading device 100, which is slidable, at a desired position, as illustrated in FIG. 13, the image forming apparatus of FIG. 1 further includes a slide lock mechanism, which prevents sliding of the image reading device 100. Further, the image forming apparatus of FIG. 1 further includes an operation button 80, which releases the locked state of the image reading device 100, which is caused by the slide lock mechanism. Referring to FIG. 1, the operation button 80 is exposed through the outer surface of the support section 50.

Figure 14:
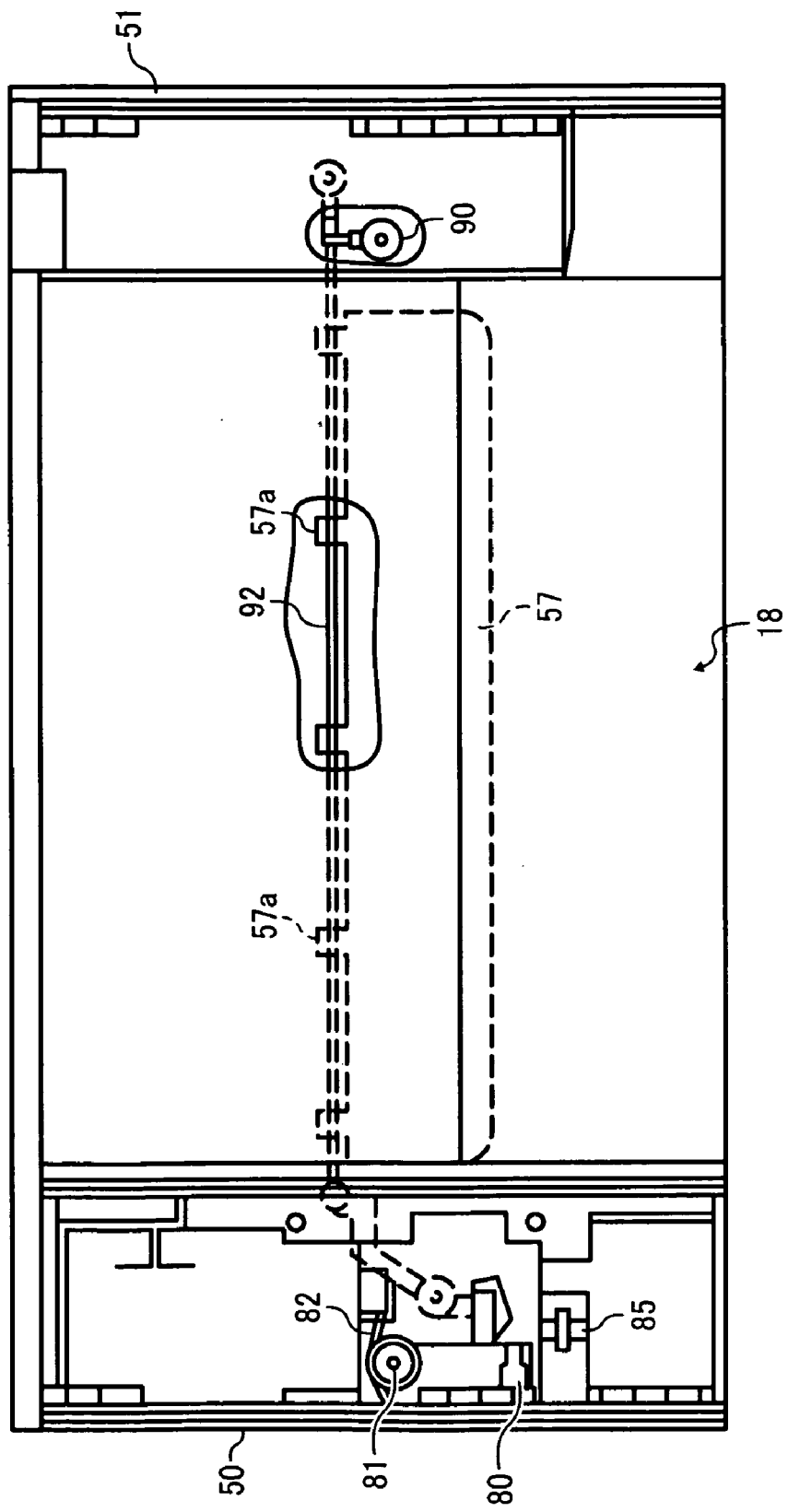
FIG. 14 is a plan view illustrating the arrangement of a slide lock mechanism of the image forming apparatus shown in FIG. 1, according to an example embodiment of the present invention.

As illustrated in FIG. 13 or 14, the operation button 80 includes a shaft 81, and a spring 82 of twisted coil that wounds around the shaft 81. The spring 82 applies a bias force to the operation button 80 to cause the operation button 80 to move toward one direction toward the outer surface of the apparatus body 1. The operation button 80 is integrally provided with a hook 80a. When the bias force from the spring 82 is applied, the hook 80a is caused to engage with a cut section 35, which is provided on the rail section 33 of the image reading device 100. With this engagement, the image reading device 100 is prevented from sliding. When the operator applies the force that is greater than the bias force applied by the spring 82 by pushing the operation button 80, the hook 80a is separated from the cut section 35. This causes the image reading device 100 to be able to slide in the direction X. In this example, the cut section 35 includes three cut sections 35, however, any number of cut sections 35 may be provided.

In this example, as described above referring to FIG. 36, the image reading device 100 is kept stable by the pin 55, which is inserted into the groove 33c. However, the distance between the two pins of the pin 55 may not be increased since the support section 50 is provided with various other components. Further, in order to reduce cost, the pin 55 may be formed of a plastic member, which is integrally formed with the output sheet tray 40 and the support sections 50 and 51. Similarly, the groove 33c may be made of a plastic member integrally formed with the housing of the image reading device 100. For this reason, the pin 55 and the groove 33c may no be tightly engaged and tend to deform when compared to the example case in which the pin 55 and the groove 33c are each made of a metal member. Even when the image reading device 100 is in the locked state, the image reading device 100 may not be stable with respect to the support sections 50 and 51. In this example, the plastic member includes a mixture of polycarbonate (PC) and polystyrene (PS). Further, the plastic member may be processed with a fire retardant.

Figure 16A:
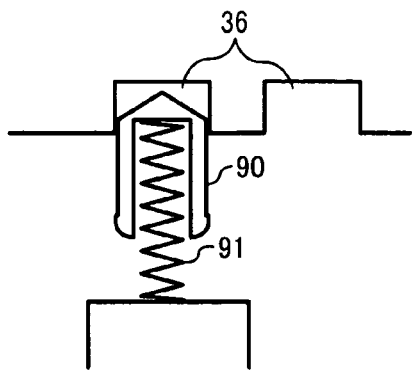
FIG. 16A is a cross-sectional view illustrating a portion of the slide lock mechanism shown in FIG. 15, according to an example embodiment of the present invention.

In view of the above, a slide lock mechanism may be provided on the support section 51, in addition to the slide lock mechanism provided on the support section 50. By additionally providing the slide lock mechanism on the support section 51, the image reading device 100 may be made more stable while suppressing movement of the image reading device in the direction Y. As illustrated in FIG. 15, the support section 51 may be provided with a lock member 90 of cylinder shape. A pressure spring 91 applies a bias force to the lock member 90 to cause the lock member 90 to move up in the direction. As illustrated in FIG. 16A, the lock member 90 may be engaged with a groove 36, which is provided on the rail section 34 of the image reading device 100. The pressure spring 91 includes one end being engaged with a lower portion of the lock member 90, and the other end being engaged with a spring receive section 51d, which is integrally provided with the support section 51.

As illustrated in FIG. 14, the operation button 80 of the support section 50 and the lock member 90 of the support section 51 are coupled through a flexible wire 92. The wire 92 includes an end section, which is provided at the side facing the support section 51 and bent at about 90 degrees in the direction perpendicular to the sheet surface having the drawing of FIG. 14 thereon. Referring to FIG. 15, the wire 92 is bent at about 90 degrees in the direction opposite to the above-described direction of FIG. 14. The wire 92, which extends upward, is connected to a hook engage section of the lock member 90. With this structure, when the operation button 80 is pressed by the operator, the slide lock mechanism of FIG. 13 provided for the support section 50 and the slide lock mechanism of FIG. 15 provided for the support section 51 are cooperatively operated. Further, as illustrated in FIG. 14, the wire 92 is prevented from being loose by a groove provided on the rib surface of the cover section 18 or a guide 57a of a wire support member 57 provided on the surface of the cover section 18. In order to make the slide lock mechanisms provided on the support sections 50 and 51 to be cooperatively operable, while suppressing the number of components or cost, the wire 92 that is flexible is implemented. Further, the wire 92, which is flexible, is applicable to complicated routing, such as U-shaped routing as illustrated in FIG. 14.

Figure 16B:
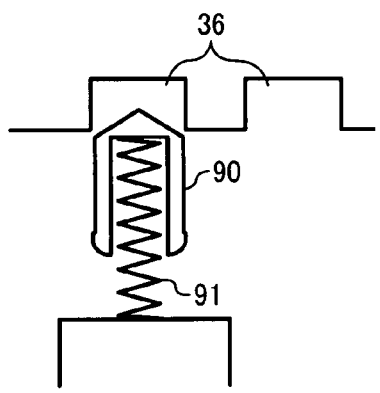
FIG. 16B is a cross-sectional view illustrating a portion of the slide lock mechanism shown in FIG. 15, according to an example embodiment of the present invention.
Figure 16C:
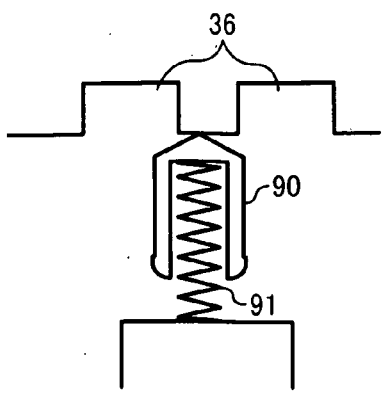
FIG. 16C is a cross-sectional view illustrating a portion of the slide lock mechanism shown in FIG. 15, according to an example embodiment of the present invention.

As described above, when the operation button 80 is pressed so as to exert a force greater than the bias force of the spring 82 or the spring 91, the lock member 90 is pulled through the wire 92 to be moved downward and separated away from the groove 36 of the image reading device 100. In this state, as illustrated in FIG. 16B, the lock member 90 has a tip portion of conical shape, which closely contacts the groove 36. When the operator slides the image reading device 100, the concave section adjacent to the groove 36 of the image reading device 100 further presses the lock member 90 downward as illustrated in FIG. 16C. As the tip portion of the lock member 90 contacts the concave section of the image reading device 100, the operator who slides the image reading device 100 may be able to feel bump or may be able to hear a click sound. In a substantially similar manner, as the tip portion of the lock member 90 contacts the groove 36, the operator who slides the image reading device 100 may be able to feel bump or may be able to hear a click sound. In this manner, the operator is able to perceive the locked or released state of the image reading device 100. In this example, as there are three positions in which the image reading device 100 can be locked, the operator may be able to select a desired position from three positions by sliding the image reading device 100.

Referring to FIG. 14, the image forming apparatus of FIG. 1 may further include a pendulum 85, which is provided on the support section 50 at a position near the operation button 80. When the exposure glass cover 110 opens together with the cover section 18, the pendulum 85 rotates due to its own weight, and moves along a path in which the operation button 80 moves. With this structure, even when the operator attempts to press the operation button 80 while the exposure glass cover 110 and the cover section 18 are open, the operation button 80 is blocked by the pendulum 85 to move further. Thus, the image reading device 100 is prevented from moving as the operation button 80 is pressed while the exposure glass cover 110 or the cover section 18 is open.

Figure 17:
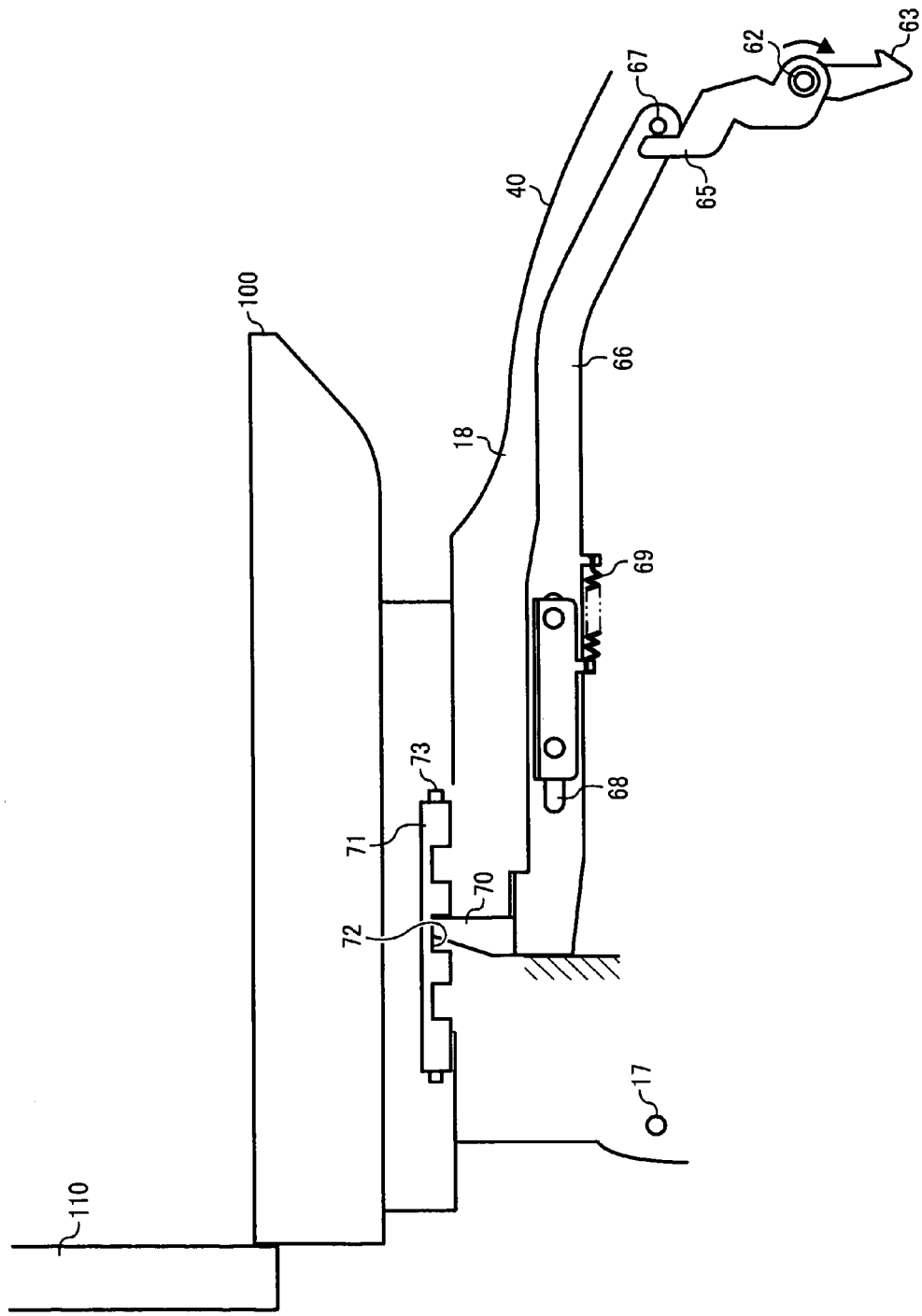
FIG. 17 is a side view illustrating a structure of a portion of the cover lock mechanism of FIG. 4 when the cover lock mechanism is in the locked state, according to an example embodiment of the present invention.

While the image reading device 100 can be locked at any one of three positions, the cover lock mechanism 60 that prevents opening of the cover section 18, which is described above, should be able to operate despite where the image reading device 100 is locked. Referring to FIG. 7, the concave section 72 is provided on the lock release 71, which is provided on the image reading device 100 and engages with the slide member 66 provided on the cover section 18 through the convex section 70. In this example, the concave section 72 includes three engage sections 72, which corresponds to the number of locked positions of the image reading device 100. Referring to FIG. 7, when the image reading device 100 is at the original position, or the image reading device 100 does not slide with respect to the cover section 18, the convex section 70 engages with the concave section 72 provided at the position closest to the support shaft 17. Referring to FIG. 17, when the image reading device 100 slides with respect to the cover section 18 in almost midway of the apparatus body length in the direction X, the convex section 70 engages with the concave section 72 provided between two other concave sections 72. Referring to FIG. 18, when the image reading device 100 slides with respect to the cover section 18 until the image reading device 100 reaches the position in which it is not slidable, the convex section 70 engages with the concave section 72 provided at the position closest to the front side of the apparatus body 1.

With this structure, when the operator attempts to rotate the cover section 18 while the exposure glass cover 110 is open even slightly or not in close contact with the exposure glass 102, the exposure glass cover 110 is prevented from rotating together with the rotation of the cover section 18 despite the position of the image reading device 100 throughout the entire slidable range.

In order to prevent the exposure glass cover 110 from opening while the cover section 18 is open, the image forming apparatus of FIG. 1 may further include a platen lock mechanism 170, which is described below referring to FIGS. 19, 20, 47 to 53.

As illustrated in any one of FIGS. 19, 20, 47 to 53, the platen lock mechanism 170 includes a lock member 171 that may engage with the engage section 37 of the exposure glass cover 110, a lock intermediate member 175 that may contact the lock member 171, and a movable member 178 that may contact the lock intermediate member 175. The lock member 171 and the lock intermediate member 175 are in closely contact through a movable pin 177.

The lock member 171 is rotatably provided on the image reading device 100 around a pivot 172. The lock member 171 includes a lock claw 173 at one end, which may be engaged with the engage section 37. The lock member 171 further includes a movable section 174 at the side opposing to the position where the lock claw 173 is provided via the pivot 172.

Figure 47:
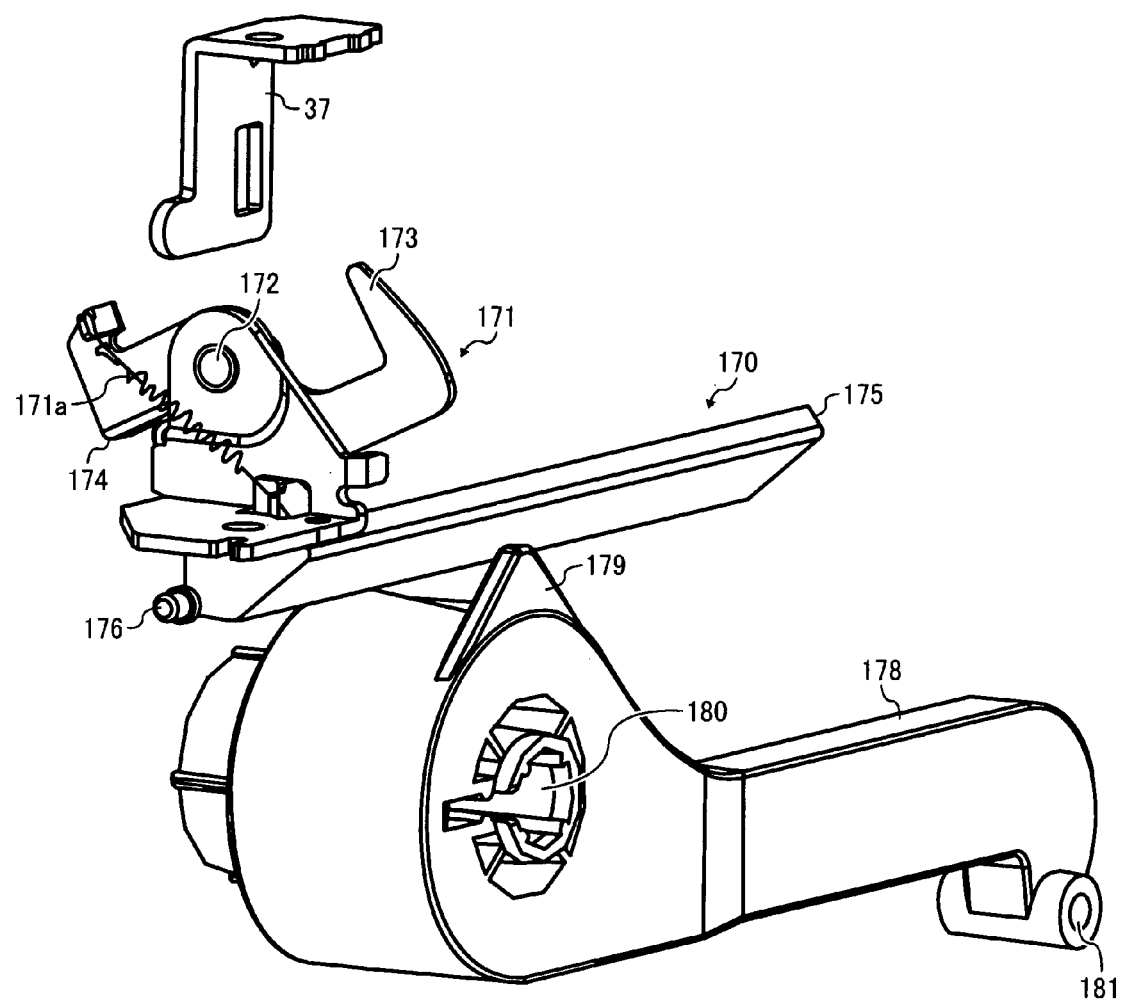
FIG. 47 is a perspective view illustrating the platen lock mechanism of FIG. 19 when the platen lock mechanism is in the release state, according to an example embodiment of the present invention.
Figure 48:
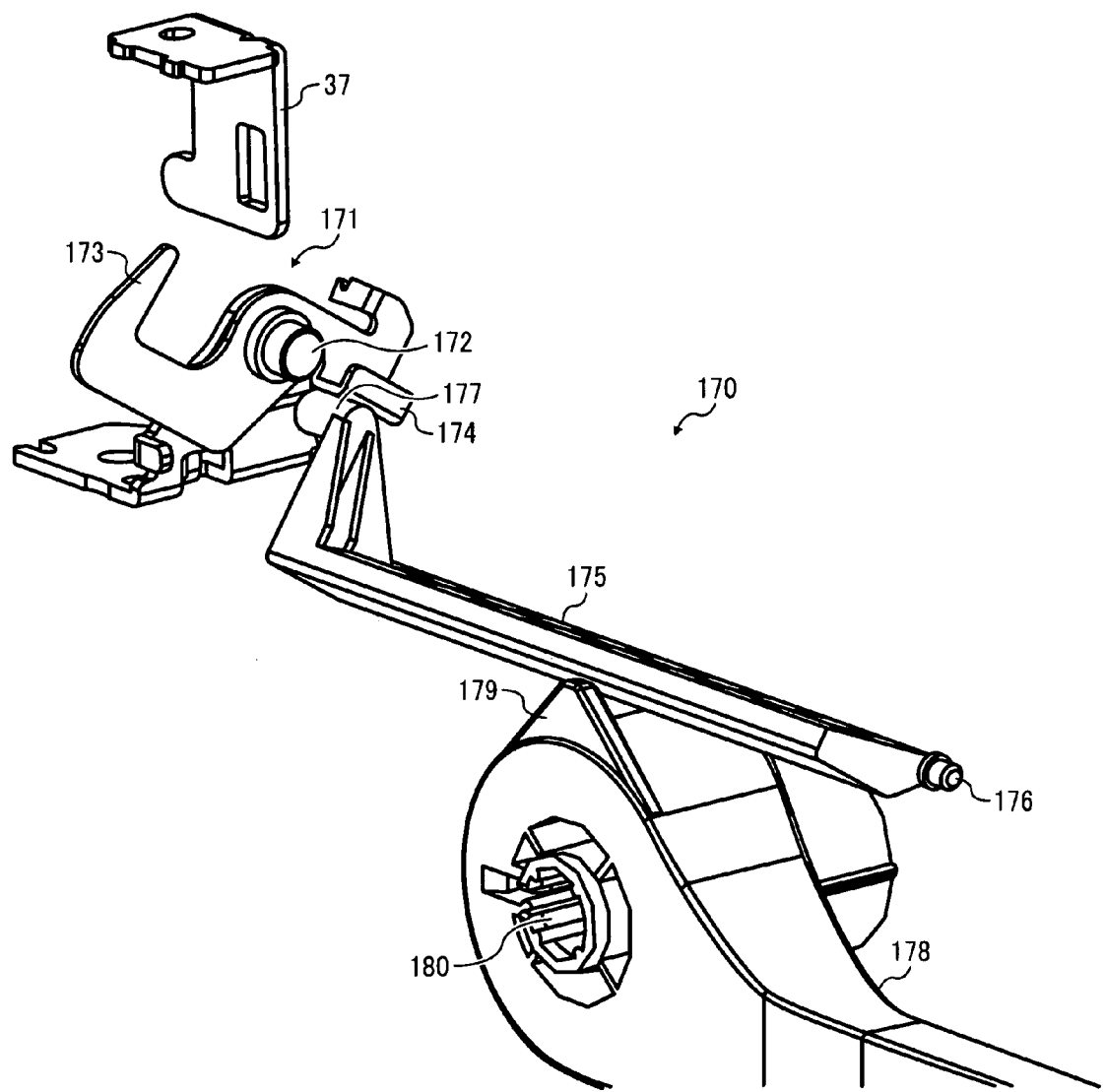
FIG. 48 is a perspective view illustrating the platen lock mechanism of FIG. 19 when the platen lock mechanism is in the release state, according to an example embodiment of the present invention.
Figure 49:
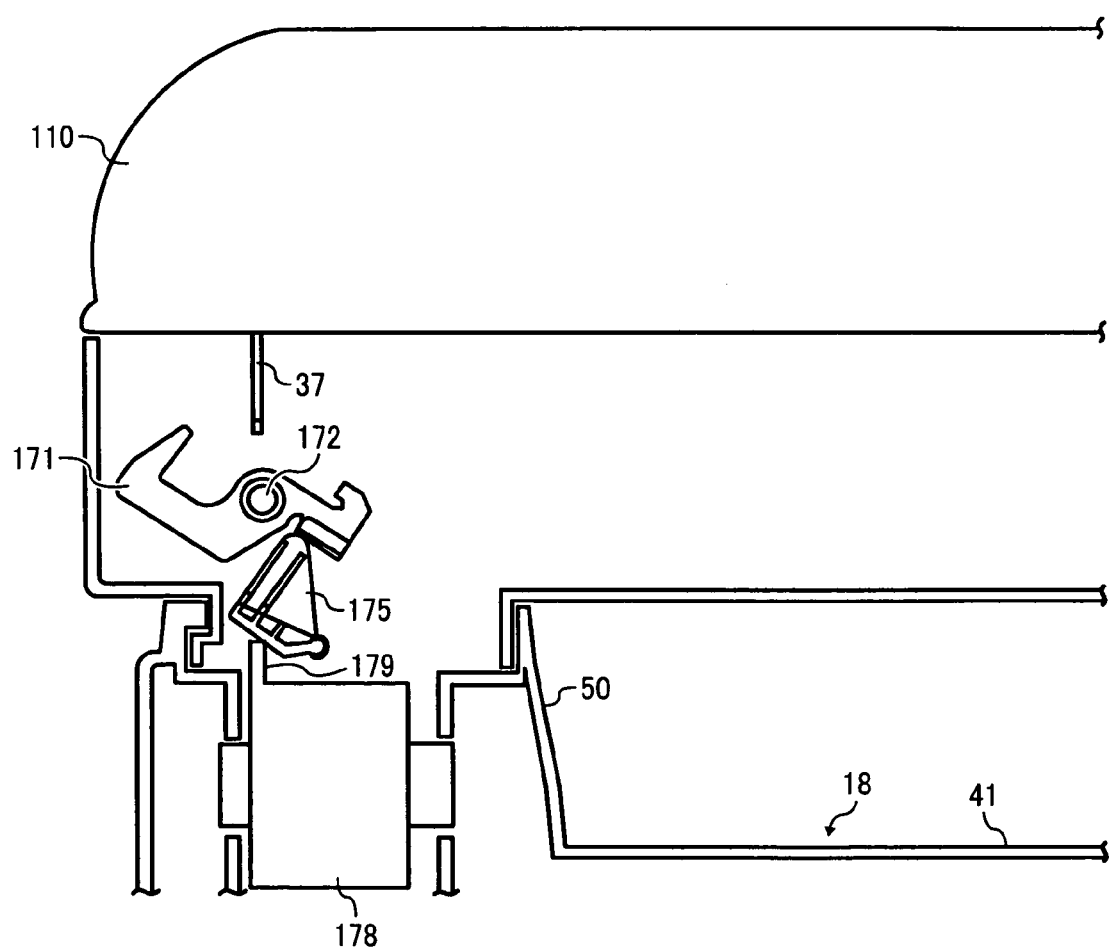
FIG. 49 is a cross-sectional view illustrating the platen lock mechanism of FIG. 19 when the platen lock mechanism is in the release state viewed from the front side of the image forming apparatus of FIG. 1, according to an example embodiment of the present invention.

The lock intermediate member 175 may be formed of plate having a rectangular shape. The lock intermediate member 175 includes a support shaft 176 along the longitudinal direction. The lock intermediate member 175 is rotatably provided on the image reading device 100 to be rotated around the support shaft 176. The lock intermediate member 105 further includes the movable pin 177, which is in contact with the movable section 174 of the lock member 171. Referring to FIG. 47, for example, the platen lock mechanism 170 may further include a spring 171a, which exerts a bias force to the lock member 171 to cause the lock member 171 to rotate in the counterclockwise direction of FIG. 47. The spring 171a exerts a bias force to the lock member 171 to cause to rotate around the pivot 172 so as to cause the movable section 174 to contact the movable pin 177. With this structure, the movable section 174 and the movable pin 177 are made in contact with each other.

As illustrated in any one of FIGS. 21, 22, 54A, 54B, the movable member 178 includes a first end section rotatably provided on the cover section 18 via a shaft 180, and a second end section 181 that slides along a rail 182 of the apparatus body 1. The movable member 178 further includes a cam section 179. The lock intermediate member 175 includes a side portion, which contacts the cam section 179 of the movable member 178. In this example, the cam section 179 is coaxial with the shaft 180.

Referring to any one of FIGS. 19, and 47 to 49, when the cover section 18 is closed, a tip portion of the cam section 179 contacts the lock intermediate member 175. The lock intermediate member 175 is tilted with respect to the support shaft 176. The lock claw 173 of the lock member 171 is separated away from the engage section 37. With this state, the operator may open the exposure glass cover 110.

Figure 20:
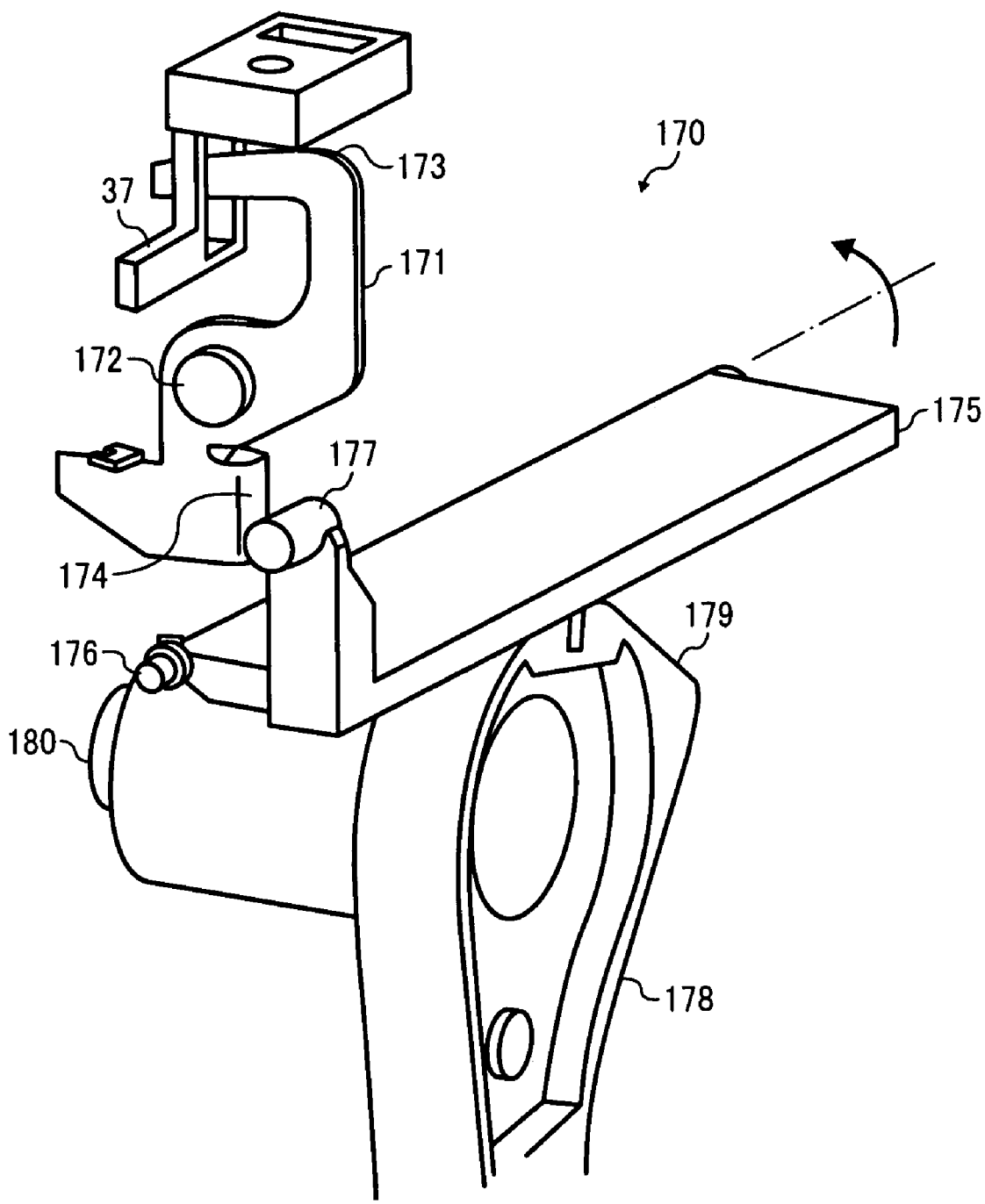
FIG. 20 is a perspective view illustrating a portion of the platen lock mechanism of FIG. 19 when the platen lock mechanism is in the locked state, according to an example embodiment of the present invention.
Figure 21:
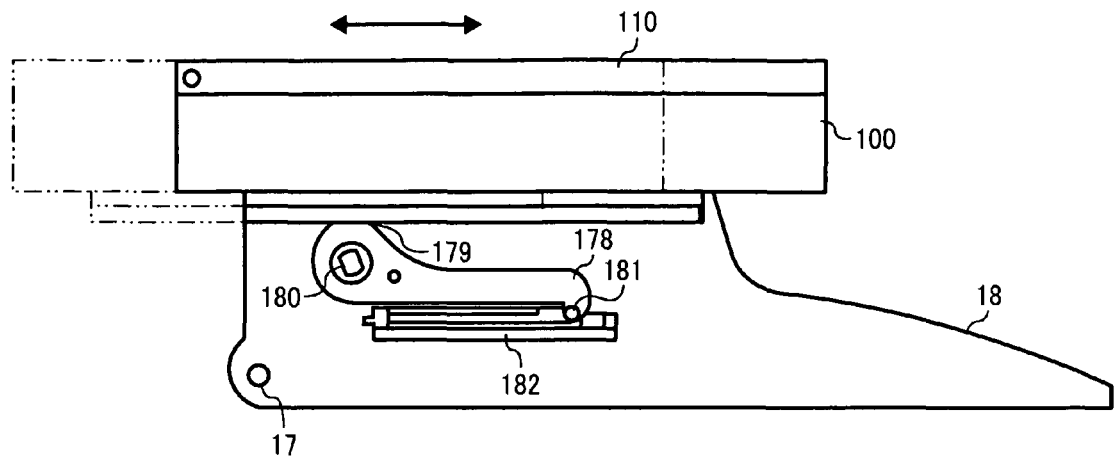
FIG. 21 is a cross-sectional view illustrating a portion of the platen lock mechanism of FIG. 19 when the cover section of the image forming apparatus of FIG. 1 is closed, according to an example embodiment of the present invention.
Figure 22:
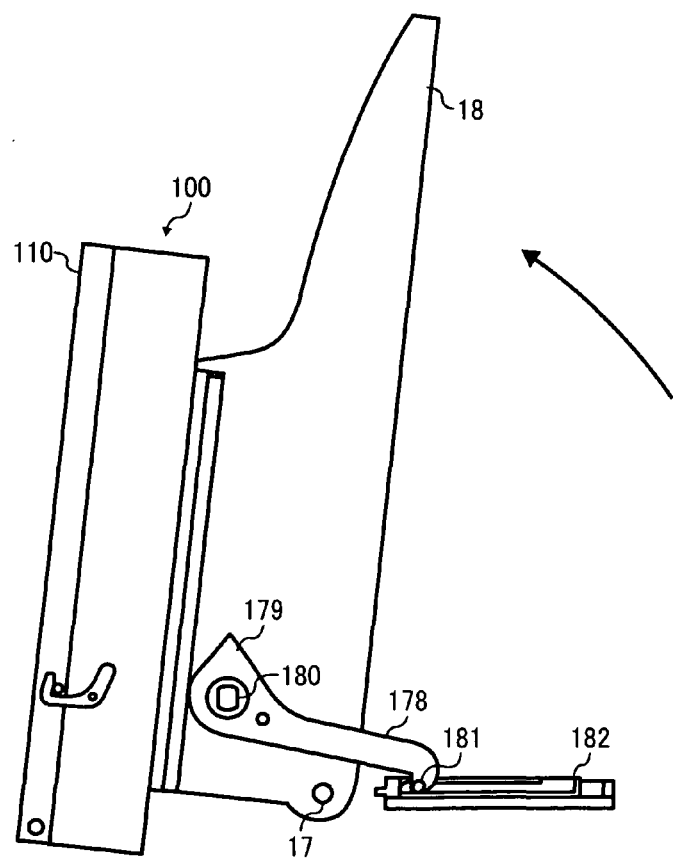
FIG. 22 is a cross-sectional view illustrating a portion of the platen lock mechanism of FIG. 19 when the cover section of the image forming apparatus of FIG. 1 is open, according to an example embodiment of the present invention.
Figure 50:
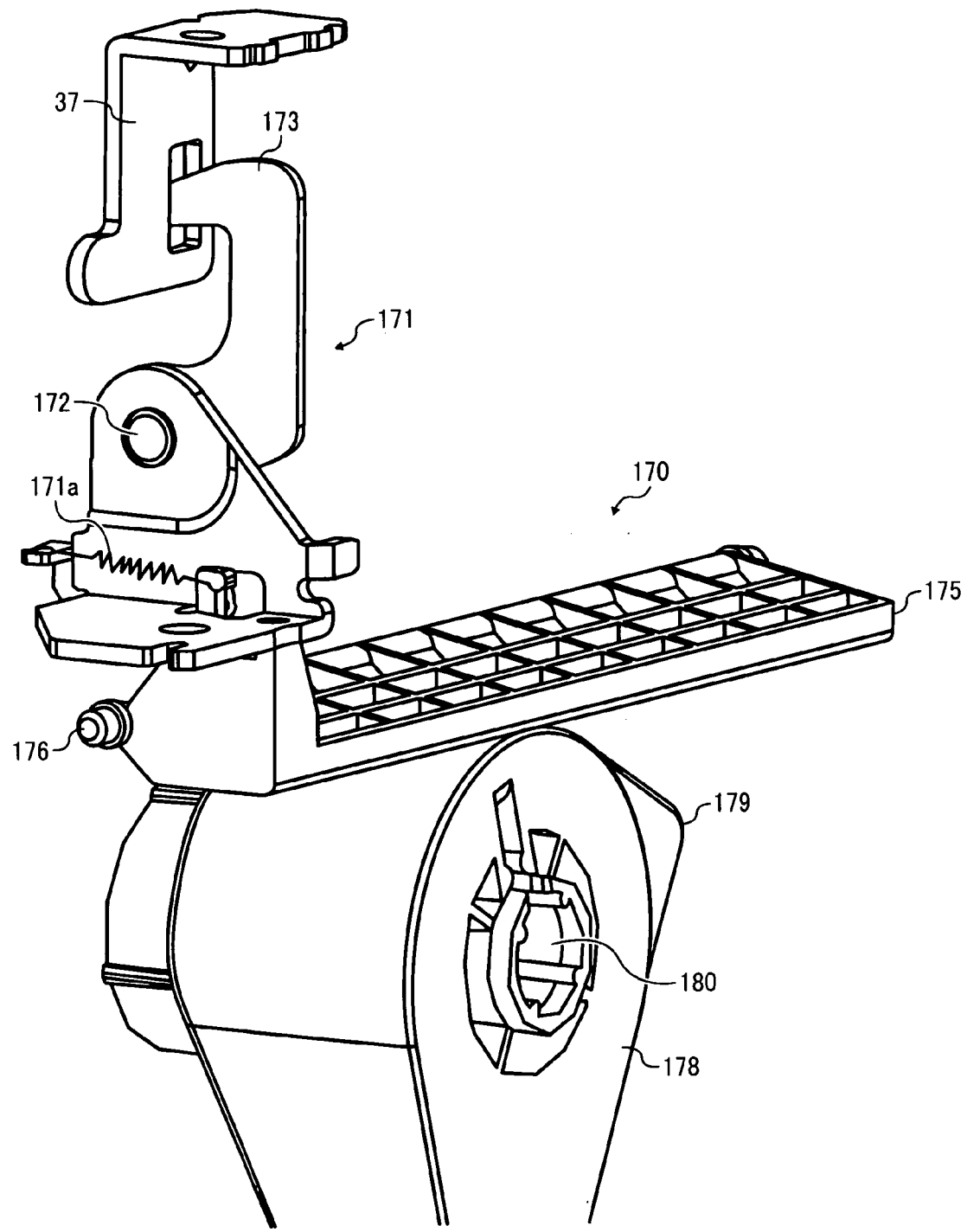
FIG. 50 is a perspective view illustrating the platen lock mechanism of FIG. 19 when the platen lock mechanism is in the locked state, according to an example embodiment of the present invention.
Figure 51:
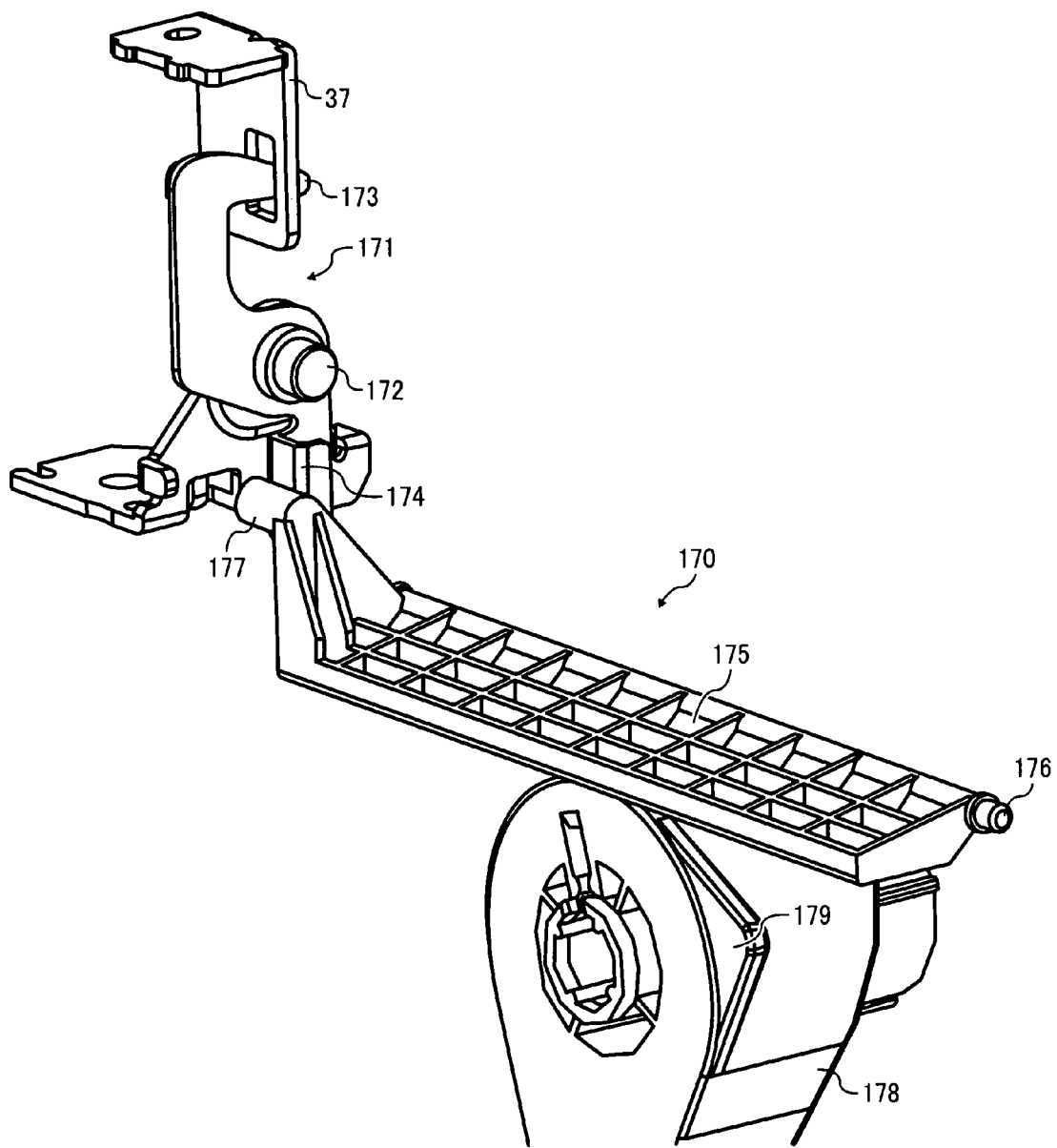
FIG. 51 is a perspective view illustrating the platen lock mechanism of FIG. 19 when the platen lock mechanism is in the locked state, according to an example embodiment of the present invention.
Figure 52:
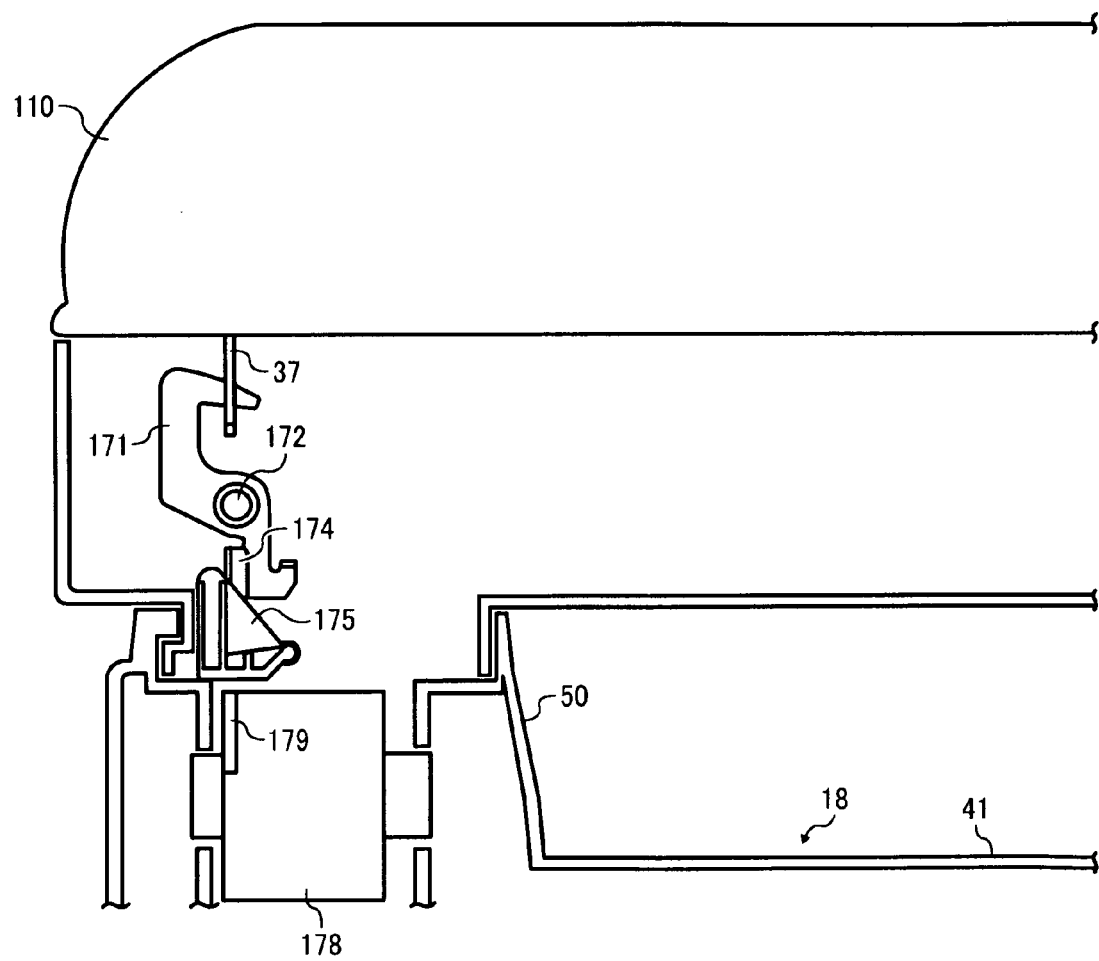
FIG. 52 is a cross-sectional view illustrating the platen lock mechanism of FIG. 19 when the platen lock mechanism is in the locked state, viewed from the front side of the image forming apparatus of FIG. 1, according to an example embodiment of the present invention.
Figure 53A:
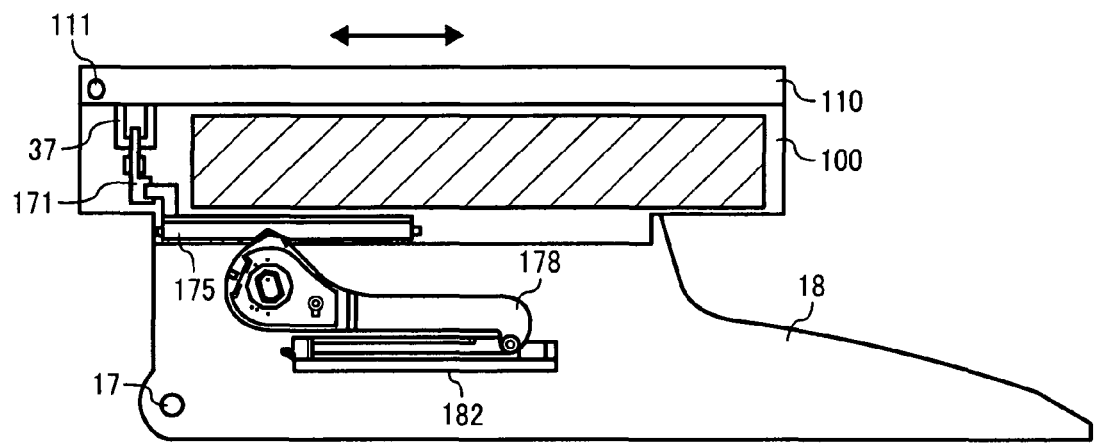
FIG. 53A is a cross-sectional view illustrating the platen lock mechanism of FIG. 19 when the platen lock mechanism is in the locked state and when the image reading device is at the original position, according to an example embodiment of the present invention.
Figure 53B:
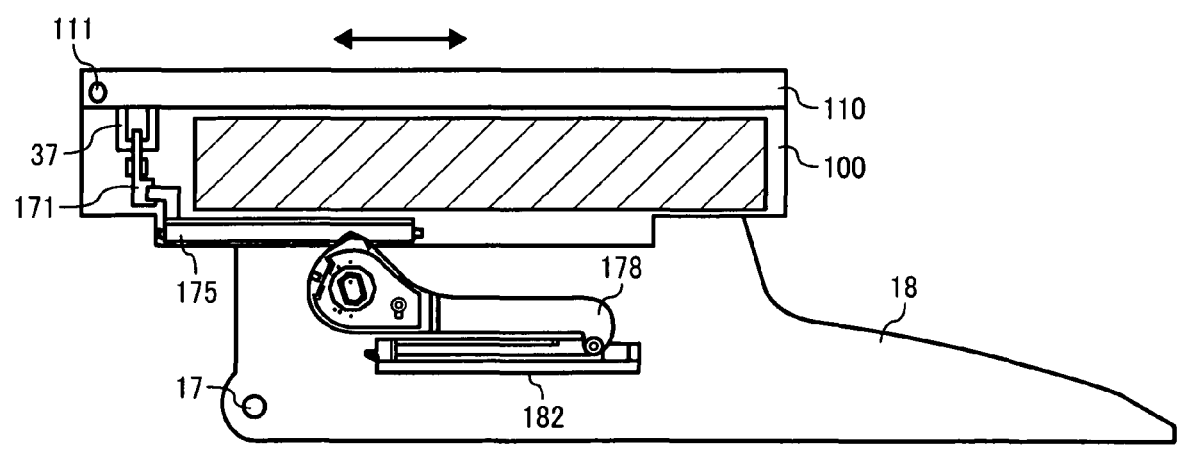
FIG. 53B is a cross-sectional view illustrating the platen lock mechanism of FIG. 19 when the platen lock mechanism is in the locked state and when the image reading device slides toward the rear of the image forming apparatus of FIG. 1, according to an example embodiment of the present invention.

When the cover section 18 rotates around the support shaft 17, as illustrated in FIG. 22, the second end section 181 of the movable member 178 slides along the rail 182. Further, as illustrated in FIG. 20, 50, or 51, as the cover section 18 opens, the movable member 178 rotates in the clockwise direction around the shaft 180. The tip portion of the cam section 179 separates from the lock intermediate member 175, and a circumferential section of the cam section 179 meets the lock intermediate member 175. As the tip portion of the cam section 179 is separated, the lock intermediate member 175 rotates around the support shaft 176 in the clockwise direction. The lock member 171 is rotated around the support shaft 172 in the counterclockwise direction to cause the lock claw 173 to engage with the engage section 37. With this engagement, the exposure glass cover 110 is made in the locked state with respect to the cover section 18, for example, as illustrated in FIGS. 50 to 52. In this manner, opening of the exposure glass cover 110 is prevented when the cover section 18 is open.

In this example, the longitudinal length of the lock intermediate member 175 is made longer than the slidable length of the image reading device 100. Further, the movable member 178 is located at the position in which the movable member 178 is not separated from the lock intermediate member 175 in spite of the position where the image reading device 100 is locked. Since the lock intermediate member 175 and the cam section 179 of the movable member 178 are kept in closely contact with each other, the platen lock mechanism 170 is capable of locking the exposure glass cover 110 despite the position where the image reading device 100 is locked.

Further, in this example, a stopper may be provided on the image reading device 100, which restricts a distance in which the lock intermediate member 175 rotates. For example, when the lock intermediate member 175 is at the position illustrated in FIG. 19, the rotation of the lock intermediate member 175 is restricted by the cam section 179. When the lock intermediate member 175 is at the position illustrated in FIG. 20, the rotation of the lock intermediate member 175 may be restricted by the stopper. With the stopper, the lock intermediate member 175 may be prevented from interfering smooth sliding of the image reading device 100 by reaching the position below the bottom surface of the image reading device 100.

Figure 24:
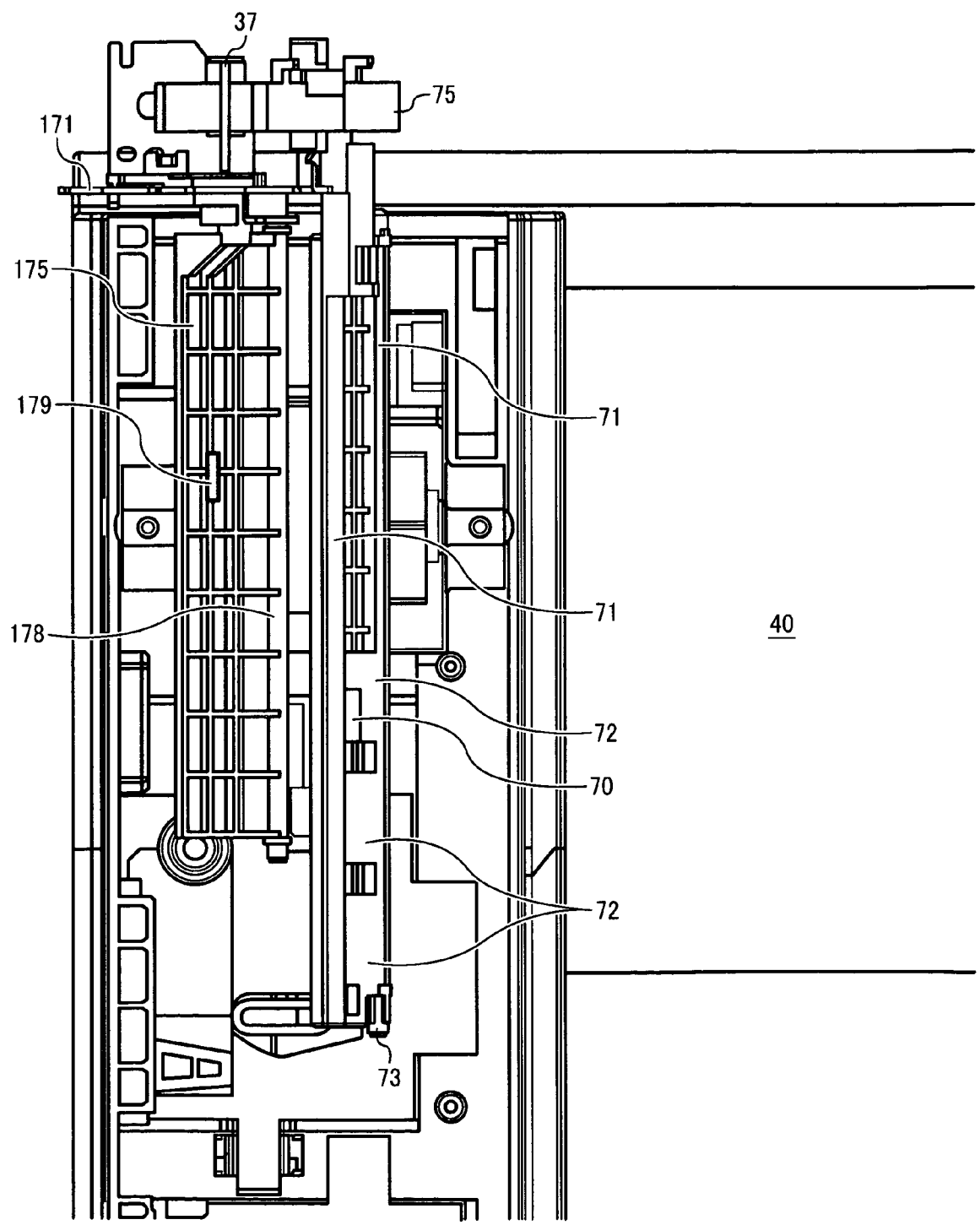
FIG. 24 is a plan view illustrating the arrangement of the platen lock mechanism of FIG. 19 with respect to the cover lock mechanism of FIG. 4, according to an example embodiment of the present invention.
Figure 56:
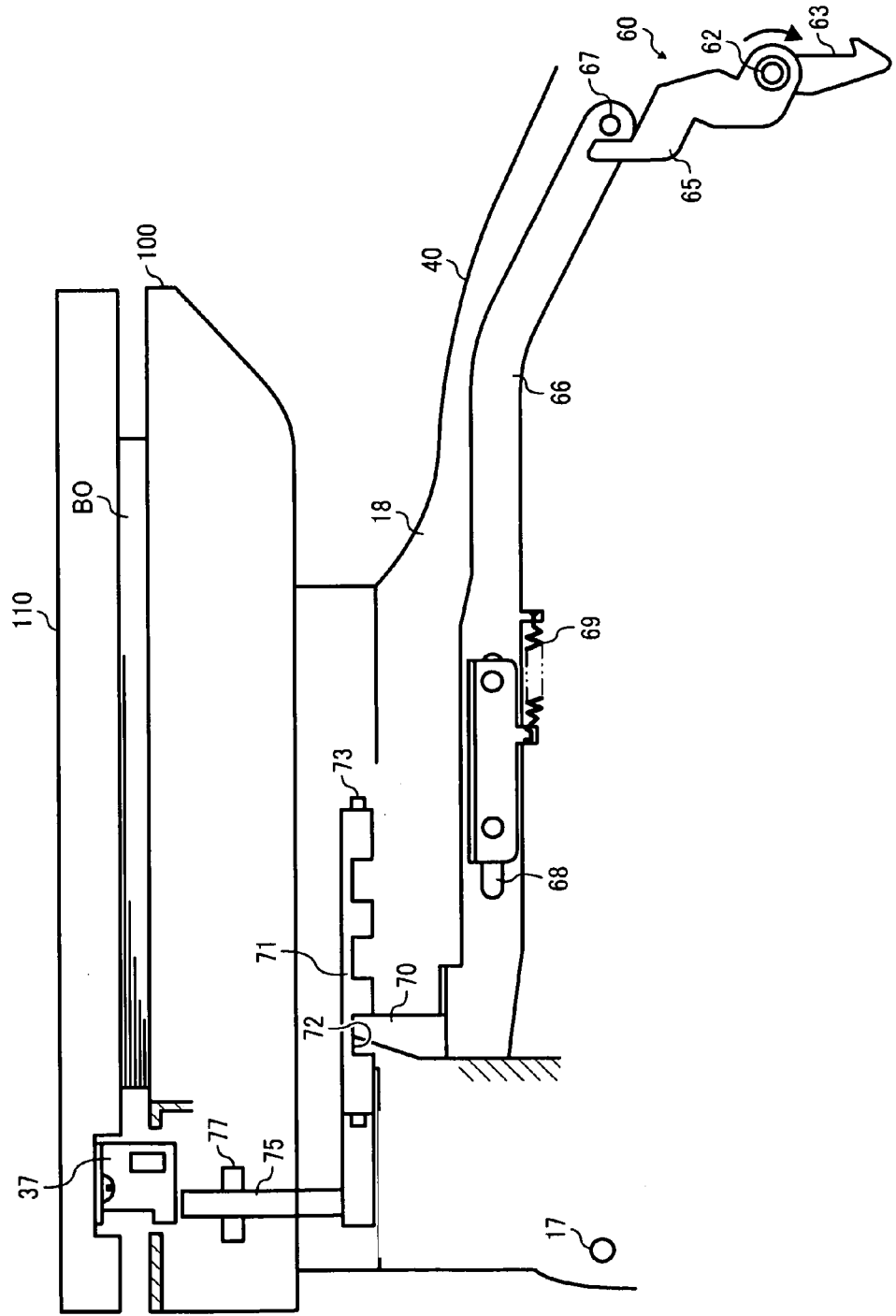
FIG. 56 is a cross-sectional diagram illustrating the cover lock mechanism of FIG. 4 when the cover lock mechanism is in the locked state, according to an example embodiment of the present invention.

Referring to FIG. 24, which illustrates a cross-section of the support section 51 viewed from the front side of the apparatus body 1, the arrangement of a portion the cover lock mechanism 60 and a portion the platen lock mechanism 170 when the exposure glass cover 110 is not in close contact with the exposure glass 102 is explained. FIG. 56 illustrates the arrangement of a portion of the cover lock mechanism 60 and a portion of the platen lock mechanism 170 viewed from the bottom surface of the image reading device 100.

Referring to FIG. 24, the convex section 70 that engages with the lock release 71, the slide member 66, the movable member 178 that engages with the lock intermediate member 175, and the cam section 179 are provided along the direction Y. The slide member 66 is provided in the direction X along with the surface 41 of the output sheet tray 40.

Referring to FIG. 56, on the surface of the image reading device 100, the lock release 71 that engages with the convex section 70, the concave section 72, and the lock intermediate member 175 that engages with the cam 179 of the movable member 178 are provided in the direction Y in a manner not interfering with each other.

As described above referring to FIG. 1, the image forming apparatus of FIG. 1 is provided with the cover lock mechanism 60. When the cover section 18 is rotated after releasing the locked state of the cover lock mechanism 60 when the exposure glass cover 110 is closed, the surface 41 of the output sheet tray 40 may be tilted with the rotation of the cover section 18. When the cover section 18 is rotated while the recording sheet S is placed on the output sheet tray 40, the recording sheet S may fall due to gravity. In order to prevent the recording sheet S to fall into the floor, a support section may be additionally provided at the rear side of the apparatus body 1. However, as described above referring to FIG. 1, it is preferable not to provide the support section at the rear side of the image forming apparatus of FIG. 1.

In order to suppress the above-described problem, in this example, the operation lever 61 is arranged on the surface 41 of the output sheet tray 40. In this manner, the cover lock mechanism 60 including the operation lever 61 is placed underneath the recording sheet S when the recording sheet S is output onto the output sheet tray 40. This structure may encourage the operator to remove the recording sheet S before opening the cover section 18.

Further, as described above referring to FIG. 1, the concave section 44 is provided so as to allow the operator to easily access the operation lever 61. The concave section 44 may also allow the operator to easily pick up the recording sheet placed on the output sheet tray 40, for example, by allowing the operator to insert one or more fingers into the concave section 44. In this example, since the recording sheet S is discharged after being arranged with reference to the center of the output sheet tray 40, the concave section 44 is formed so as to be symmetrical in shape around the center of the output sheet tray 40. Further, the concave section 44 has a length in the direction Y, which is greater than the width of the recording sheet S having a maximum width length that can be output by the image forming apparatus of FIG. 1.

The operation lever 61 of the cover lock mechanism 60 is provided at a sloped surface of the output sheet tray 40. The operation lever 61 has an upper surface, which does not protrude above the surface 41 of the output sheet tray 40. With this structure, the trailing edge of the recording sheet S being discharged may slide along the sloped surface of the output sheet tray 40 until it reaches the operation lever 61. The trailing edge of the recording sheet S is thus arranged with respect to the operation lever 61. The operation lever 61 may be provided at a location downstream of a portion in which the trailing edge of the recording sheet S is assumed to be landed in the direction Xa, including a location near the sheet discharging device 25 of FIG. 2.

Since the operation lever 61 is provided on the sloped surface of the output sheet tray 40, which is tilted toward the operator, the operator may easily find the operation lever 61. Further, the operation lever 61 is provided at the location, which is not covered by the bottom surface of the image reading device 100.

Figure 34:
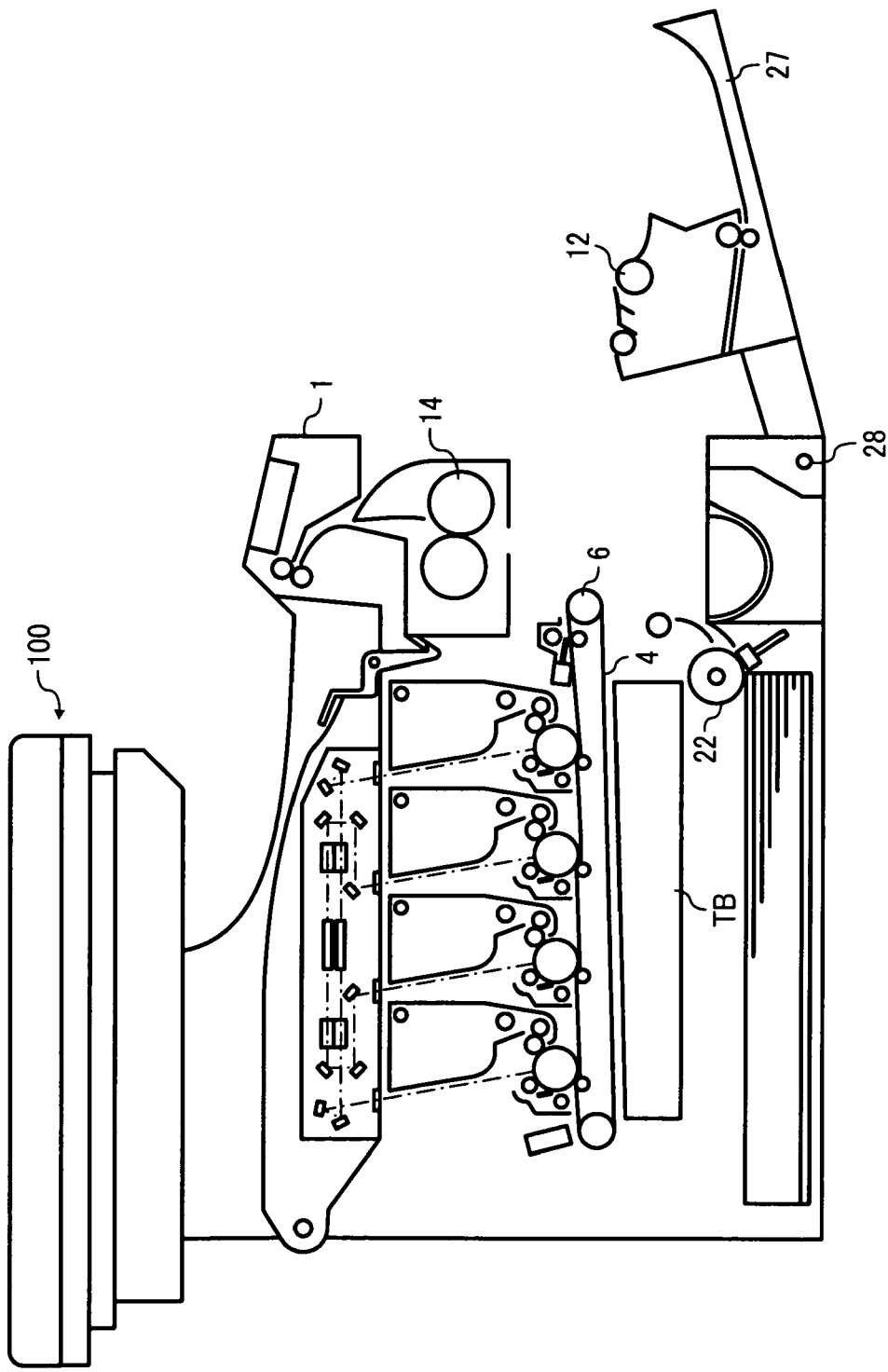
FIG. 34 is a plan view illustrating the image forming apparatus of FIG. 1, when a front cover is open, according to an example embodiment of the present invention.

Referring to FIG. 34, the image forming apparatus of FIG. 1 further includes a front cover 27, which is rotatably provided on the apparatus body 1 via a hinge 28. When the front cover 27 is opened, a device provided inside the apparatus body 1, such as the intermediate transfer belt 4, a dispose toner bottle TB or the fixing device 14, may be easily replaced. Further, the recording sheet S, which may be jammed, may be easily removed.

Figure 35:
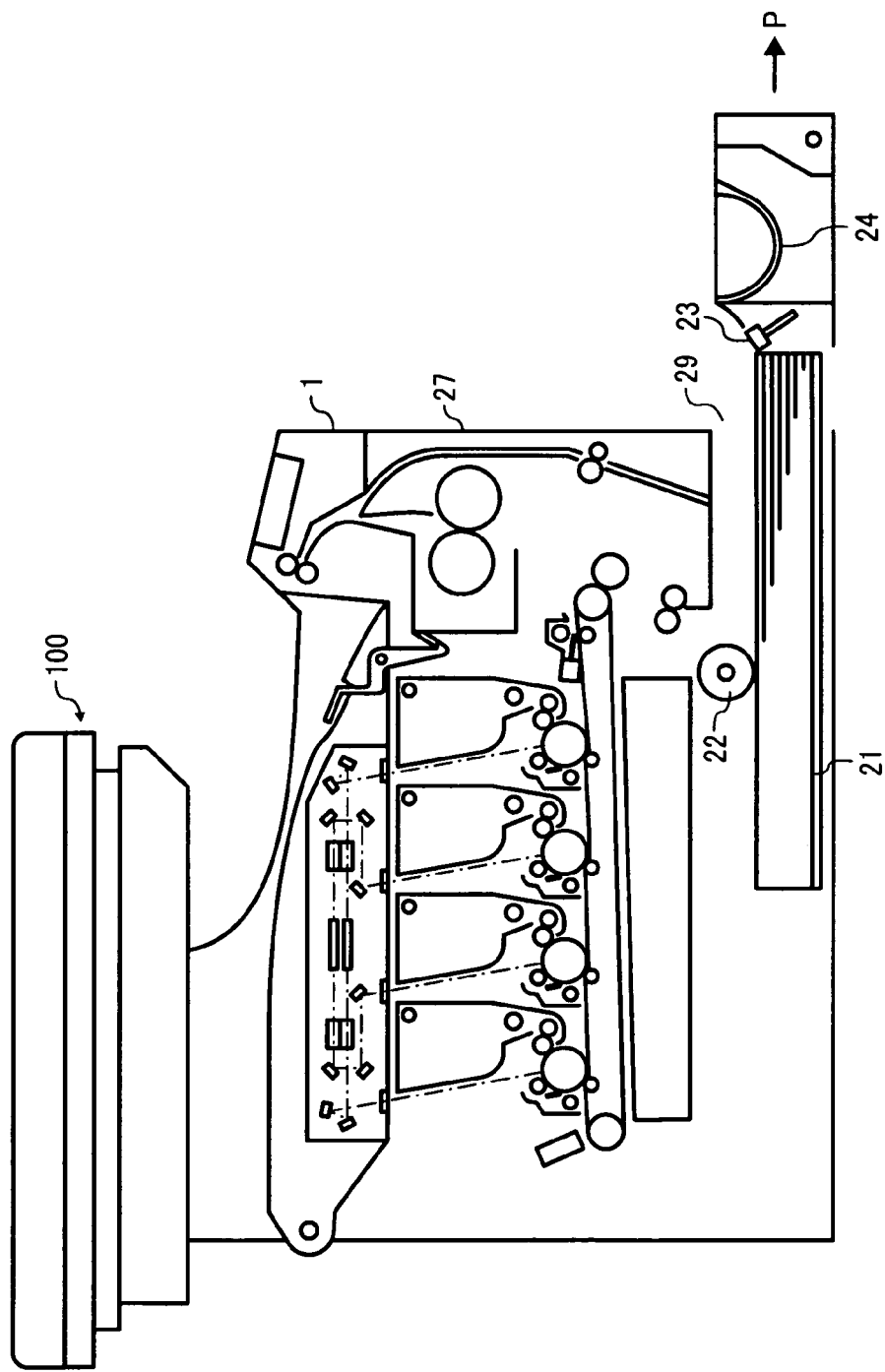
FIG. 35 is a plan view illustrating the image forming apparatus of FIG. 1 when the front cover of FIG. 34 is removed, according to an example embodiment of the present invention.

Referring to FIG. 35, the front cover 27 may be provided with an opening 29 in which the sheet tray 21 is inserted. For example, the sheet tray 21 may be inserted through the opening 29 from the front side of the apparatus body 1. As illustrated in FIG. 35, the sheet tray 21, the friction pad 23, and the sheet feeding path 24 may be integrally removed from the apparatus body 1 as they are pulled in the direction P. With this structure, maintenance or replacement may be performed from the front side of the apparatus body 1, thus improving operability. For example, the image forming apparatus of FIG. 1 may be placed at a location such as a location close to the wall, without considering the case in which the operator needs to work from the back side of the apparatus body 1.

Figure 31:
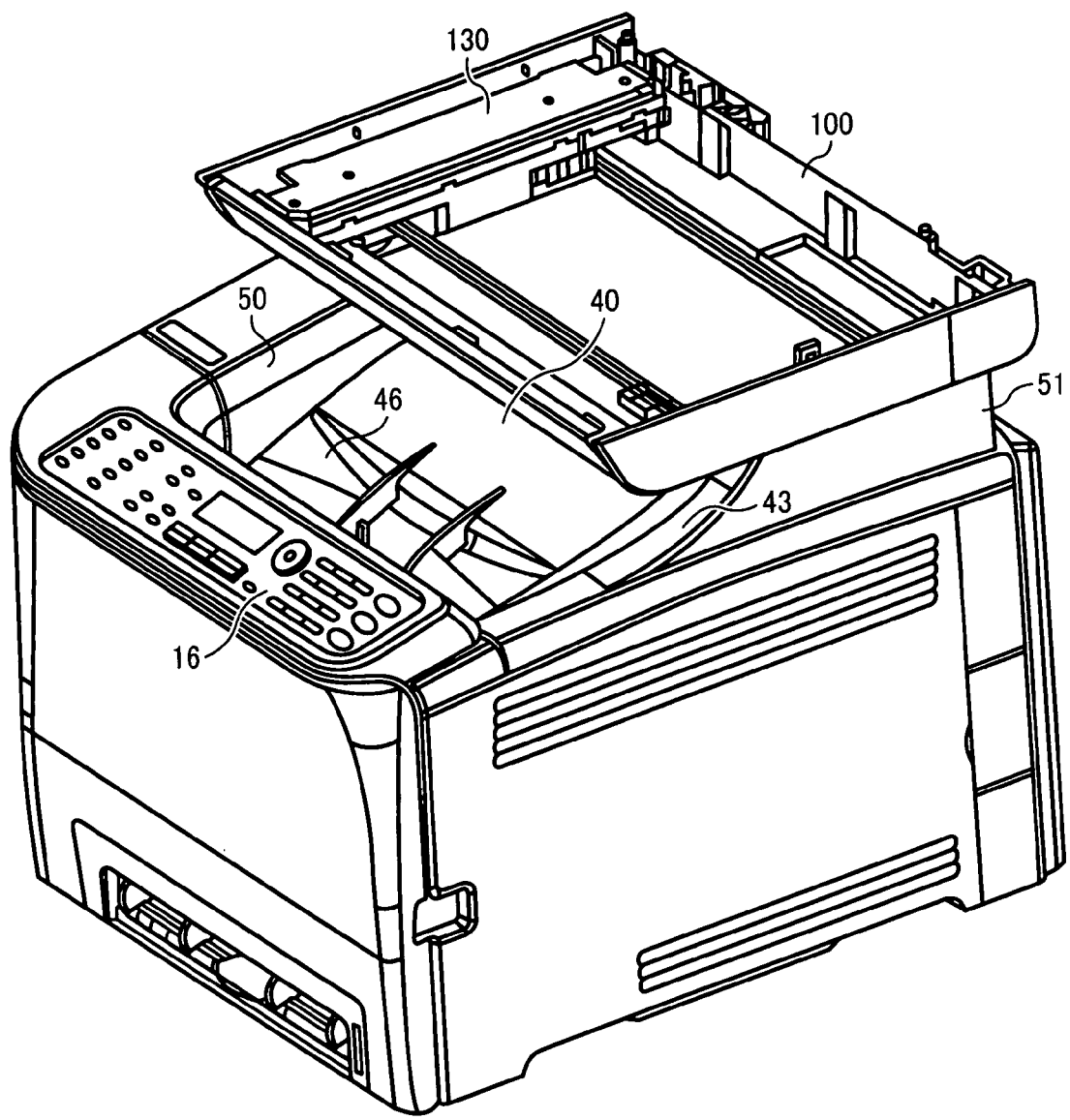
FIG. 31 is a perspective view illustrating the inside of the image reading device of FIG. 1, according to an example embodiment of the present invention.
Figure 32:
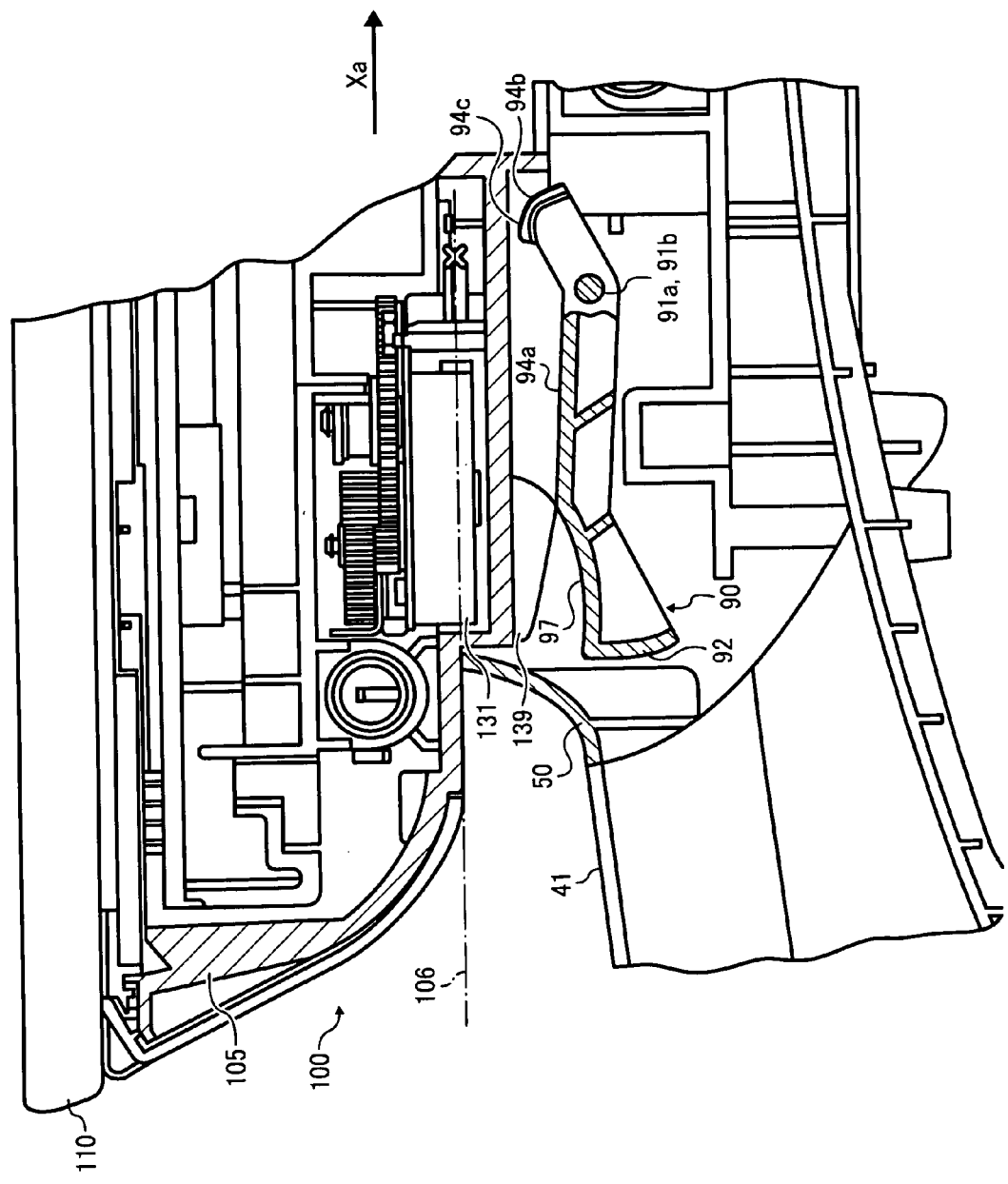
FIG. 32 is a cross-sectional view illustrating the engagement between the image reading device and a shield member of the image forming apparatus of FIG. 1, according to an example embodiment of the present invention.
Figure 33:
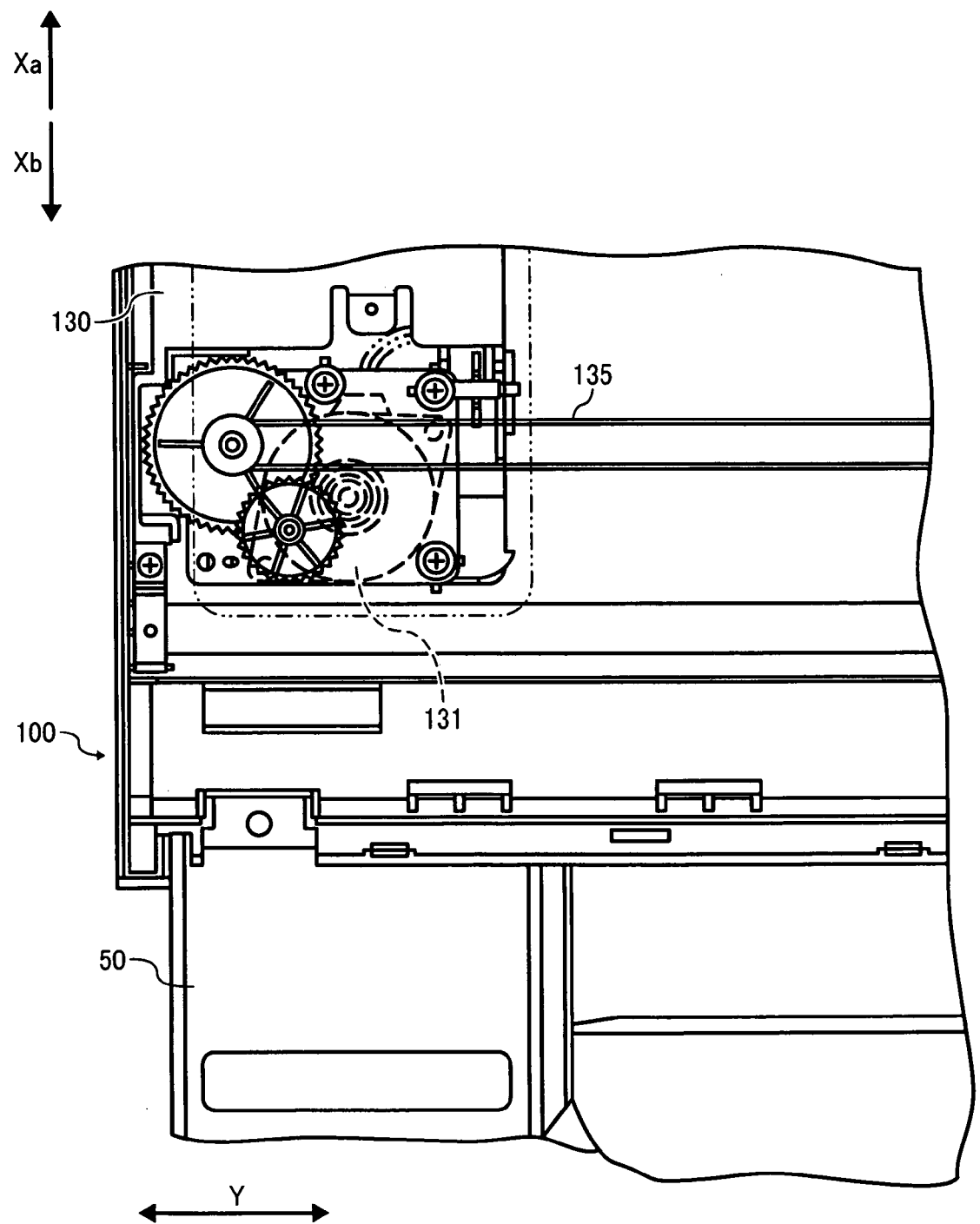
FIG. 33 is a plan view illustrating the arrangement of a drive motor of the image reading device of FIG. 1, according to an example embodiment of the present invention.

Referring now to FIGS. 31 to 33, a structure of the image reading device 100 as well as a structure of the support section 50 or 51 are further explained.

Referring to FIG. 31, the image forming apparatus of FIG. 1 further includes a groove 46, which allows the operator to easily pick up the recording sheet S output onto the output sheet tray 40. The groove 46 may be provided with a rib for improved operability.

Still referring to FIG. 31, the optical scanning module 130 of the image reading device 100 is provided at the left side, which faces the support section 50, when viewed from the front side of the apparatus body 1. The ADF 120 of the image reading device 100 is provided such that the reverse path 143 is provided at the left side and the document tray 121 is provided at the right side, when viewed from the front side of the apparatus body 1. With this structure, the load of the image reading device 100 is greater at the left side.

Further, the support section 51 at the right side of the apparatus body 1 is smaller in size than the support section 50 at the left side of the apparatus body 1. As described above referring to FIG. 30, the size of the support section 51 is made smaller for improved operability, while considering the load of the image reading device 100. This structure is based on assumption that there is a large number of users who are right-handed. For this reason, the image forming apparatus of FIG. 1 may be configured in a shape different from the shape shown in FIG. 1 for a left-handed user.

FIG. 32 is a cross-sectional view illustrating a front left portion of the image reading device 100 and a front portion of the support section 50. FIG. 33 is a plan view illustrating the inside of the image reading device 100 viewed from the above. Referring to FIGS. 32 and 33, the image reading device 100 further includes a drive transmission system including a driving device such as a drive motor 131, and a transmission device such as a gear and a timing belt, which is provided at the left side when viewed from the front side of the apparatus body 1. The drive motor 131 drives the optical scanning module 130.

Referring to FIG. 32, a reference numeral 105 indicates a lower portion of a housing of the image reading device 100. The housing 105 includes a projected portion that projects downward, in which the drive motor 131 is incorporated. A reference numeral 106 indicates the lowest point of the housing 105 except for the projected portion. As illustrated in FIG. 32, the projected portion of the housing 105 is provided at the position lower than an opening 59 (FIG. 38) of the support section 50.

Figure 38:
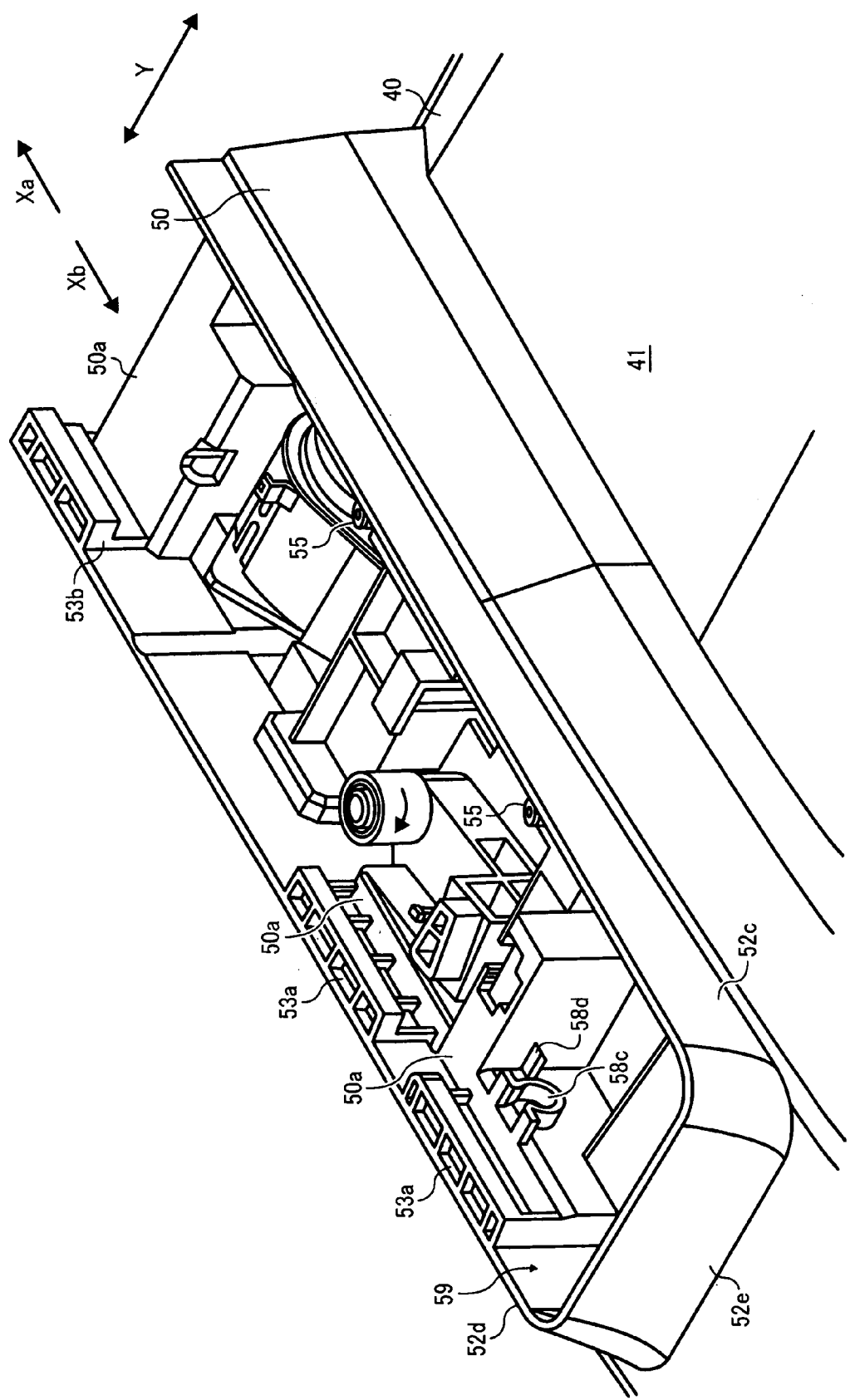
FIG. 38 is a perspective view illustrating a structure of the support section of FIG. 36, according to an example embodiment of the present invention.

Referring now to FIGS. 32 and 38, for example, the opening 59 is explained according to an example embodiment of the present invention.

As described above, the image reading device 100 is prevented from separating from the apparatus body 1 by stopper sections 53 and 54 that engage the rail sections 33 and 34, respectively. For improved strength, the support sections 50 and 51 each have a sufficient length in the front and back directions. Specifically, for the support section 50 that is provided at the left side, the surface 50a and the stopper section 53 are formed so as to extend to the front side as far as possible. With this structure, even when the operator puts his or her hand onto the image reading device 100, the image reading device 100 is kept stable.

However, when the operator slides the image reading device 100 in the direction Xb, the surface 50a and the stopper section 53a provided in the front portion of the support section 50 may be exposed. Especially when the front portion of the support section 50 is not flat, it may hurt the operator.

In view of the above, the front portion of the support section 50 may be formed of a flat surface, on which the image reading device 100 is mounted. In such case, the flat surface should be provided at a position above the position where a slide contact surface is formed between the surface 50a (FIG. 36) of the support section 50 and the surface 33a (FIG. 10) of the image reading device 100. When the slide contact surface between the support section 50 and the image reading device 100 is positioned above the position where the flat surface of the support section 50 is provided, the operator's hand or clothing may get caught by the image reading device 100 as the image reading device 100 slides.

Further, as described above referring to FIGS. 32 and 33, the image reading device 100 includes the optical scanning module 130, and the driving device including the drive motor 131 that drives the optical scanning module 130 via the transmission device.

Since the optical scanning module 130 moves in the direction X, a space that corresponds to the height of the optical scanning module 130 needs to be kept within the image reading device 100 throughout the entire length of the image reading device 100. In contrary, since the driving motor 131 is fixed at one position, it only requires a limited space within the image reading device 100. For this reason, as illustrated in FIG. 32, the driving motor 131 is incorporated in the projected portion of the housing 105. However, if the projected portion is located above the surface 41 of the output sheet tray 40, the projected portion may interfere with the recording sheet S being output onto or stacked on the output sheet tray 40. Further, with the projected portion, the number of recording sheets S that may be kept on the surface 41 may be reduced. For this reason, the projected part of the housing 105 of the image reading device 100 is inserted into the support section 50. With this structure, the image forming apparatus of FIG. 1 may be made small in size.

When the projected portion is inserted into the support section 50, the slide contact surface formed between the image reading device 100 and the support section 50, and an opening for receiving the projected portion may form an opening 59 as illustrated in FIG. 36 or 38. In this example, the opening 59 is formed between the surface 50a and the stopper section 53a at the front edge portion of the support section 50. More specifically, the opening 59 is surrounded by the walls 52c, 52d, and 52e. To enhance strength of the support section 50, especially the stopper section 53a, the front edge portion is integrally formed by the pair of sidewalls 52c and 52d and the front wall 52e.

When the image reading device 100 slides in the direction Xb while the opening 59 is exposed, the finger of the operator may be caught in the opening 59. In order to prevent this, a shield member may be provided, which covers the opening 59 when the image reading device 100 slides.

Referring now to FIGS. 39 to 46, a shield member 90 is explained according to an example embodiment of the present invention. The shield member 90 is a movable member, which moves between a first position at which the opening 59 is covered and a second position at which the opening 59 is exposed. For the descriptive purpose, the first and second positions may be referred to as a shield position and a standby position, respectively.

Figure 39:
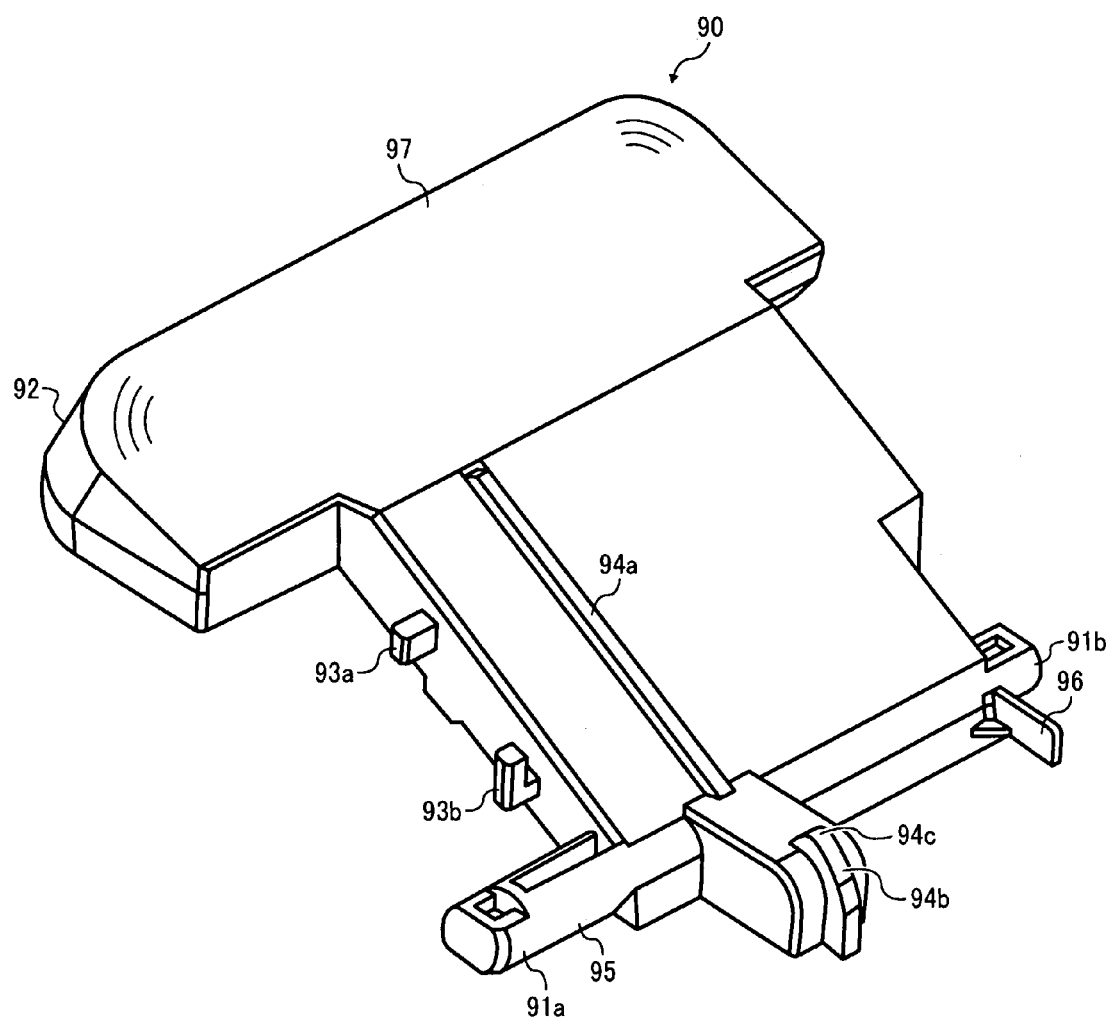
FIG. 39 is a perspective view illustrating an outer appearance of a shield member of the image forming apparatus of FIG. 1, according to an example embodiment of the present invention.

As illustrated in FIG. 39, the shield member 90 includes shaft parts 91a and 91b on which the shield member 90 pivots, shield surfaces 92 and 97 to shield the opening 59, first and second holders 93a and 93b, pivot regulators 94a, 94b, and 94c, a spring attachment part 95, and a stopper 96. In this example, the second holder 93b may be formed of a hook. The above-described components of the shield member 90 are integrally formed of a plastic member.

Figure 40:
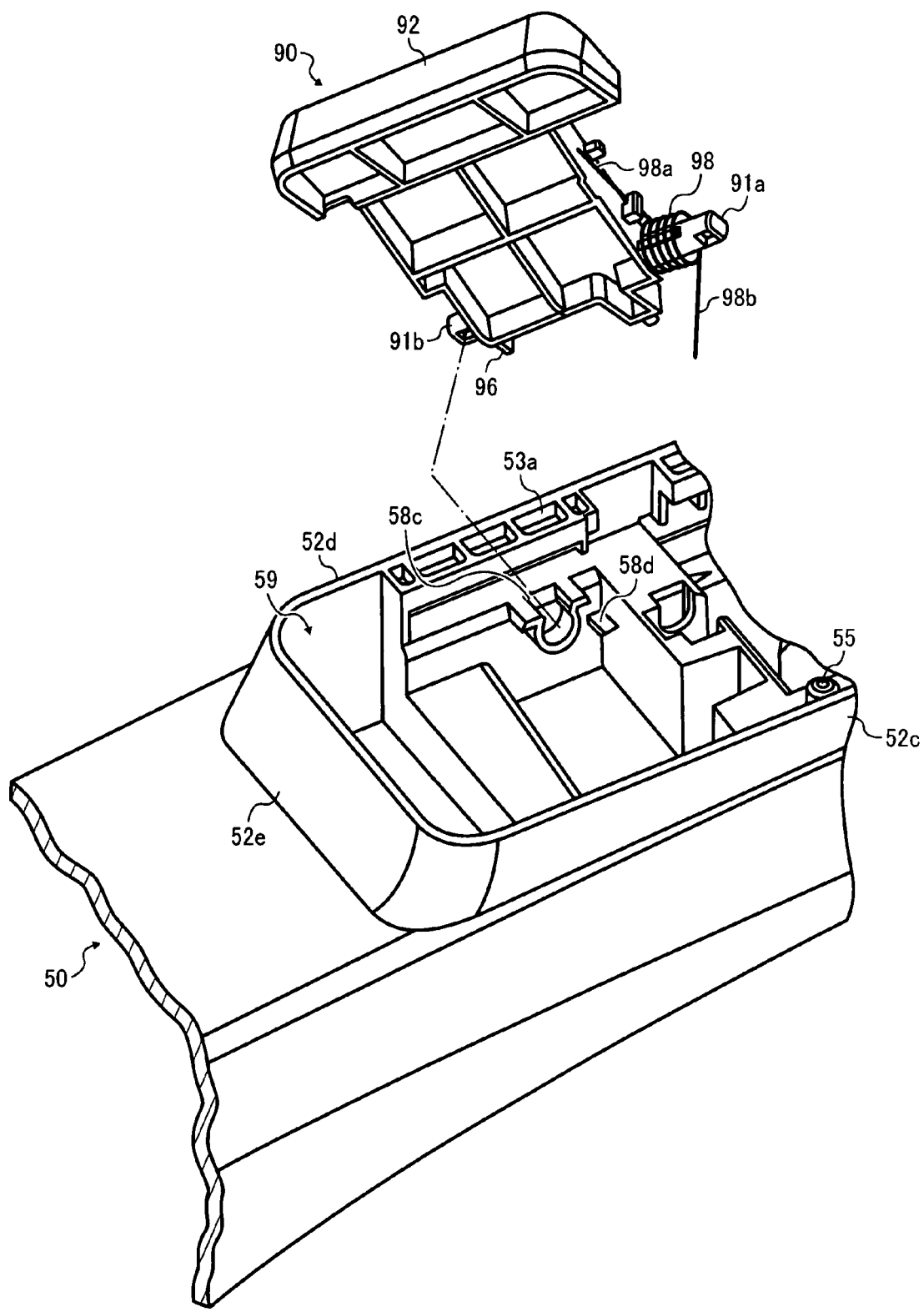
FIG. 40 is an illustration for explaining installation of the shield member to the support section of the image forming apparatus of FIG. 1, according to an example embodiment of the present invention.
Figure 41:
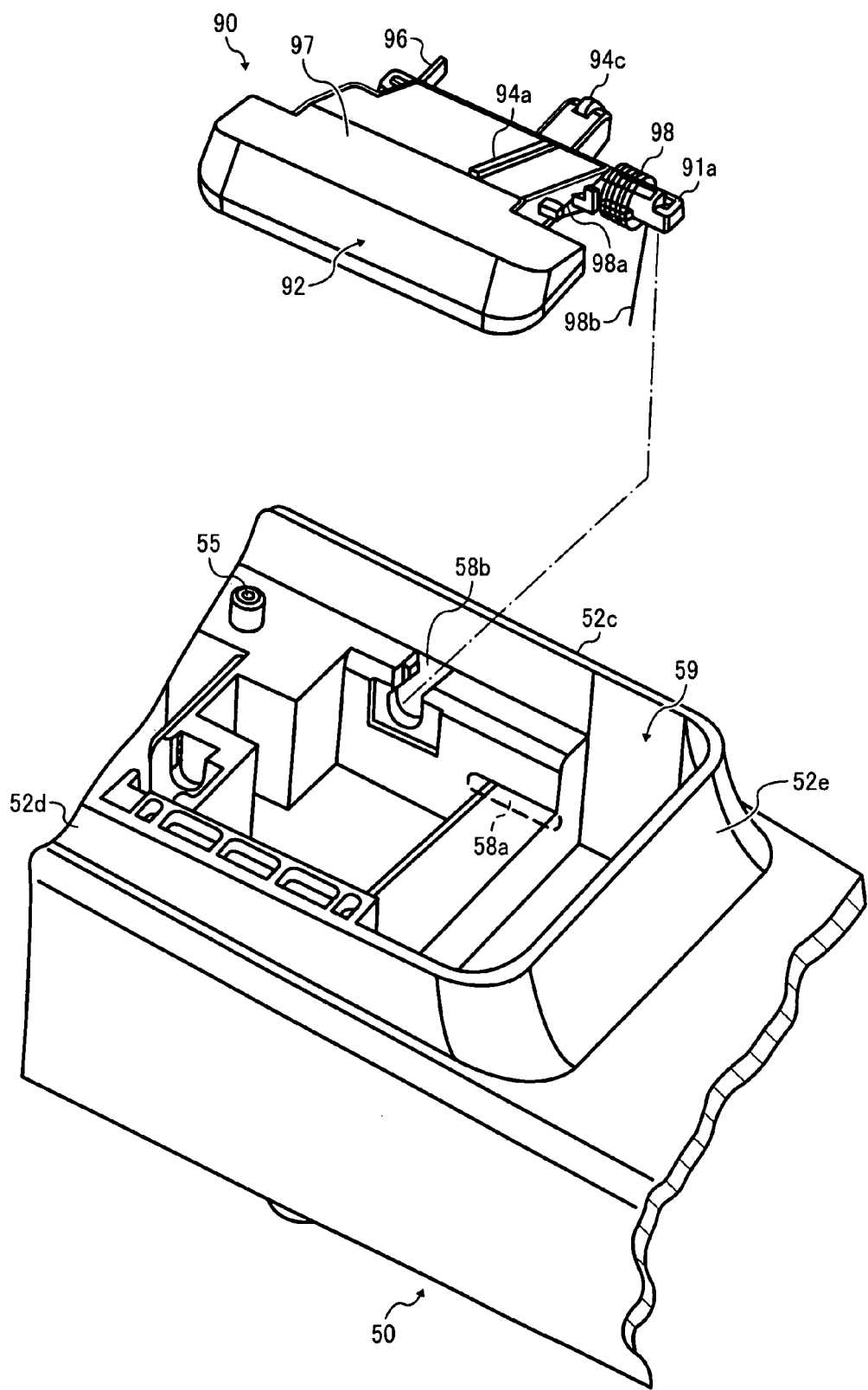
FIG. 41 is an illustration for explaining installation of the shield member to the support section of the image forming apparatus of FIG. 1, according to an example embodiment of the present invention.

Referring to FIGS. 40 and 41, a torsion spring 98 is wound around the spring attachment part 95 provided between the shaft parts 91a and 91b. The torsion spring 98 includes a first end 98a to be engaged with the first and second holders 93a and 93b. More specifically, the first end 98a is sandwiched between the first and second holders 93a and 93b. The torsion spring 90 further includes a second end 98b to be engaged with a spring engagement part 58a provided on a bottom surface of the supporting section 50 as indicated by a dashed-dot line in FIG. 42. The torsion spring 98, which is attached to the shield member 90 and the support section 50, transmits a torsion moment to the shield member 90. Referring to FIG. 40, the support section 50 further includes a stopper engagement part 58d in the inner side of the sidewall 52d.

Each of the shaft parts 91a and 91b includes an oval cutout having a width smaller than a diameter thereof. The support section 50 further includes bearings 58b and 58c integrally provided on the sidewalls 52c and 52d, having upward openings whose widths are larger than the widths of the oval cutouts of shaft parts 91a and 91b, respectively.

Figure 42:
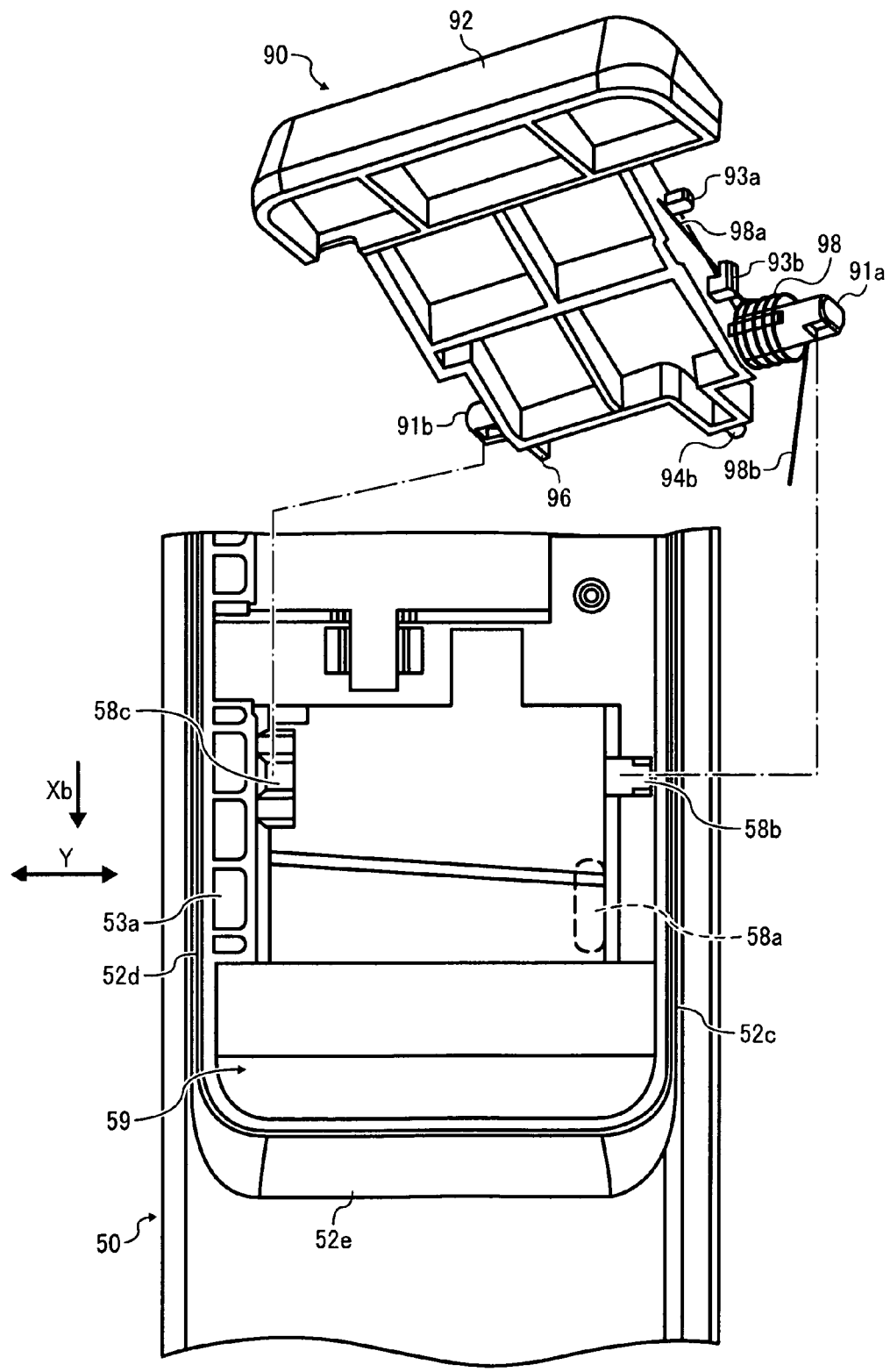
FIG. 42 is an illustration for explaining installation of the shield member to the support section of the image forming apparatus of FIG. 1, according to an example embodiment of the present invention.
Figure 43:
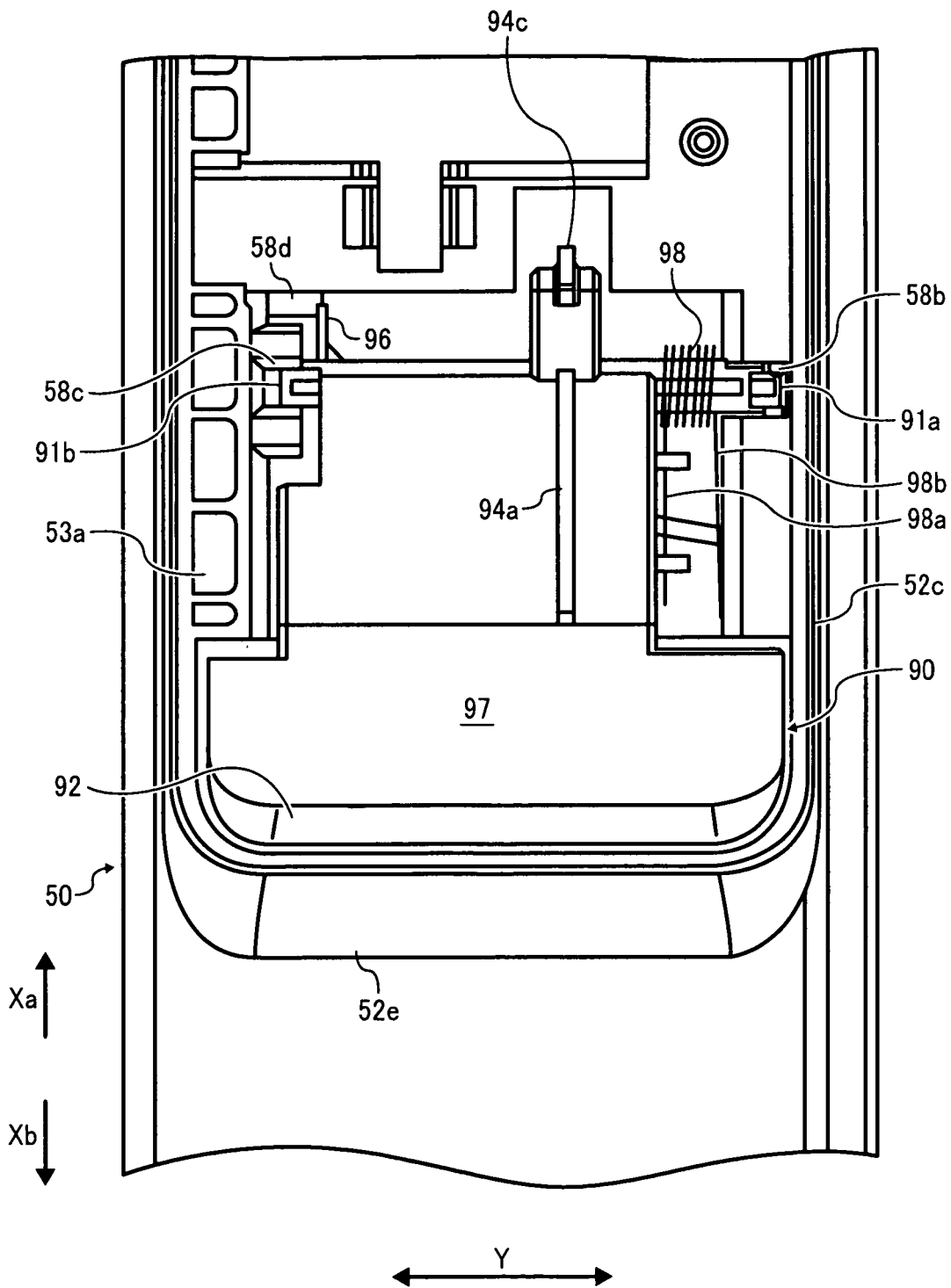
FIG. 43 is a plan view illustrating the shield member after being installed to the support section of the image forming apparatus of FIG. 1, according to an example embodiment of the present invention.

With this structure, as illustrated in FIGS. 42 and 43, the shaft parts 91a and 91b of the shield member 90 may be inserted easily from a circumferential direction into the bearings 58b and 58c that face the shaft parts 91a and 91b, respectively. When the shaft parts 91a and 91b are inserted into the bearings 58b and 58c and the shield member 90 is mounted on the front edge portion of the support section 50, the second end 98b of the torsion spring 98 contacts the spring engagement part 58a and is engaged therewith.

After the shield member 90 is inserted into the bearing 58b and 58c as illustrated in FIG. 43, the shield member 90 is pivoted on the shaft parts 91a and 91b toward the front wall 52e of the support section 50. While the shield member 90 is moved, the torsion spring 98 constantly applies an elastic force and a bias force to the shield member 90 so as to keep the shield member 90 at the first position, or the shield position. Further, the stopper 96 prevents the shield member 90 from returning to a position where the shield member 90 is mounted at the time of installation, so as to prevent the oval cutouts of the shaft parts 91a and 91b from disengaging from the bearings 58b and 58c, respectively. The stopper 96 tends to bend in a rotary axis direction of the shield member 90. As the shield member 90 pivots around the shaft parts 91a and 91b, the stopper 96 contacts the stopper engagement part 58d provided in the support section 50 and bends to an extent to go over the stopper engagement part 58d. After going over the stopper engagement part 58d, the stopper 96 remains at the side of the stopper engagement part 58d. This structure prevents the oval cutouts of the shaft parts 91a and 91b from returning to the position where the openings of the bearings 58b and 58c are provided, respectively, thus preventing the shield member 90 from disengaging from the opening 59.

Referring now to FIGS. 44A, 44B, 45A, 45B, and 46, the shield surfaces 92 and 97 that cover the opening 59 and the pivot regulators 94a, 94b, and 94c are described, together with operation of the shield member 90, according to an example embodiment of the present invention.

Figure 46:
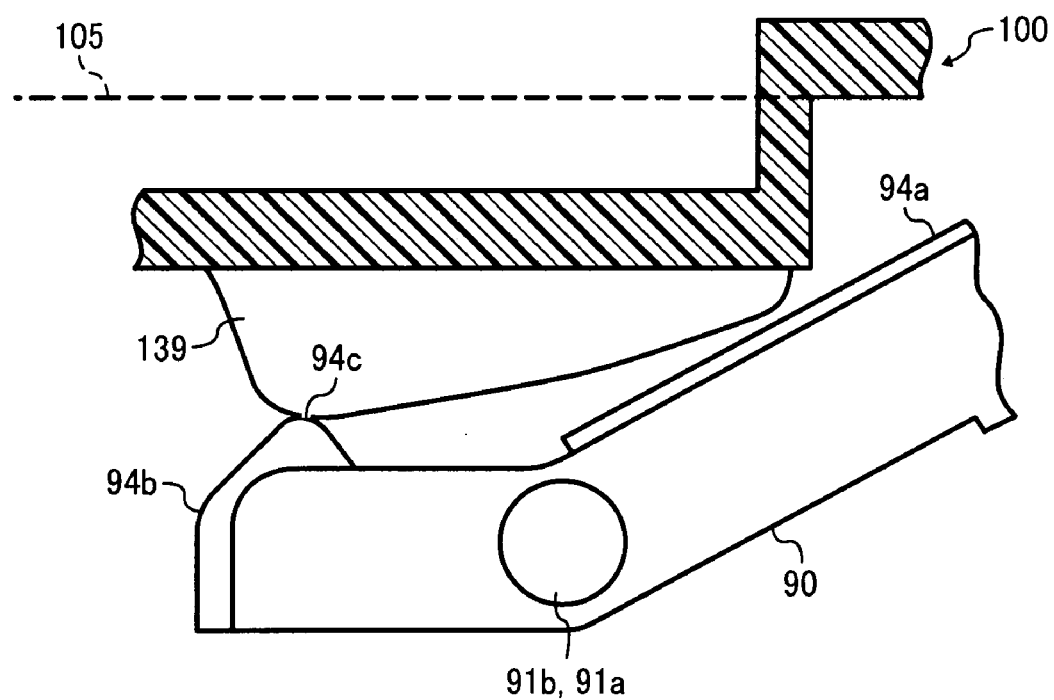
FIG. 46 is a enlarged cross-sectional view illustrating a portion D of FIG. 45B.

The shield member 90 operates cooperatively with sliding of the image reading device 100. The engagement part 139, which is formed of a plate projected downward, is integrally provided on the bottom surface of the image reading device 100, at a position beneath the drive motor 131. FIG. 46 illustrates a section where the engagement part 139 and the shield member 90 are engaged. Referring to FIG. 46, the engagement part 139 is made of a cam having an outline so as to smoothly engage with the pivot regulators 94a and 94c within the slidable range of the image reading device 100.

Still referring to FIG. 46, the shield member 90 is provided with the pivot regulator 94a at the position facing the engagement part 139. The pivot regulator 94a restricts movement of the shield member 90. As described above, the image reading device 100 is installed as it slides in the direction Xb from the rear side of the apparatus body 1. When the image reading device 100 slides in the direction Xb against the bias force of the torsion spring 98 illustrated in FIG. 43, a front edge portion of the engagement part 139 contacts the pivot regulator 94a before the image reading device 100 reaches a position illustrated in FIGS. 44B and 45A. The contact made between the engagement part 139 and the pivot regulator 94a causes the shield member 90 to pivot about the shaft parts 91a and 91b in the clockwise direction in FIG. 45A. After the front edge portion of the engagement part 139 contacts the pivot regulator 94a, the rear edge portion of the engagement part 139 further causes the shield member 90 to pivot in the clockwise direction while contacting the pivot regulator 94a. When the image reading device 100 slides to the front edge of the support section 50 illustrated in FIG. 44B, the shield member 90 is at the standby position illustrated in FIG. 45A. The angle of the shield member 90 at the standby position is greater than that of the shield member 90 at the shield position and smaller than that of the shield member 90 when it is mounted.

Figure 44A:
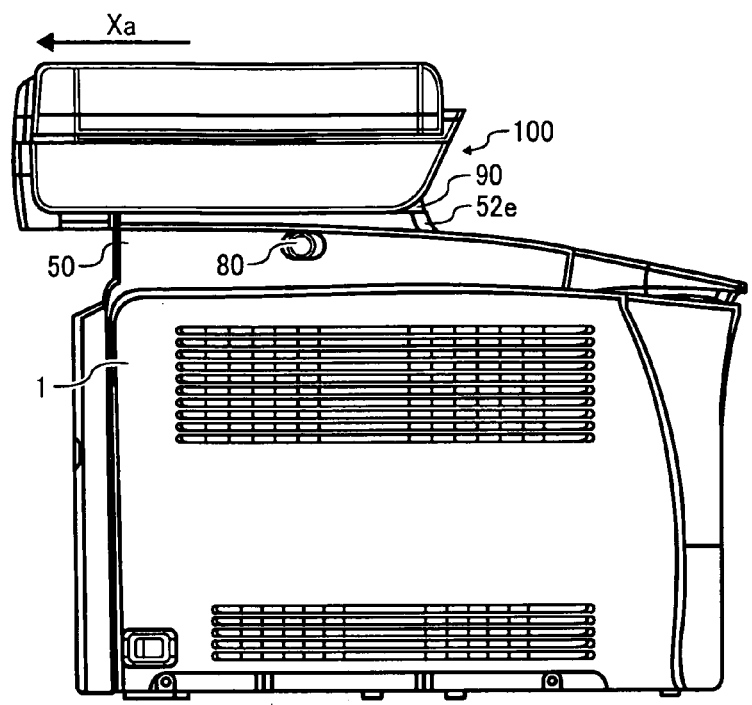
FIG. 44A is an illustration for explaining the position of the shield member when the image reading device slides in the maximum slidable range to the rear of the image forming apparatus of FIG. 1, according to an example embodiment of the present invention.
Figure 44B:
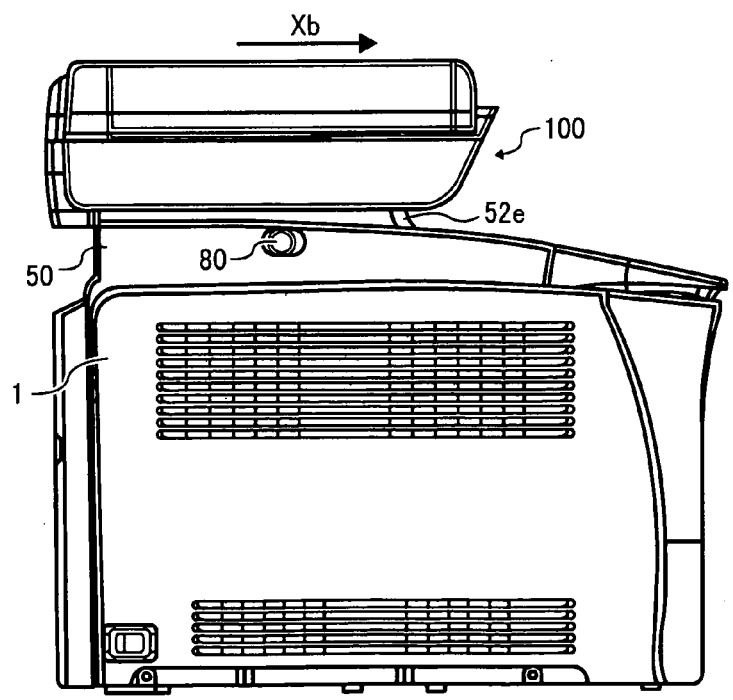
FIG. 44B is an illustration for explaining the position of the shield member when the image reading device slides in the maximum slidable range to the front of the image forming apparatus of FIG. 1, according to an example embodiment of the present invention.

When the shield member 90 is at the standby position, the back side of the image reading device 100 aligns with the back side of the apparatus body 1 as illustrated in FIG. 44B. In this state, the image forming apparatus of FIG. 1 has smallest in size and has less concavity and convexity. Thus, the image forming apparatus of this state is desirable for shipping, as it requires less packaging material and the number of image forming apparatuses that can be shipped at one time can be increased. When shipped, the screw 56 prevents the image reading device 100 from being separated from the support sections 51 and 50 as described above.

Operation of the shield member 90 when the image reading device 100 slides in the direction Xb is described below according to an example embodiment of the present invention.

Figure 45A:
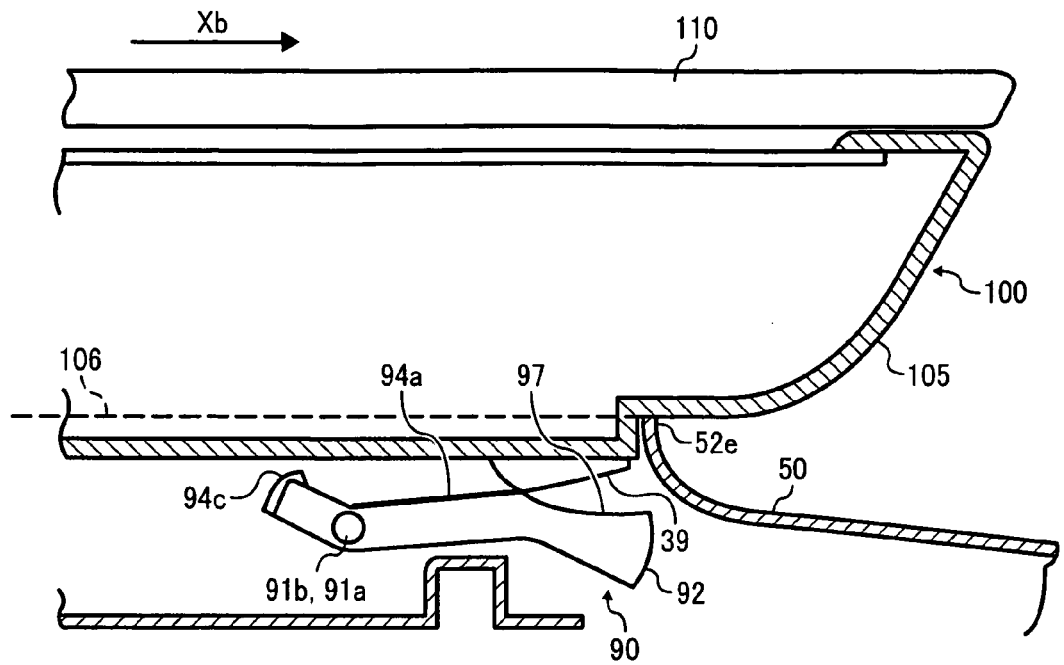
FIG. 45A is an illustration for explaining the engagement between the image reading device and the shield member of the image forming apparatus of FIG. 1, when the image reading device slides to the front position of FIG. 44B.
Figure 45B:
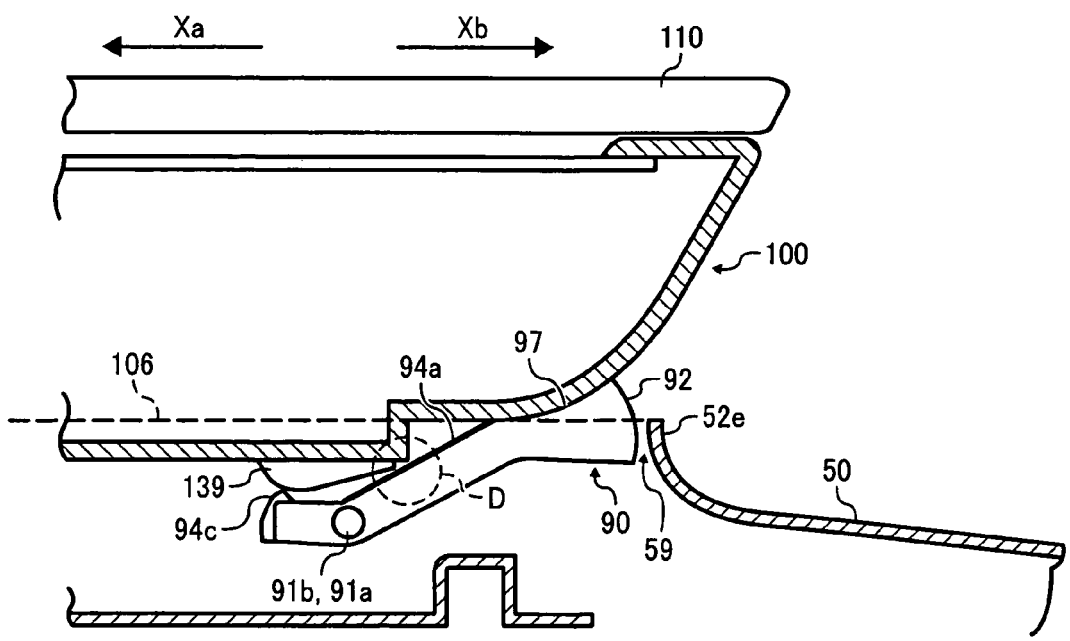
FIG. 45B an illustration for explaining the engagement between the image reading device and the shield member of the image forming apparatus of FIG. 1, when the image reading device slides to the rear position of FIG. 44A.

Referring to FIG. 45B, when the image reading device 100 is slid in the direction Xa to the rearmost position, the shield member 90 pivots on the shaft parts 91a and 91b to be at the shield position. As illustrated in FIGS. 45B and 46, the engagement part 139 and the shield member 90 are positioned such that only the projected portion of the engagement part 139 and the pivot regulator 94c of the shield member 90 engage with each other. In this state, the other portion of the engagement part 139 does not engage with, for example, the pivot regulator 94a. Further, as illustrated in FIG. 45B, as the opening 59 is covered by the shield surface 92, only the shield surface 92 appears on the exterior of the apparatus body 1.

The shield member 90 is formed so that the shield surface 97, which is perpendicular to the pivot direction, is not exposed to the opening 59. With this structure, the operator is protected from being damaged. Further, the shield member 90 is protected from damage.

More specifically, the shield surface 92 that covers the opening 59 is formed with a curved cylindrical shape that is coaxial or nearly coaxial with the shaft parts 91a and 91b, on which the shield member 90 rotates. Despite its position, the shield member 90 sufficiently covers the opening 59 provided on the front edge portion of the support section 50 while leaving no significant gap. In this example, the shield surface 92 has a continuous circumferential surface that keeps the gap between the shield member 90 and the support section 50 to be less than 1 mm throughout the entire slidable range of the image reading device 100, thus preventing a small item, such as a paper clip, from falling into the opening 59.

In alternative to a cylindrical surface, the shield surface 92 may be formed of a spherical surface whose axis is coaxial or nearly coaxial with the shaft parts 91a and 91b, which are the center of rotation of the shield member 90.

Further, the shield surface 97 has a shape that meets a front surface of the image reading device 100. More specifically, when the image reading device 100 slides in the direction Xa in FIG. 45B, with a bias force applied by the torsion spring 98, the shield member 90 pivots on the shaft parts 91a and 91b in the counterclockwise direction. The shield surface 97 rotates upward and contacts the front surface of the image reading device 100. Since the shield surface 97 meets the front surface of the image reading device 100, the size of the opening 59 formed by the sidewalls 52c and 52d and the front wall 52e may be reduced.

While the shield surface 92 is rotated upward only by the bias force of the torsion spring 98, the shield surface 92 may rotate downward to expose the opening 59, for example, when the operator pushes the shield member 90. In such case, the operator may be hurt, for example, by having his or her finger caught in the opening 59, or a small item may fall into the opening 59. To solve this problem, in this example, the pivot regulator 94c illustrated in FIG. 39 or 45B is caused to be in contact with the projected surface of the engagement part 139. This prevents the shield surface 92 from rotating downward as illustrated in FIG. 45B, even if the user pushes the shield surface 92. The pivot regulator 94c functions as a shield stopper that prevents the shield member 90 from changing its position when the shield member 90 is at the shield position, even when pressed. The pivot regulator 94c further serves as a displacement controller that controls displacement of the shield member 90 by selectably contacting the engagement part 139.

The shape of the shield member 90, such as the shapes of the shield surfaces 92 and 97, or the shape of the support section 50 is not limited to those described above. For example, the front wall 52e of the support section 50 may be omitted and a portion corresponding thereto may be provided on the shield member 90, as long as the support section 50 keeps sufficient strength. Further, in this example, it is assumed that the opening 59 is effectively covered when the image reading device 100 is fixed at one of the lock positions. Alternatively, the opening 59 may be effectively covered regardless of the position of the image reading device 100 in the sliding direction. Alternatively, the torsion spring 98 may be omitted, provided that the engagement part 139 of the image reading device 100 and the pivot regulator 94c of the shield member 90 are engaged with each other with improved accuracy.

As described above, the image forming apparatus of FIG. 1 includes the cover lock mechanism 60 providing a function to prevent opening of the cover section 18 when the exposure glass cover 110 is not in close contact with the exposure glass 102, and the platen lock mechanism 170 providing a function to prevent opening of the exposure glass cover 110 when the cover section 18 is open. More specifically, in this example, the cover lock mechanism 60 includes the second cover regulating member, such as the convex section 70 and the concave section 72, which are engaged with each other when the exposure glass cover 100 is not in close contact with the exposure glass 102, thus preventing opening of the cover section 18 when the exposure glass cover 100 is not in close contact with the exposure glass 102. Further, in this example, the platen lock mechanism 170 includes a plurality of members, such as the lock member 171 and the engage section 37, which are engaged with each other when the cover section 18 is open, thus preventing opening of the exposure glass cover 100 when the cover section 18 is open. In this example, the cover lock mechanism 60 and the platen lock mechanism 170 are provided at the rear portion of the support section 50. On the support section 51, a cable is loosely provided to transmit an image signal generated by the image reading device 100 to an electrical board included in the apparatus body 1 in a manner that the cable moves with the image reading device 100 when the image reading device 100 slides.

Further, in the rear portion of the support section 50, a cable is loosely provided to transmit a drive signal to control the ADF 120. By providing the cable for transmitting the image signal and the cable for transmitting a drive signal separately on the support sections 51 and 50, the image signal is protected from noise, which may be caused by movement of the ADF 120. Further, as described below, the image reading device 100 is installed on or removed from the support sections 51 and 50 from the rear portion of the apparatus body 1, thus eliminating the risk of pinching the cables when the image reading device 100 is installed on or removed from the apparatus body 1.

Referring now to FIGS. 10, 12A, and 12B, installation of the image reading device 100 on the support sections 50 and 51 is explained according to an example embodiment of the present invention.

Referring to FIG. 36, the rail sections 33 and 34 of the image reading device 100, which is illustrated in FIG. 10, are inserted into corresponding entries 52b and 51b of the support sections 50 and 51, and slid forward in the direction Xb. After the rail sections 33 and 34 are inserted, the cover section 18 is opened. The slot 51c of the support section 51 and the rail section 34 of the image reading device 100 are connected through a screw 56 (FIGS. 12A and 12B), which is provided from the bottom surface of the support section 51. The screw 56 is provided so as to prevent the image reading device 100 from disconnecting from the support section 51 even when the image reading device 100 slides in the direction Xb. The screw 56 may be replaced by any other member capable of connecting the image reading device 100 to the support section 51, such as a rivet, pin, etc. In order to remove the image reading device 100 from the support section 51, the screw 56 is removed from the slot 51c of the support section 51.

As described above, with the stopper sections 53 and 54, the image reading device 100 is prevented from separating from the apparatus body 1, even when a force is exerted to pull the image reading device 100 upward. Further, with the screw 56, the image reading device 100 is prevented from separating from the apparatus body 1, even when the image reading device 100 slides in the direction Xb. Further, as described above, installation or removal of the image reading device 100 may be performed easily.

Further, in this example, the convex section 70 of the cover lock mechanism 60 has a tapered section such that, when viewed from the front side of the apparatus body 1, the width thereof is reduced as it extends toward the rear side. By providing the tapered section, the image reading device 100 may be easily installed onto the support sections 50 and 51. In this example, the angle of the tapered section may be determined so as not to interfere with the function of regulating sliding of the image reading device 100.

As described above, the cover lock mechanism 60 and the platen lock mechanism 170 are implemented so as to cooperatively operate.

Figure 23:
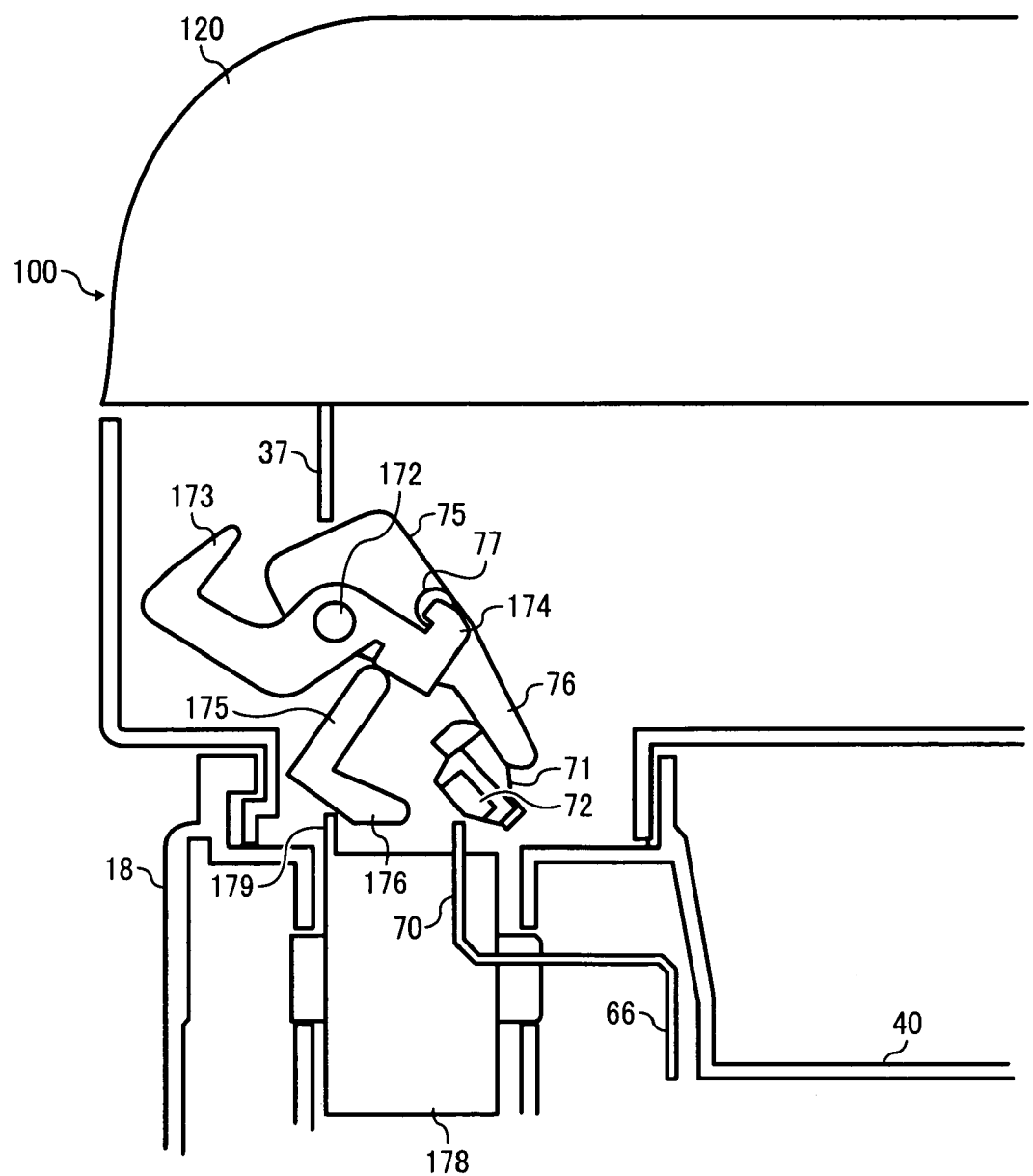
FIG. 23 is a cross-sectional view illustrating the arrangement of the platen lock mechanism of FIG. 19 with respect to the cover lock mechanism of FIG. 4, according to an example embodiment of the present invention.

FIG. 23 illustrates the support section 50 viewed from the upper surface of the apparatus body 1. Referring to FIG. 23, the lock intermediate member 175 of the platen lock mechanism 170 and the lock release 71 of the cover lock mechanism 60 are rotatably provided on the rail section 33 of the image reading device 100. The lock member 171 of the platen lock mechanism 170 and the movable member 75 of the cover lock mechanism 60 are provided at a rear portion of the image reading device 100 that corresponds to the rear portion of the support section 50.

Further, still referring to FIG. 23, the concave section 37 is provided on the exposure glass cover 110. When the exposure glass cover 110 is closed, as illustrated in FIG. 23, the concave section 37 is positioned between the movable member 75 and the lock member 171.

With this structure, the convex section 37 provides the function of regulating opening or closing of the exposure glass cover 110 by engaging with or releasing from the lock member 171 of the platen lock mechanism 170. The convex section 37 further provides the function of regulating opening or closing of the cover section 18 by engaging with or releasing from the movable member 75 of the cover lock mechanism 60.

For example, when the exposure glass cover 110 is not in close contact with the exposure glass 102, the convex section 37 and the movable member 75 are separated from each other, causing the concave section 72 and the convex section 70 to engage with each other as illustrated in FIG. 9A. In this state, the cover section 18 is prevented from being open. Since the cover section 18 is not open, the lock member 171 is kept in the released state illustrated in FIG. 19.

When the exposure glass cover 110 is in close contact with the exposure glass 102, the convex section 37 and the movable member 75 are in contact with each other, causing the concave section 72 and the convex section 70 to be separated from each other. In this state, the cover section 18 can be open. Specifically, in this example, when the operator pulls the operation lever 61, the cover lock mechanism 60 is switched from the locked state to the released state to allow opening of the cover section 18 with respect to the apparatus body 1. As the cover section 18 is rotated, for example, as illustrated in FIG. 3, the cam section 179 and the lock intermediate member 175 are changed from the released state illustrated in FIG. 19 to the locked state illustrated in FIG. 20, while keeping the position of the convex section 37 with respect to the movable member 75. In this manner, the exposure glass cover 110 is prevented from opening after the cover section 18 is opened.

Additionally, when the exposure glass cover 110 is not in close contact with the exposure glass 102, the concave section 72 and the convex section 70 are engaged with each other to prevent sliding of the image reading device 100. As described above, the slide member 66 having the convex section 70 is provided on the apparatus body 1 and the lock release 71 having the concave section 72 is provided on the image reading device 100. With this structure, even when the operation button 80 is pressed to release the locked state of the image reading device 100 that is caused by the slide lock mechanism of FIG. 13 or 15, engagement of the convex section 70 and the concave section 72 prevents the image reading device 100 from sliding. Based on this function, the cover lock mechanism 60 may function as a slide lock mechanism capable of preventing sliding of the image reading device 100 when the exposure glass cover 110 is not in close contact with the exposure glass 102.

When the exposure glass cover 110 is in close contact with the exposure glass 102 such that the convex section 70 is separated from the concave section 72, the image reading device 100 is made slidable. When the operation button 80 is pressed to release the locked state of the image reading device 100, the image reading device 100 slides with respect to the apparatus body 1.

As described above, the second cover regulating member of the cover lock mechanism 60 is capable of providing the function of preventing opening of the cover section 18 when the exposure glass cover 110 is not in close contact with the exposure glass 102, and the function of preventing sliding of the image reading device 100 when the exposure glass cover 110 is not in close contact with the exposure glass 102. With reduced number of components or manufacturing cost, one or more functions may be provided.

Further, since the concave section 72 includes a plurality of concave sections 72, opening of the cover section 18 or sliding of the image reading device 100 may be prevented throughout the entire slidable range of the image reading device 100.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

What is claimed is:

1. An image forming apparatus, comprising:
    an apparatus body including an image forming device configured to form an image on a recording medium;
    a cover section provided on the apparatus body and configured to close with respect to the apparatus body to function as a top surface of the apparatus body and to open with respect to the apparatus body to expose the inside of the apparatus body;
    an image reading device provided above the cover section while forming an open space with the cover section and configured to slide substantially in parallel with a surface of the cover section, wherein the image reading device includes:
        a document hold member configured to place a document thereon; and
        a document hold member cover configured to be in close contact with the document hold member so as to keep the document onto the document hold member; and
    a cover lock mechanism configured to prevent opening of the cover section throughout the slidable range of the image reading device, when the document hold member cover is not in close contact with the document hold member.

2. An image forming apparatus, comprising:
    an apparatus body including an image forming device configured to form an image on a recording medium;
    a cover section provided on the apparatus body and configured to close with respect to the apparatus body to function as a top surface of the apparatus body and to open with respect to the apparatus body to expose the inside of the apparatus body;
    an image reading device provided above the cover section while forming an open space with the cover section and configured to slide substantially in parallel with a surface of the cover section, wherein the image reading device includes:
        a document hold member configured to place a document thereon; and
        a document hold member cover configured to be in close contact with the document hold member so as to keep the document onto the document hold member;
    a cover lock mechanism configured to prevent opening of the cover section throughout the slidable range of the image reading device, when the document hold member cover is not in close contact with the document hold member;
    a first engagement section provided on the apparatus body;
    a second engagement section provided on the image reading device and configured to engage with the first engagement section; and
    a regulating member configured to locate at a first position that causes the first engagement section and the second engagement section to be engaged with each other when the document hold member cover is not in close contact with the document hold member, and to locate at a second position that causes the first engagement section and the second engagement section to be separated from each other when the document hold member cover is in close contact with the document hold member.

3. The image forming apparatus of claim 2, wherein the cover lock mechanism further comprises:
    a bias force applying member configured to apply a bias force to the regulating member so as to cause the regulating member to move toward the second position,
        wherein, when the document hold member cover is not in close contact with the document hold member, the document hold member cover is configured to directly or indirectly apply a force to the regulating member opposing the bias force of the bias force applying member to cause the regulating member to move from the second position to the first position.

4. The image forming apparatus of claim 2, wherein:
    the image reading device is configured to be fixed at one of a plurality of lock positions throughout the slidable range, and wherein the cover section is prevented from opening when the image reading device is fixed at one of the plurality of lock positions.

5. The image forming apparatus of claim 4, wherein:
    the regulating member has a side surface having a length determined based on the slidable range of the image reading device, and wherein:
    the engagement section comprises a plurality of engagement sections each corresponding to one of the plurality of lock positions of the image reading device, the plurality of engagement sections being provided on the side surface.

6. The image forming apparatus of claim 2, wherein the cover lock mechanism further comprises:
    a cover regulating member configured to cause the cover section to be in a locked state with respect to the apparatus body after the cover section is closed, the first cover regulating member including an operation lever configured to release the locked state of the cover section,
    wherein the first engagement section moves cooperatively with the operation lever such that, when the first engagement section is engaged with the second engagement section, the operation lever is prevented from operating to keep the locked state of the cover section.

7. The image forming apparatus of claim 2,
    further comprising:
    an automatic document feeder integrally provided with the document hold member cover.

8. An image forming apparatus, comprising:
    an apparatus body including an image forming device configured to form an image on a recording medium;
    a cover section provided on the apparatus body and configured to close with respect to the apparatus body to function as a top surface of the apparatus body and to open with respect to the apparatus body to expose the inside of the apparatus body;
    an image reading device provided above the cover section while forming an open space with the cover section and configured to slide substantially in parallel with a surface of the cover section, wherein the image reading device includes:
- a document hold member configured to place a document thereon; and
- a document hold member cover configured to be in close contact with the document hold member so as to keep the document onto the document hold member; and a slide lock mechanism configured to prevent sliding of the image reading device throughout the slidable range of the image reading device, when the document hold member cover is not in close contact with the document hold member.

9. An image forming apparatus, comprising:
an apparatus body including an image forming device configured to form an image on a recording medium;
a cover section provided on the apparatus body and configured to close with respect to the apparatus body to function as a top surface of the apparatus body and to open with respect to the apparatus body to expose the inside of the apparatus body;
an image reading device provided above the cover section while forming an open space with the cover section and configured to slide substantially in parallel with a surface of the cover section, wherein the image reading device includes:
- a document hold member configured to place a document thereon: and
- a document hold member cover configured to be in close contact with the document hold member so as to keep the document onto the document hold member;

a slide lock mechanism configured to prevent sliding of the image reading device throughout the slidable range of the image reading device, when the document hold member cover is not in close contact with the document hold member;
a first engagement section provided on the apparatus body;
a second engagement section provided on the image reading device and configured to engage with the first engagement section; and
a regulating member configured to locate at a first position that causes the first engagement section and the second engagement section to be engaged with each other when the document hold member cover is not in close contact with the document hold member, and to locate at a second position that causes the first engagement section and the second engagement section to be separated from each other when the document hold member cover is in close contact with the document hold member.

10. The image forming apparatus of claim 9, wherein the slide lock mechanism further comprises:
a bias force applying member configured to apply a bias force to the regulating member so as to cause the regulating member to move toward the second position,
wherein, when the document hold member cover is not in close contact with the document hold member, the document hold member cover is configured to directly or indirectly apply a force to the regulating member opposing the bias force of the bias force applying member to cause the regulating member to move from the second position to the first position.

11. The image forming apparatus of claim 9, wherein:
the image reading device is configured to be fixed at one of a plurality of lock positions throughout the slidable range, and wherein the image reading device is prevented from sliding when the image reading device is fixed at one of the plurality of lock positions.

12. The image forming apparatus of claim 11, wherein:
the regulating member has a side surface having a length determined based on the slidable range of the image reading device, and wherein:
the engagement section comprises a plurality of engagement sections each corresponding to one of the plurality of lock positions of the image reading device, the plurality of engagement sections being provided on the side surface.

13. An image forming apparatus, comprising:
an apparatus body including an image forming device configured to form an image on a recording medium;
a cover section provided on the apparatus body and configured to close with respect to the apparatus body to function as a top surface of the apparatus body and to open with respect to the apparatus body to expose the inside of the apparatus body;
an image reading device provided above the cover section while forming an open space with the cover section and configured to slide substantially in parallel with a surface of the cover section, wherein the image reading device includes:
- a document hold member configured to place a document thereon; and
- a document hold member cover configured to be in close contact with the document hold member so as to keep the document onto the document hold member;

a lock mechanism including:
- a cover lock mechanism configured to prevent opening of the cover section throughout the slidable range of the image reading device, when the document hold member cover is not in close contact with the document hold member; and
- a slide lock mechanism configured to prevent sliding of the image reading device throughout the slidable range of the image reading device, when the document hold member cover is not in close contact with the document hold member.

14. An image forming apparatus, comprising:
an apparatus body including an image forming device configured to form an image on a recording medium;
a cover section provided on the apparatus body and configured to close with respect to the apparatus body to function as a top surface of the apparatus body and to open with respect to the apparatus body to expose the inside of the apparatus body:
an image reading device provided above the cover section while forming an open space with the cover section and configured to slide substantially in parallel with a surface of the cover section, wherein the image reading device includes:
- a document hold member configured to place a document thereon; and
- a document hold member cover configured to be in close contact with the document hold member so as to keep the document onto the document hold member:

a lock mechanism including:
- a cover lock mechanism configured to prevent opening of the cover section throughout the slidable range of the image reading device, when the document hold member cover is not in close contact with the document hold member: and
- a slide lock mechanism configured to prevent sliding of the image reading device throughout the slidable range of the image reading device, when the document hold member cover is not in close contact with the document hold member;

a first engagement section provided on the apparatus body;

a second engagement section provided on the image reading device and configured to engage with the first engagement section; and a regulating member configured to locate at a first position that causes the first engagement section and the second engagement section to be engaged with each other when the document hold member cover is not in close contact with the document hold member, and to locate at a second position that causes the first engagement section and the second engagement section to be separated from each other when the document hold member cover is in close contact with the document hold member.

15. The image forming apparatus of claim 14, wherein the lock mechanism further comprises:

a bias force applying member configured to apply a bias force to the regulating member so as to cause the regulating member to move toward the second position, wherein, when the document hold member cover is not in close contact with the document hold member, the document hold member cover is configured to directly or indirectly apply a force to the regulating member opposing the bias force of the bias force applying member to cause the regulating member to move from the second position to the first position.

16. The image forming apparatus of claim 14, wherein:

the image reading device is configured to be fixed at one of a plurality of lock positions throughout the slidable range.

17. The image forming apparatus of claim 16, wherein:

the regulating member has a side surface having a length determined based on the slidable range of the image reading device, and wherein:

the engagement section comprises a plurality of engagement sections each corresponding to one of the plurality of lock positions of the image reading device, the plurality of engagement sections being provided on the side surface.

* * * * *